United States Patent [19]
Ishikawa et al.

[11] Patent Number: 6,155,726
[45] Date of Patent: Dec. 5, 2000

[54] IMAGE FORMING METHOD AND SYSTEM

[75] Inventors: Shun-ichi Ishikawa; Seiiti Kubodera; Akira Fukano; Keishi Kato; Isao Taniguchi; Yoshiharu Okino; Nagao Ogiwara, all of Kanagawa-ken, Japan

[73] Assignee: Fuji Photo Film Co., Ltd., Kanagawa-Ken, Japan

[21] Appl. No.: 09/067,956

[22] Filed: Apr. 29, 1998

Related U.S. Application Data

[62] Division of application No. 08/814,825, Mar. 11, 1997.

[30] Foreign Application Priority Data

| Mar. 11, 1996 | [JP] | Japan | 8-53357 |
| Jan. 14, 1997 | [JP] | Japan | 9-4899 |

[51] Int. Cl.[7] .............. G03D 13/00; G03D 5/00
[52] U.S. Cl. ............. 396/575; 355/27; 396/604
[58] Field of Search .................. 396/575; 250/316.1, 250/317.1, 318, 319; 355/27–29, 405

[56] References Cited

U.S. PATENT DOCUMENTS

| 3,576,632 | 4/1971 | Bornemisza | 430/353 |
| 3,821,762 | 6/1974 | Corrigan | 396/605 |

(List continued on next page.)

FOREIGN PATENT DOCUMENTS

| 0210660 | 2/1987 | European Pat. Off. . | |
| 6211178 | 5/1987 | European Pat. Off. . | |
| 01170672 | 7/1989 | European Pat. Off. . | |
| 0385496 | 9/1990 | European Pat. Off. . | |
| 452570 | 10/1991 | European Pat. Off. | 396/FOR 942 |
| 03258870 | 11/1991 | European Pat. Off. . | |
| 04117468 | 4/1992 | European Pat. Off. . | |
| 0492579 | 7/1992 | European Pat. Off. . | |
| 04214781 | 8/1992 | European Pat. Off. . | |
| 0513547 | 11/1992 | European Pat. Off. . | |
| 05027403 | 2/1993 | European Pat. Off. . | |
| 05162473 | 6/1993 | European Pat. Off. . | |
| 0557858 | 9/1993 | European Pat. Off. . | |
| 0558284 | 9/1993 | European Pat. Off. . | |
| 06106861 | 4/1994 | European Pat. Off. . | |
| 0609966 | 8/1994 | European Pat. Off. . | |
| 0626611 | 11/1994 | European Pat. Off. . | |
| 0650850 | 5/1995 | European Pat. Off. . | |
| 0671276 | 9/1995 | European Pat. Off. . | |
| 08015784 | 1/1996 | European Pat. Off. . | |
| 08224966 | 9/1996 | European Pat. Off. . | |
| 2193216 | 2/1974 | France . | |
| 59-75247 | 4/1984 | Japan | 396/FOR 918 |
| 59-181353 | 10/1984 | Japan | 396/FOR 918 |
| 2056103 | 3/1981 | United Kingdom . | |
| 2299787 | 10/1996 | United Kingdom . | |
| WO9426521 | 11/1994 | WIPO . | |

OTHER PUBLICATIONS

L.A. Mannheim et al.; "The Focal Encyclopedia of Photography"; vol. 1, 1965; Focal Press, London GB XP002051024; p. 548.

Primary Examiner—D. Rutledge
Attorney, Agent, or Firm—Sughrue, Mion, Zinn, Macpeak & Seas, PLLC

[57] ABSTRACT

A photosensitive material which when imagewise exposed to record a latent image thereon is formed with an image by heating with a prescribed processing material superimposed thereon is used as a photographic film or the like, the photosensitive material is exposed to record an image thereon, the exposed photosensitive material is developed by superimposing and heating the photosensitive material and the processing material to form the image on the photosensitive material and then peeling the photosensitive material formed with the image off the processing material, the developed image on the photosensitive material is read with a scanner to obtain image data representing the image, and the image data are subjected to prescribed image processing to generate reproducible digital image data.

97 Claims, 23 Drawing Sheets

U.S. PATENT DOCUMENTS

| | | | |
|---|---|---|---|
| 4,908,520 | 3/1990 | Saotome et al. | 250/589 |
| 5,049,908 | 9/1991 | Murakami | 396/396 |
| 5,109,252 | 4/1992 | Schott | 399/83 |
| 5,160,946 | 11/1992 | Hwang | 346/157 |
| 5,215,852 | 6/1993 | Kato et al. | 430/126 |
| 5,300,413 | 4/1994 | Sutton et al. | 430/503 |
| 5,305,016 | 4/1994 | Quate | 347/46 |
| 5,350,651 | 9/1994 | Evans et al. | 430/21 |
| 5,350,664 | 9/1994 | Simons | 430/21 |
| 5,391,443 | 2/1995 | Simons et al. | 430/21 |
| 5,451,561 | 9/1995 | Campbell et al. | 503/227 |
| 5,461,440 | 10/1995 | Toyoda et al. | 396/311 |
| 5,466,560 | 11/1995 | Sowinski et al. | 430/347 |
| 5,486,891 | 1/1996 | Rousmaniere et al. | 396/580 |
| 5,512,533 | 4/1996 | Bowman et al. | 503/227 |
| 5,541,046 | 7/1996 | Cottrell | 430/21 |
| 5,664,253 | 9/1997 | Meyers | 396/603 |
| 5,725,990 | 3/1998 | Hirai et al. | 430/203 |
| 5,756,269 | 5/1998 | Ishikawa et al. | 430/351 |

F I G .14
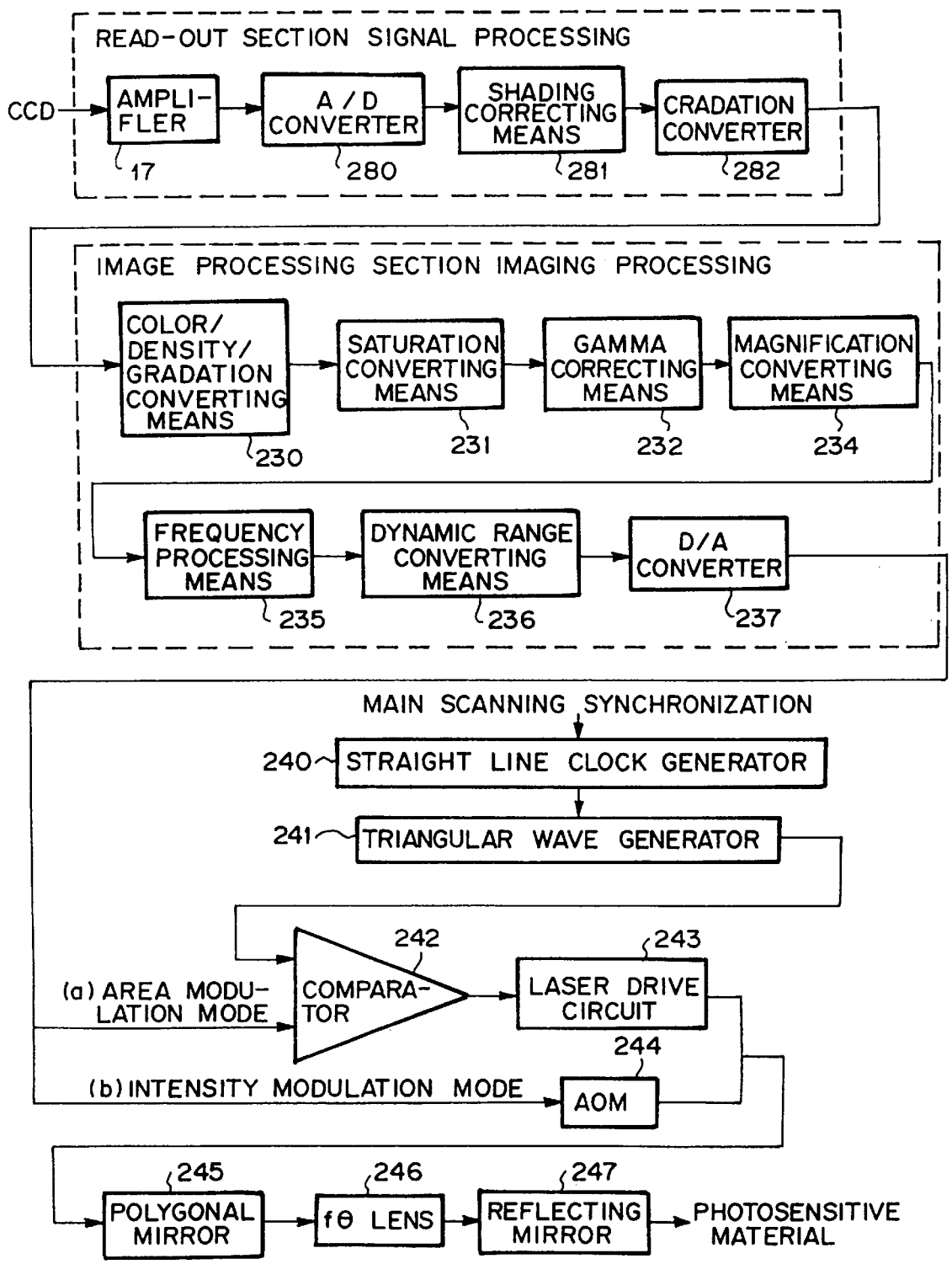

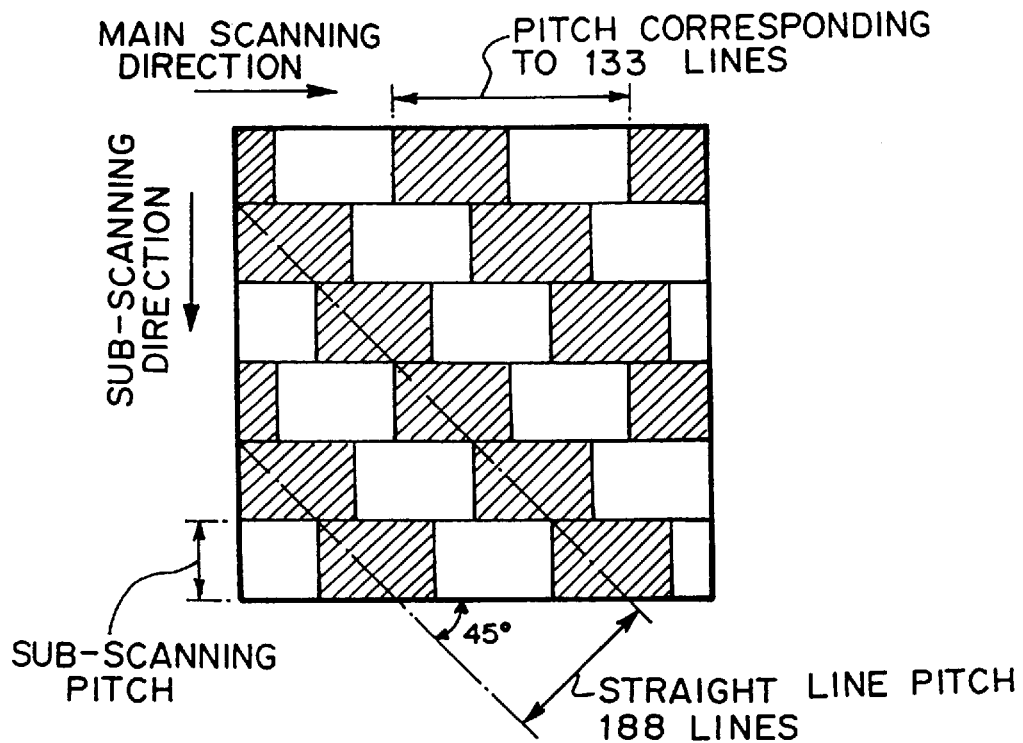
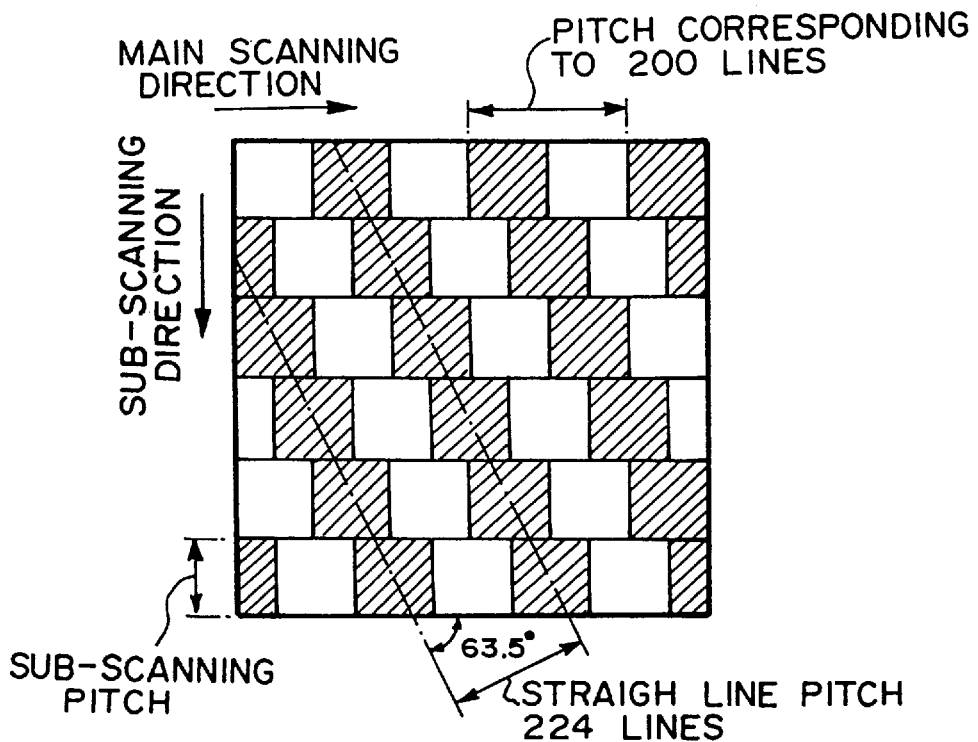

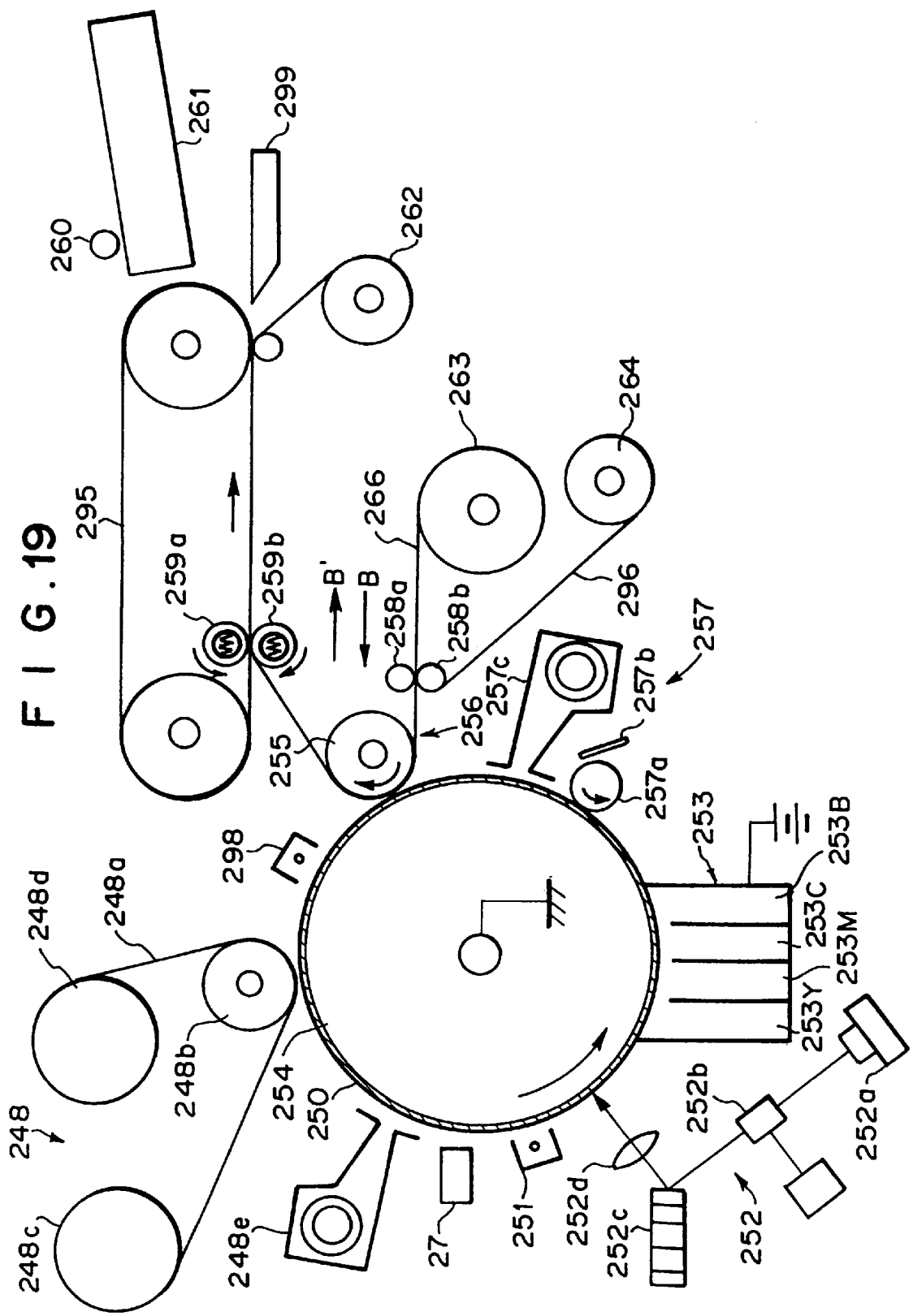

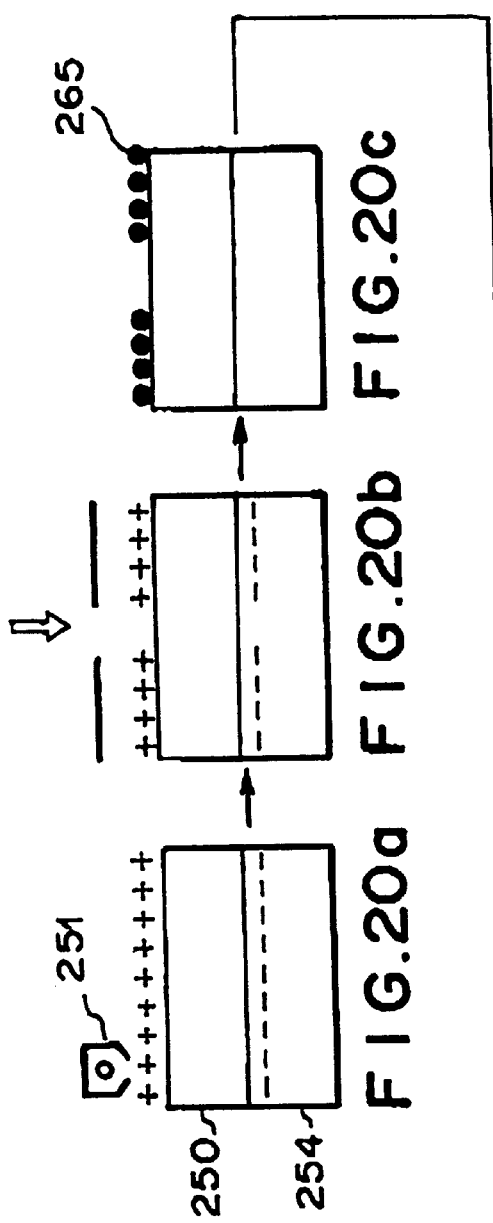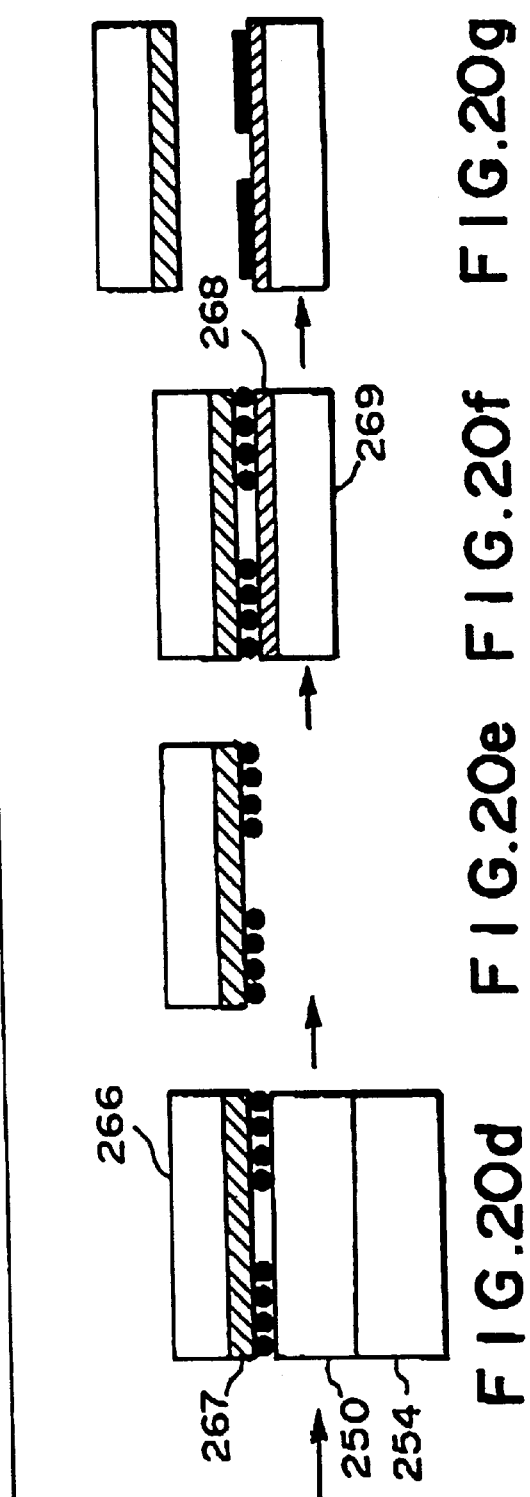

IMAGE FORMING METHOD AND SYSTEM

This is a divisional of application Ser. No. 08/814,825 filed Mar. 11, 1997.

BACKGROUND OF THE INVENTION

1. Field of the Invention

This invention relates to an image forming method and system more particularly to a method and system for forming an image using as a photographic film or the like a photosensitive material which, after imagewise exposure to record an image thereon, is formed with an image by heating it with a prescribed processing material superimposed thereon.

2. Description of the Related Art

In the method known as conventional color photography, a photographic color photosensitive material (color negative film) generally comprises a layer capable of recording blue light to form a yellow image, a layer capable of recording green light to form a magenta image and a layer capable of recording red light to form a cyan image. When such a material undergoes development processing, the developing agent is oxidized in the course of reducing the halide grains carrying the latent image to silver. The oxidized developing agent reacts with couplers (coupling reaction) to form dye images. The undeveloped silver halide and the developed silver are removed in a subsequent bleach-fix step. Dye images are thus formed and a color negative film removed of undeveloped silver halide and developed silver can be obtained.

Conventionally, light is transmitted through the dye images of the color negative film onto color paper. The dye images printed on the color paper in this manner are similarly developed and bleach-fixed to obtain a color print.

In another known method the image formed on the color negative film is read photoelectrically to obtain image data, the image data are subjected to image processing to obtain recording image data and the recording image data are used to form an image on another image recording material. This method has in particular promoted the development of the digital printer, which produces finished prints by scanning a photosensitive material such as color paper with a laser beam modulated by digital signals converted from the photoelectrically read image data. A digital printer of this type is taught, for example, by JP-A-(unexamined published Japanese patent application)7-15593.

Since the aforesaid image forming methods require the image-bearing color negative film to be subjected to ordinary development, bleach and fixation processes (wet processes), they involve complex processes for image formation.

Moreover, the prior-art methods use processing solutions and other solutions that contain chemicals. These are troublesome from the point of safety management and are liable to foul and hasten wear and tear of the equipment.

SUMMARY OF THE INVENTION

This invention was accomplished in light of the foregoing problems and has as one of its objects to provide a simple, speedy image forming method for enabling an image formed on a photosensitive material by developing a photosensitive material recorded with an image to be read, digitized and used as image data and to provide a compact, user-friendly image forming system for implementing the method.

The image forming method and system of the invention are characterized in that they use a photosensitive material containing photosensitive silver halide grains which after imagwise exposure to record a latent image thereon is formed with an image by heating with a prescribed processing material superimposed thereon. Specifically, the photosensitive material is exposed to record a latent image thereon, the photosensitive material and the processing material are superimposed, the superimposed photosensitive material and processing material are heated to form an image on the photosensitive material corresponding to the latent image recorded thereon, the photosensitive material formed with the image is peeled off the processing material, the image formed on the photosensitive material is read with a scanner to obtain image data representing the image, and the image data are subjected to prescribed image processing to generate reproducible digital image data.

When the invention is implemented as a system, all processing means for the steps from the superimposing of the materials to the reading of the image can be included in a single apparatus. Alternatively, the system can be constituted of a developing apparatus for the processing up to development and a processing apparatus for conducting the reading and image processing. This also applies to the various means explained in the following. All of the means can be incorporated in a single apparatus case or can be constituted as separate units interconnected with each other.

Prior to the superimposing of the photosensitive material and the processing material, at least one of the two materials is preferably imparted with an image-forming solvent such as water. The photosensitive silver halide grains are preferably tabular. The heating is preferably conducted at a temperature between 60 and 100° C. for between 5 and 60 seconds.

The photosensitive material is preferably a coloring material-containing, heat-developable color photosensitive material having a support provided thereon with at least three photosensitive layers which each includes at least photosensitive silver halide grains, a binder and a coloring material capable of imagewise release or diffusion of a diffusible dye, and which are photosensitive in different wavelength regions, the coloring material present in the layers being different from each other in hue after development. The processing material is adapted to be superimposed on the coloring material-containing, heat-developable photosensitive material and heated therewith to form an image on the coloring material-containing, heat-developable photosensitive material. It is preferably a mordant-containing processing material having a support provided thereon with a layer containing at least a mordant. The processing material removes from the coloring material-containing, heat-developable photosensitive material at least a part of the diffusible dye released thereby owing to the aforesaid heating, thereby forming dye images of at least three colors on the coloring material-containing, heat-developable photosensitive material.

Otherwise, the photosensitive material can be a heat-developable photosensitive material having a support provided thereon with at least three photosensitive layers which are photosensitive in different wavelength regions, each of the layers including at least photosensitive silver halide grains, a binder, a color developing agent and a dye-providing coupler, the dyes formed from the oxidized color developing agent and the dye-providing coupler being different in hue. The processing material is adapted to be superimposed on the heat-developable photosensitive material and heated therewith to form an image on the heat-developable photosensitive material and the heating forms dye images of at least three colors on the heat-developable photosensitive material.

Further, the photosensitive material can be a photosensitive material having a transparent support provided thereon with at least three photosensitive layers which each includes at least photosensitive silver halide grains, a color developing agent, a coupler and a binder, and which are photosensitive in different wavelength regions, the dyes formed from the oxidized color developing agent and the coupler being different from each other in absorption wavelength region. The processing material preferably has a support provided thereon with a processing layer including at least a base and/or a base precursor. The photosensitive material and the processing material are superimposed with the photosensitive layers of the photosensitive material and the processing layer of the processing material facing each other in the presence of 0.1 to 1 time the amount of water required to cause maximum swelling of all coating layers of the photosensitive material and the processing material other than their backing layers, whereafter the superimposed photosensitive material and the processing material are heated to form on the photosensitive material an image based on non-diffusible dyes of at least three colors.

The color developing agent is preferably at least one compound among those represented by general formulas (1) to (5) shown below:

General formula (1)

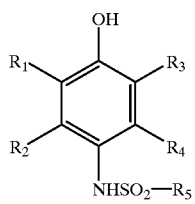

General formula (2)

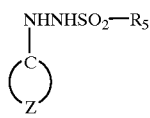

General formula (3)

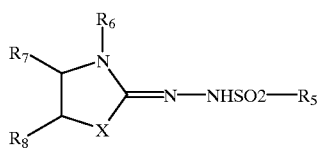

General formula (4)

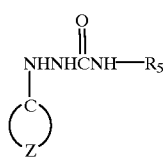

General formula (5)

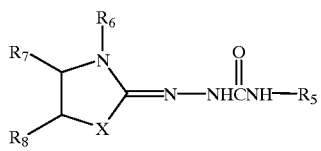

where $R_1$, $R_2$, $R_3$, and $R_4$ each represents a hydrogen atom, a halogen atom, an alkyl group, an aryl group, an alkylcarbonamido group, an arylcarbonamido group, an alkylsulfonamido group, an arylsulfonamido group, an alkoxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkyl-sulfonyl group, an arylsulfonyl group, an alkoxycarbonyl group, an aryloxycarbonyl group, an alkylcarbonyl group, an arylcarbonyl group, or an acyloxy group; $R_5$ represents a substituted or unsubstituted alkyl group, a substituted or unsubstituted aryl group, or a substituted or unsubstituted heterocyclic group; Z represents an atomic group forming an aromatic ring (including a heterocyclic aromatic ring) and when Z is a benzene ring, the total value of the Hammett's constant($\rho$) of the substituent is at least 1; $R_6$ represents a substituted or unsubstituted alkyl group; X represents an oxygen atom, a sulfur atom, a selenium atom, or an alkyl-substituted or aryl-substituted tertiary nitrogen atom; and $R_7$ and $R_8$ each represents a hydrogen atom or a substituent and $R_7$ and $R_8$ may combine each other to form a double bond or a ring.

Irrespective of which of the foregoing photosensitive materials and processing materials are used, any dust or other foreign matter adhering to the photosensitive material is preferably removed before the photosensitive material and the processing material are superimposed. This is because the method of this invention does not involve immersion of the photosensitive material in a processing solution, so that adhering dust and the like will not be washed off in a processing solution as it is in the conventional method.

The recording of an image on the photosensitive material by exposure can be conducted, for instance, by cutting the photosensitive material into the shape of photographic film, loading the cut photosensitive material into a film cartridge, loading the film cartridge into a camera, and exposing the photosensitive material by photograph-taking with the camera. However, the exposure of the photosensitive material in this invention is not limited to the photographing method.

The exposure can also be achieved by loading a photographic film made of the photosensitive material into a film cartridge, loading the film cartridge into a lens-fitted photographic film unit and using the lens-fitted photographic film unit for photograph-taking.

Another method is to load a photographic film made of the photosensitive material directly into a lens-fitted photographic film unit and using the lens-fitted photographic film unit for photograph-taking.

The term "film cartridge" used in this specification is defined as a generic name for any type of container for accommodating film wound into a roll, including the film magazine, the APS (Advanced Photo System) cartridge and the like.

An object of the image forming method and system of this invention is to provide a system so simple to operate that users can utilize it on a self-service basis and to achieve this object by enabling adoption of an easy-to-develop photosensitive material as a film material. In implementing the system of the invention, therefore, it is preferable to provide various means for simplifying the development-processing operations. As a specific example, it is preferable to include a function for automatically drawing the film into the developing section when the film cartridge is placed at a prescribed setting section.

In the method and system of this invention, the developed film is not ordinarily returned to the user because it still contains silver halide and developed silver. If the user requests return, however, it is returned after residual silver halide and developed silver have been removed from the photosensitive material by carrying out bleach or fixation processing on the photosensitive material separated from the processing material by the peeling mentioned earlier.

Although the desilvering means for this can be incorporated in the system, the need for a processing solution complicates system supervision. Desilvering is therefore preferably conducted using a separate dedicated apparatus.

In the method and system of the invention, the scanner read-out can be conducted without removing the silver halide and developed silver remaining on the photosensitive material peeled off the processing material in the peeling step. In this case, the image processing including processing to correct for the contribution of the silver halide and the developed silver to the image data.

In the method and system of the invention, the digital image data generated in the foregoing manner can be output as a file for recording on a prescribed storage medium. For instance, a file containing the image data can be stored on an MO, ZIP or other such removable media to be turned over to the customer who requested development or can be stored on the hard disk of a server computer at a photo shop or the like for output on request of the customer who requested development. Various other types of services are also possible.

Not only means for file output but also means for outputting the digital image data as a print should preferably be provided. The digital printer for preparing the print can be a system integrated with the developing section or can be provided separately of the developing section and be connected therewith by a cable or communication line.

The digital printer is preferably a non-wet processing printer. By "non-wet processing" is meant processing which forms an image on the image-receiving material to be finally output without immersing the image-receiving material in any type of processing solution. A printer which does not immerse the image-receiving material in a processing solution but does impart a small amount of processing solution thereto is defined as being of a "non-wet process" printer.

Examples of non-wet processing digital printers include the dry xerographic digital printer which uses dry toner, the ink-jet digital printer which produces a print by fixing jetted ink on a recording sheet, the thermal sublimation dye transfer digital printer, and the like. There is also another type of non-wet processing printer which records an image on a prescribed heat-developable photosensitive material, superimposes the heat-developable photosensitive material on an image-receiving material and forms an image on the image-receiving material by heat-development transfer.

Although use of a non-wet processing digital printer in the image forming method and system of this invention makes the system especially easy to handle, the invention is not limited to use of non-wet processing equipment and can also use any of various printers which print using a conventional wet development process.

When the image forming method and system of the invention are actually used to offer services, some means is necessary to enable the customer to order the desired type of output, either as a data file or as prints. This can be achieved in the invention method and system by making the output in accordance with order data received through a prescribed user interface.

Specifically, the user interface is preferably provided with a monitor or other display means for displaying a list of all sets of digital image data read from the photographic film, a selection input means such as a mouse, keyboard or the like for selecting a desired set or sets of digital image data from among the displayed sets of digital image data, and software for controlling these means. Coin insertion means, billing means or the like is best provided for collecting payment for the output made in response to the order data.

An arrangement is preferably adopted for switching the output destination of the digital image data based on the order data.

Since the method and system explained in the foregoing do not require development, bleach and fixation processing that use large amounts of processing solution, there is no troublesome work in connection with supervision of developing solution or cleaning of equipment. In addition, the time required for image formation is much shorter than heretofore.

If the formed image is read with a scanner to obtain digital image data, the digital image data can be printed out with a digital printer, be loaded into a personal computer, and be put to use for various other photographic image forms. If the digital printer used is of the ink-jet type, dry xerographic type using toner or other type not requiring wet processing, the system can be easily supervised even by a person without expert knowledge regarding the handling and use of development processing solutions.

In this case, since no wet processing is conducted in either the development step or the output step, the apparatus can be made compact. As the apparatus is easy to supervise, moreover, the system can be installed not only in photo shops but also in convenience stores and other such places. In addition, since there is no risk of developer leakage, the system can, if constructed to be resistant to shock and vibration, be installed and used in airplanes, ships, vehicles and the like. This enables service providers to increase the number of service points and allows customers to output the photos they want, when the want, in the output mode they want.

Moreover, the color images formed by the invention image forming method have been found to be of a quality on a par with conventional silver halide photos.

As explained in the foregoing, the image forming method and system according to this invention make it possible to offer high-quality full color images on a broad scale by a simple method and system. As such, they are highly effective in practical application.

BRIEF DESCRIPTION OF THE DRAWINGS

FIG. 14 is a diagram showing image signal processing for image output in the intensity modulation mode and the area modulation mode of a xerographic digital printer.

FIG. 15 is a diagram showing a straight-line screen for a yellow image.

FIG. 16 is a diagram showing a straight-line screen for a magenta image.

FIG. 19 is a diagram showing an example of the configuration of the xerographic digital printer.

FIGS. 20(a) to 20(g) are diagrams showing the print production process in a xerographic digital printer.

PREFERRED EMBODIMENTS OF THE INVENTION

Embodiments of the invention image forming method and system will now be explained in detail, with reference to the drawings when necessary.

Figure 1:
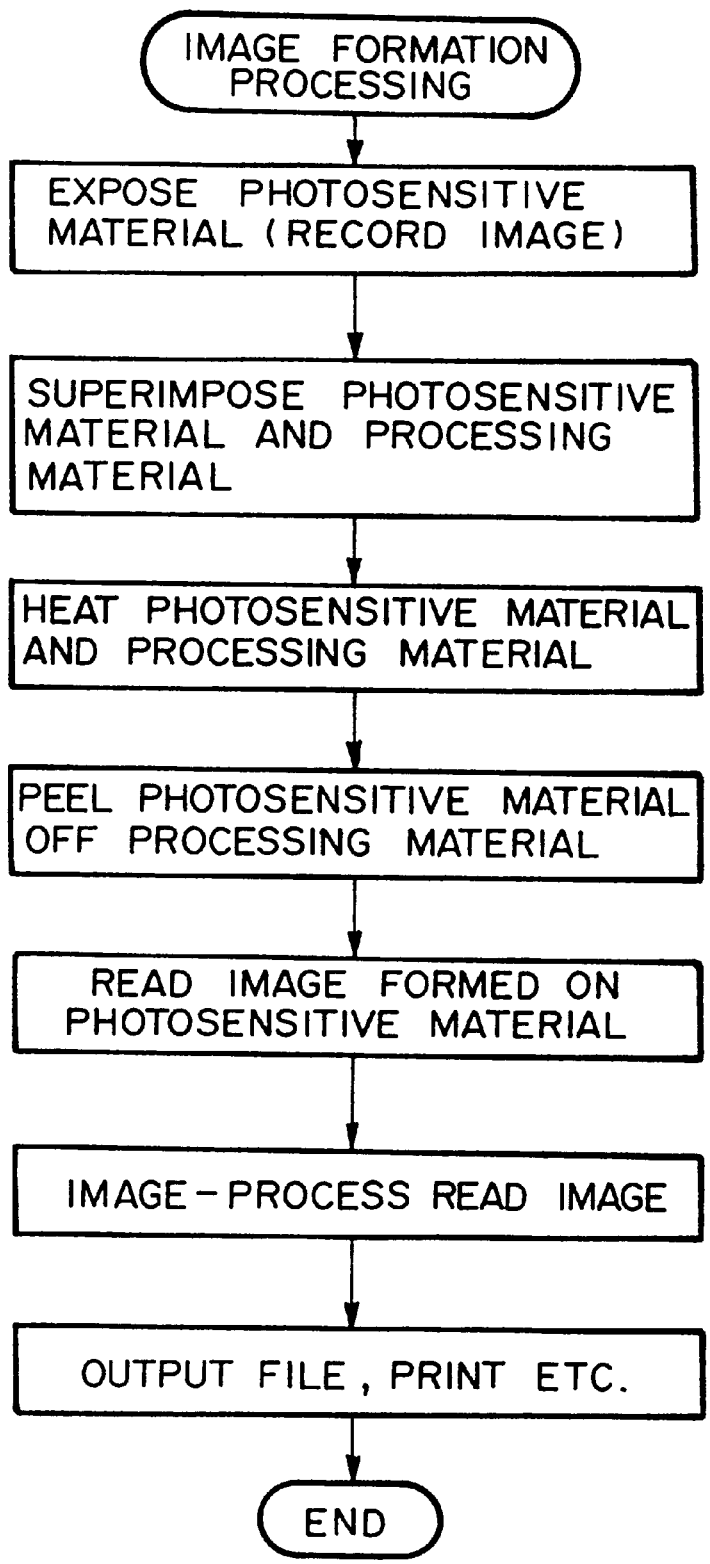
FIG. 1 is a flowchart showing the flow of processing in the image forming method of the invention.

FIG. 1 is a flowchart showing the flow of processing in the image forming method of the invention. In the image forming method of this invention, a photosensitive material which contains photosensitive silver halide grains is exposed using a photographing means or the like to record a latent image thereon, whereafter the photosensitive material is superimposed on a processing material, heated and then peeled off the processing material. The photosensitive material is developed by these superimposing, heating and peeling steps. The image formed on the photosensitive material by the development is digitized by reading it with a scanner and the so-obtained image data are image-processed and output as a file or a print. The explanation given hereinafter will by and large follow the course of the processes according to this method and be set out in the order of the photosensitive material, the exposure method, the development processing, the generation of digital image data, and the output processing.

Figure 2:
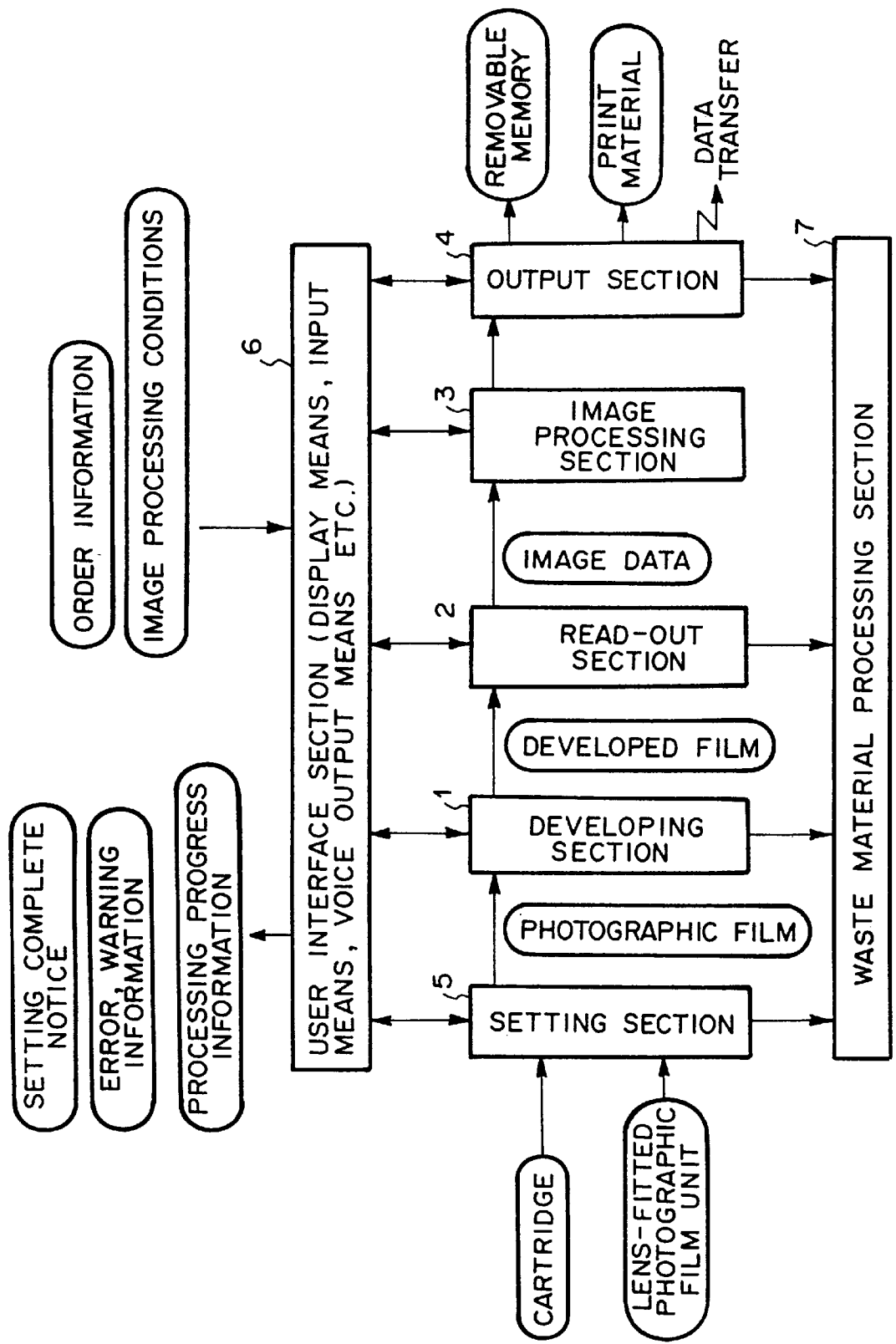
FIG. 2 is a block diagram showing the configuration of the image forming system of the invention.

FIG. 2 is a block diagram showing the configuration of an image forming system for conducting the processing in accordance with this image forming method. As shown in this figure, when the invention is implemented as a system, the system is preferably configured not only to include a developing section, a read-out section, an image processing section and an output section for carrying out the steps of the method outlined above but also to include a setting section for drawing photographic film out of a container or the like to put it in a developable condition, a user interface section for outputting various information to, and receiving input of order data from, the user, and a waste material processing section for collecting and otherwise handling used materials discharged in the processing steps. These means will therefore also be discussed in the ensuing explanation.

(1) Photosensitive material

Three types of photosensitive materials will first be set out as examples preferable for use in the image forming method and system of this invention. The materials shown in the following are, however, merely examples and this invention is not limited thereto. Since these photosensitive materials are characterized by being developable without conducting bleach or fixation processing, the explanation of each photosensitive material will be accompanied by an explanation of its development processing and the processing material used for the development processing.

(1-1) First photosensitive material

The heat-developable photosensitive material explained here comprises a support provided thereon with at least three photosensitive layers which each comprises at least photosensitive silver halide grains, a binder and a non-diffusible coloring material which releases a diffusible dye in response to or in counter response to silver development, and which are photosensitive in different wavelength regions, the coloring material present in the layers being different from each other in hue after development.

The three photosensitive layers are each preferably sensitive to one of blue light, green light and red light. The layers are ordinarily disposed in the order of the red-sensitive layer, the green-sensitive layer and the blue-sensitive layer from the support side. Different orders are, however, possible according purpose. An arrangement as set out in column 162 of JP-A-7-152129 can be adopted, for example. Although the color sensitivities of the photosensitive layers are substantially the same, they can be divided into a plurality of silver halide emulsion layers with different sensitivities.

While the relationship between the spectral sensitivity of each layer and the hue of the diffusible dye formed or released by the coloring material is not restricted, use of cyan coloring material in the red-sensitive layer, magenta coloring material in the green-sensitive layer and yellow coloring material in the blue-sensitive layer facilitates image writing to conventional color paper and the like.

In addition to the silver halide emulsion layer, there can be provided various light-insensitive layers such as a protective layer, subbing layer, interlayer, yellow filter layer and antihalation layer, and various auxiliary layers such as a backing layer on the opposite side of the support. A magnetic recording layer can also be imparted.

The silver halide emulsion used in the heat-developable photosensitive material is not particularly limited and can be any of silver chloride, silver chloroiodide, silver chlorobromide, silver chloroiodobromide, silver iodobromide and silver bromide. The silver iodide content is preferably not more than 10 mole %, more preferably not more than 1 mole % and most preferably not more than 0.5 mole %. The silver halide emulsion can be either of the surface latent image type or the internal latent image type. The internal latent image type emulsion can be used as a direct reversal emulsion when combined with a nucleating agent or fogging with light. The silver halide emulsion can be a core-shell emulsion differing in halogen composition between the interior and exterior of the grain or may have different silver halide compositions connected to each other via an epitaxial junction. As for the crystal habit, the silver halide grains may, depending on purpose, be selected from among those of regular crystal form without twinning plane (s), of single twinning-plane form, of multiple parallel twinning-plane form, of multiple nonparallel twinning-plane form, of spherical shape, of potato-shape, of tabular shape with a high aspect ratio, or of a shape that is a composite of two or more of the foregoing shapes. The habit of the twin-crystal grain is discussed on page 163 of Shashin Kogaku no Kiso-Ginen Shashin Hen (Fundamentals of Photographic Engineering—The Book of Silver Salt Photography), Society of Photographic Science of Japan, Corona Co., Ltd. The silver halide grains can be of any size from smaller than an average grain diameter of 0.05 $\mu$m to larger than a projected area diameter of 10 $\mu$m. They are preferably of a grain diameter of 0.1–2 $\mu$m, more preferably of 0.1–0.9 $\mu$m.

Either a monodisperse or polydisperse emulsion with a narrow grain size distribution can be used. For example, the monodisperse emulsion is a silver halide emulsion having a grain size distribution such that 80% or more of all grains by number or weight fall within ±30% of the average grain size. As disclosed in JP-A-1-167743 and JP-A-4-223463, an admixture of two or more monodisperse silver halide emulsions having substantially the same color sensitivity but different grain size can be used to control gradation. The two or more types of emulsion can be mixed together in the same layer or constituted as separate layers. It is also possible to use two or more types of polydisperse silver halide emulsions or a combination of monodisperse and polydisperse emulsions. Methods of preparing silver halide emulsions are described in P. Glafkides, *Chemie et Phisique Photographique*, Paul Montel, 1967, G.F. Duffin, *Photographic Emulsion Chemistry*, The Focal Press,. 1966, and V.L. Zelikman et al., Making and Coating Photographic Emulsion, The Focal Press, 1964.

The formation or physical development step of the silver halide grains can be conducted in the presence of one or more metal salts (including complex salts). Usable metal salts include noble and heavy metal salts of cadmium, zinc, lead, thallium, iridium, platinum, palladium, osmium, rhodium, chromium, ruthenium and rhenium. These compounds can be used singly or in combinations of two or more. The amount of such a compound added is in the range of about $10^{-9}$–$10^{-3}$ mole per mole of silver halide.

Although the silver halide emulsion can be used as it is without being chemically-sensitized, it is generally used after chemical sensitization. The chemical sensitization can be effected by a chalcogen sensitization method such as the sulfur sensitization method, selenium sensitization method or tellurium sensitization method, a noble metal sensitization method using gold, platinum, palladium or the like, or a reduction sensitization method, singly or in combination (as disclosed, for example, in JP-A-3-110555 and JP-A-5-241267). The chemical sensitization can be effected in the presence of a nitrogen-containing heterocyclic compound (as disclosed in JP-A-62-253159). An antifoggant as described later can be added after the completion of chemical sensitization. Specific methods that can be used are described, for example, in JP-A-5-45833 and JP-A-62-40446.

The present invention uses nondiffusible coloring materials capable of releasing diffusible dyes responding positively or negatively to silver development. These coloring materials can be represented by the following general formula (LI):

$$((Dye)_m-Y)_n-Z \tag{LI}$$

wherein Dye represents a diffusible dye moiety, Y represents merely a linkage group, Z represents a group having the property of enabling the imagewise release of a diffusible moiety $(Dye)_m$ –Y in positive or negative response to a latent image formed in the light-sensitive silver halide and, at the same time, rendering the coloring material (LI) itself nondiffusible, m is an integer of from 1 to 5, and n is an integer of 1 or 2. When neither m nor n is 1, a plurality of Dye moieties may be the same or different.

Specific examples of a coloring material of the foregoing formula (LI) include the compounds classified into the following Groups (A) to (D). Additionally, the compounds classified as Groups (A) to (C) have the property of releasing a diffusible dye responding negatively to the development of silver halide, and the compounds classified as Group (D) have the property of releasing a diffusible dye responding positively to the development of silver halide.

The Group (A) includes the dye developers which each contain a hydroquinone developer attached to a dye moiety, as described, e.g., in U.S. Pat. Nos. 3,134,764, 3,362,819, 3,597,200, 3,544,545 and 3,482,972, and JP-B-3-68387. These dye developers are diffusible under an alkaline condition, but become nondiffusible by the reaction with silver halide.

The Group (B) includes, as described, e.g., in U.S. Pat. No. 4,503,137, nondiffusible compounds of the type which have a capability of releasing a diffusible dye under an alkaline condition but lose the capability by reacting with silver halide. As examples of such compounds, mention may be made of the compounds which release diffusible dyes by the intramolecular nucleophilic substitution reaction, as described, e.g., in U.S. Pat. No. 3,980,479; and the compounds which release diffusible dyes by the intramolecular rearrangement reaction of an isooxazolone ring, as described, e.g., in U.S. Pat. No. 4,199,354.

The Group (C) includes, as described, e.g, in U.S. Pat. No. 4,559,290, EP-A2-220746, U.S. Pat. No. 4,783,396, Kokai Giho 87-6199 and JP-A-64-13546, nondiffusible compounds of the type which release diffusible dyes by the reaction with a reducing agent remaining without undergoing oxidation upon development.

As examples of such compounds, mention may be made of the compounds which, after undergoing the reduction, release diffusible dyes by the intramolecular nucleophilic substitution reaction, as described, e.g., in U.S. Pat. Nos. 4,139,379, JP-A-59-185333 and JP-A-57-84453; the compounds which, after undergoing reduction, release diffusible dyes by the intramolecular electron transfer reaction, as described, e.g., in U.S. Pat. No. 4,232,107, JP-A-59-101649, JP-A-61-88257 and RD No. 24,025(1984); the compounds which, after undergoing reduction, release diffusible dyes by the single bond cleavage, as described, e.g., in West German Patent 3,008,588 A, JP-A-56-142530, and U.S. Pat. Nos. 4,343,893 and 4,619,884; the nitro compounds which release diffusible dyes after electron acceptance, as described, e.g., in U.S. Pat. No. 4,450,223; and the compounds which release diffusible dyes after electron acceptance, as described, e.g., in U.S. Pat. No. 4,609,610.

Further, the compounds described in EP-A2-0220746, Kokai Giho 87-6199, U.S. Pat. No. 4,783,396, JP-A-63-

201653, JP-A-63-201654, JP-A-64-13546 and so on, which each have both N—X bond (X represents an oxygen, sulfur or nitrogen atom) and electron-attracting group; the compounds described in JP-A-1-26842, which each have both $SO_2$—X bond (X has the same meaning as the above) and electron-attracting group; the compounds described in JP-A-63-271344, which each have both PO—X bond (X has the same meaning as the above) and electron attracting group; and the compounds described in JP-A-63-271341, which each have both C—X' bond (X' has the same meaning as x, or represents —$SO_2$—) and electron-attracting group are more appropriate for the Group (3) compounds. In addition, the compounds described in JP-A-1-161237 and JP-A-1-161342, which each release a diffusible dye as a result of the cleavage of a single bond caused by the π-bond conjugated with an electron-accepting group after reduction, can also be employed.

Of those compounds, the compounds having both N—X bond (X=O, S or N) and electron-attracting group in each molecule are preferred over the others. Specific examples thereof include Compounds (1)–(3), (7)–(10), (12), (13), (15), (23)–(26), (31), (32), (35), (36), (40), (41), (44), (53)–(59), (64), and (70) described in EP-A2-0220746 or U.S. Pat. No. 4,783,396, Compounds (11)–(23) described in Kokai Giho 87-6199, and Compounds (1)–(84) described in JP-A-64-13546.

The Group (D) includes compounds of the type which can cause reduction in silver halide or an organosilver salt and release diffusible dyes when silver halide or an organosilver salt is reduced thereby (DRR compounds). These compounds have an advantage in that they can prevent images from being stained by oxidative decomposition products of a reducing agent since they do not require any other reducing agents. Typical ones thereof are described, e.g., in U.S. Pat. Nos. 3,928,312, 4,503,312, 4,055,428 and 4,336,322, JP-A-59-65839, JP-A-59-69839, JP-A-53-3819, JP-A-51-104343, RD No. 17465, U.S. Pat. Nos. 3,725,062, 3,728,113 and 3,443,939, JP-A-58-116537, JP-A-57-179840, and U.S. Pat. No. 4,500,626. Specific examples of a DDR compound include the compounds described in columns 22 to 44 of the above-cited U.S Pat. No. 4,500,626. Of these compounds, Compounds (1)–(3), (10)–(13), (16)–(19), (28)–(30), (33)–(35), (38)–(40) and (42)–(64) illustrated in the foregoing U.S. Patent are preferred over the others In addition, the compounds illustrated in columns 37–39 of U.S. Pat. No. 4,639,408 are also useful.

A reducing agent is preferably incorporated in the heat-developable photosensitive material. Usable reducing agents include those known in the field of heat developable light-sensitive materials. Dye-providing compounds that can additionally serve also as reducing agents can also be used. In addition, precursors of reducing agents, which themselves do not have any reducing powder, but acquire it through interaction with a nucleophilic agent or heat in the course of development, can be used. Examples of reducing agents and precursors which can be used in this invention include those disclosed in U.S. Pat. No. 4,500,626, columns 49 and 50, U.S. Pat. No. 4,839,272, U.S. Pat. No. 4,330,617, U.S. Pat. No. 4,590,152, U.S. Pat. No. 5,017,454, U.S. Pat. No. 5,139,919, JP-A-60-140335, pp. 17 and 18, JP-A-57-40245, JP-A-56-138736, JP-A-59-178458, JP-A-59-53831, JP-A-59-182449, JP-A-59-182450, JP-A-60-119555, JP-A-60-128436, JP-A-60-128439, JP-A-60-198540, JP-A-60-181742, JP-A-61-259253, JP-A-62-244044, JP-A-62-131253, JP-A-62-131256, JP-A-64-13456, pp. 40–57, JP-A-1-120553, EP-A-220,746, pp. 78–96, and so on. Various combinations of reducing agents as disclosed in U.S. Pat. No. 3,039,869 can also be used.

When a nondiffusible reducing agent is used, an electron transmitter and/or a precursor thereof can optionally be used in combination therewith in order to accelerate electron transfer between the nondiffusible reducing agent and the developable silver halide. Particular preferable for use are those disclosed in the above cited U.S. Pat. No. 5,139,919 and in EP-A-418,743. Further, a method for stable incorporation in the layers as disclosed in JP-A-2-230143 and JP-A-2-235044 can be preferably used.

The electron transfer agent or precursor thereof can be selected from among the above mentioned reducing agents or precursors thereof. The electron transfer agent or precursor thereof preferably exhibits a greater mobility than the nondiffusing reducing agent (electron donor). Particularly useful electron transfer agents are 1-phenyl-3-pyrazolidones and aminophenols.

The nondiffusing reducing agent (electron donor) used in combination with the electron transfer agent can be selected from among those of the above mentioned reducing agents which substantially do not migrate in the layers constituting photosensitive material. Preferred examples of such nondiffusing reducing agents include hydroquinones, sulfonamidophenols, sulfonamidonaphtholes, compounds described as electron donors in JP-A-53-110827 and U.S. Pat. Nos. 5,032,487, 5,026,634 and 4,839,272, and nondiffusing reducing dye-providing compounds as described later.

Further, an electron donor precursor as disclosed in JP-A-3-160443 can be preferably used.

Moreover, the interlayer and protective layer may have the foregoing reducing agents incorporated therein for various purposes such as prevention of color mixing and improvement of color reproducibility. Specifically, reducing agents as disclosed in EP-A-524,649, EP-A-357,040, JP-A-4-249245, JP-A-2-46450 and JP-A-63-186240 are preferably used. Further, development inhibitor-releasing reducing compounds as disclosed in JP-B-(examined published Japanese patent application)3-63733, JP-A-1-150135, JP-A-2-46450, JP-A-2-64634, JP-A-3-43735 and EP-A-451,833 can be used.

An organic metal salt can be used as an oxidizer in combination with the photosensitive silver halide. Particularly preferred among these organic metal salts are organic silver salts. Examples of organic compounds which can be used to form such an organic silver salt as an oxidizer include, among others, the benzotriazoles and aliphatic acids disclosed in U.S. Pat. No. 4,500,626, columns 52 and 53. Other useful examples of organic compounds include silver acetylene as described in U.S. Pat. No. 4,775,613. Two or more organic silver salts can be used in combination. The above mentioned organic silver salts are preferably used in an amount of 0.01 to 10 mole, more preferably 0.01 to 1 mole per mole of photosensitive silver halide. The sum of the coated amount of photosensitive silver halide and organic silver salt is preferably in the range of 0.05 to 20 $g/m^2$, more preferably 0.1 to 20 $g/m^2$ as calculated in terms of silver.

A hydrophilic binder is preferably used as the binder in the layers comprising the photosensitive material. Examples of such a hydrophilic binder include those described in the above cited Research Disclosures and JP-A-64-13546, pp. 71–75. Specifically, a transparent or semitransparent hydrophilic binder is preferred. Examples of such a transparent or semitransparent hydrophilic binder include proteins such as gelatin and gelatin derivative, natural compounds such as polysaccharides, for example, cellulose derivatives, starch, gum arabic, dextran, and pullulan, and synthetic high molecular compounds such as polyvinyl alcohol, polyvinyl pyrrolidone and acrylamide polymer. Further, a high water absorption polymer as disclosed in U.S. Pat. No. 4,960,681 and JP-A-62-245260, i.e., a homopolymer of vinyl monomer having —COOM or —SO$_3$ M (in which M is a hydrogen atom or alkali metal atom) or copolymer of such vinyl monomers or copolymer of such vinyl monomers with other vinyl monomers (e.g., sodium methacrylate, ammonium methacrylate, or Sumikagel L-5H, a product of Sumitomo Chemical Co., Ltd.) can be used. Two or more of these binders can be used in combination. In particular, a combination of gelatin and the foregoing binders is preferred. Gelatin can be selected according to purpose from the group consisting of lime-treated gelatin, acid-treated gelatin and so-called delimed gelatin having a reduced content of calcium or the like. These gelatins can be preferably used in combination.

The coverage rate of the binder is preferably not more than 20 g/m$^2$, more preferably not more than 10 g/m$^2$.

The heat-developable photosensitive material preferably includes a base or its precursor for the purpose of promoting the silver development and the dye forming reaction. Known precursors of bases include salts formed by organic acids and bases which undergo decarboxylation upon heating, and compounds which release amines by intramolecular nucleophilic substitution reaction, Lossen rearrangement or Beckmann rearrangement. Specific examples of such precursors of basis are described in U.S. Pat. Nos. 4,514,493 and 4,657,848 and Kochi Gijutsu No. 5, pp. 55–86 (published Mar. 22, 1991, by Azutec Company Inc.). Otherwise, the bases can be produced by the method of combining a base metal compound slightly soluble in water and a compound capable of undergoing complexation reaction (a complexing compound) with metal ions constituting the base metal compound in water as a medium. This method is disclosed in EP-A-210,660 and U.S. Pat. No. 4,740,445 discussed later.

A thermal solvent can be added to the heat-developable photosensitive material for the purpose of promoting heat development. Examples of thermal solvent include the polar organic compounds described in U.S. Pat. Nos. 3,347,675 and 3,667,959. More specifically, amide derivatives (such as benzamide), urea derivatives (such as methyl urea and ethylene urea), sulfonamide derivatives (such as the compounds described in JP-B-1-40974 and JP-B-4-13701), polyol compounds (such as sorbitols) and polyethylene glycols. When the thermal solvent is insoluble in water, it is preferably used in the form of a solid dispersion. The thermal solvent can be added to either photosensitive layers or light-insensitive layers depending on the purpose of the addition.

As the support for the heat-developable photosensitive material there is used one which can withstand processing temperatures. In general, the photographic supports, including paper and synthetic polymer films described in *Shashin Kogaku no Kiso-Ginen Shashin Hen* (*Fundamentals of Photographic Engineering—The Book of Silver Salt Photography*), Society of Photographic Science of Japan, Corona Co., Ltd., 1979, pp. 223–240, can be used. Specific examples of such support materials include polyethylene terephthalate, polyethylene naphthalate, polycarbonate, polyvinyl chloride, polystyrene, polypropylene, polyimide and cellulose (e.g., triacetyl cellulose). These support materials can be used alone, or a paper or film laminated with a synthetic polymer on one or both sides can be used as the support. Other supports which can be employed include those described, for example, in JP-A-62-253159, pp. 29–31, JP-A-1-161236, pp. 14–17, JP-A-63-316848, JP-A-2-22651, JP-A-3-56955, and U.S. Pat. No. 5,001,033.

When the requirement for anticurling property is particularly high, the support of the photosensitive material is preferably selected from among those described in JP-A-6-41281, JP-A-6-43581, JP-A-6-51426, JP-A-6-51437, JP-A-6-51442, JP-A-6-82926, JP-A-6-82960, JP-A-6-123937, JP-A-6-266050, JP-A-6-82959, JP-A-6-67346, JP-A-6-202277, JP-A-6-175282, JP-A-6-118561, JP-A-7-219129 and JP-A-7-219144. A support constituted mainly of a syndiotactic styrene polymer can also be used to advantage.

Photographic additives which can be used in the heat-developable photosensitive material are described in Research Disclosure (RD) issue Nos. 17643, 18716 and 307105. The relevant portions are shown in the following table.

| Additives | RD 17643 | RD 18176 | RD 307105 |
|---|---|---|---|
| 1. Chemical Sensitizer | p. 23 | p. 648, right column | p. 866 |
| 2. Sensitivity Rising Agent | | p. 648, right column | |
| 3. Spectral Sensitizer, and Supersensitizing Agent | pp. 23–24 | p. 648, right column, to p. 649, right column | pp. 866–868 |
| 4. Brightening Agent | p. 24 | p. 648, right column | p. 868 |
| 5. Antifoggant and Stabilizer | pp. 24–26 | p. 649, right column | pp. 868–870 |
| 6. Light Absorbent, Filter Dye, and UV Absorbent | pp. 25–26 | p. 649, right column, to p. 650, left column | p. 873 |
| 7. Dye Image Stabilizer | p. 25 | p. 650, left column | p. 872 |
| 8. Hardener | p. 26 | p. 651, left column | pp. 872–875 |
| 9. Binder | p. 26 | p. 651, left column | pp. 873–874 |
| 10. Plasticizer, and Lubricant | p. 27 | p. 650, right column | p. 876 |
| 11. Coating Aid, and Surfactant | pp. 26–27 | p. 650, right column | pp. 875–876 |
| 12. Antistatic Agent | p. 27 | p. 650, right column | pp.. 876–877 |
| 13. Matting Agent | | | pp. 878–879 |

The processing material used for development-processing the aforesaid heat-developable photosensitive material will now be explained. The processing material comprises a layer (processing layer) including a mordant for capturing dye dispersed from the heat-developable photosensitive material during heat development. The processing layer can be formed as a coating on a separate support from that of the photosensitive material or on the same support as the photosensitive material. It is preferably formed on a separate support. Conventional mordants known in the field of photography can be used. Specific examples include the mordants disclosed in U.S. Pat. No. 4,500,626, columns 58 and 59, JP-A-61-88256, pp. 32–41, JP-A-62-244043 and JP-A-62-244036. Further, the dye-accepting high molecular compounds disclosed in U.S. Pat. No. 4,463,079 can be used. The binder of the processing layer can be the same as that used in the photosensitive material. Provision of a protective layer on the processing layer is advantageous.

The processing layer of the processing material can include a base required for development or a precursor of the base. When, for example, the base is produced by adopting the earlier mentioned method of combining a base metal compound slightly soluble in water and a complexing compound capable of undergoing complexation reaction with metal ions constituting the base metal compound in water as a medium, the base can be produced by adding the base metal compound slightly soluble in water to a constituent layer of the heat-developable photosensitive material, adding the complexing compound to the processing layer of the processing material, and at the time of heat development superimposing the photosensitive material and the photosensitive material after imparting a small amount of water to one of them. The processing layer of the processing material can also include a thermal solvent for the purpose of promoting development or promoting removal of unnecessary substances.

The heat development will now be explained. The development of the heat-developable photosensitive material of this invention is conducted by superimposing the processing material on the surface of the photosensitive layer of the exposed heat-developable photosensitive material and heating the two materials in this state to develop the exposed silver halide. Diffusible dye is released in response to or in counter response to this silver development and a color image is formed on the heat-developable photosensitive material owing to migration of the diffusible dye to the processing material where it is fixed. The heating temperature in the heat development is preferably in the approximate range of 50 to 250° C., more preferably in the range of 60 to 150° C.

In order to accelerate development, transfer of processing materials and dispersion of unnecessary materials, a solvent can be used in the heat development step. This is described in detail in U.S. Pat. Nos. 4,704,245 and 4,740,445, and JP-A-61-238056. Examples of usable solvents include water, a basic aqueous solution containing an inorganic alkaline metal salt or organic base, a low-boiling solvent, and a mixture of a low-boiling solvent and water or the aforesaid basic aqueous solution. Moreover, a surface active agent, an antifoggant, a complexing compound capable of undergoing complexation reaction with a scarcely soluble metal salt, a mildew-proofing agent, a bactericide, etc. can be added to these solvents. It suffices to use the solvent in an amount by weight equal to or less than the weight of a volume thereof equivalent to the maximum swelling volume of all coated layers. In this method the heating temperature is preferably not higher than the boiling point of the solvent used. For instance, when the solvent is water, the heating temperature is preferably 50 to 100° C.

Water is preferably used as the solvent employed in the heat development process. Any commonly used water can be used. Specific examples include distilled water, tap water, well water, and mineral water. The water can be used up or the unused portion be recycled. The water is imparted to either or both of the heat-developable photosensitive material and the processing material. The method of imparting the water can, for example, be that disclosed JP-A-62-253159, p. 5,. or JP-A-63-85544. Alternatively, the solvent sealed in microcapsules or in the form of a hydrate can be incorporated in either or both of the photosensitive material and the processing material beforehand. As disclosed in JP-A-63-85544, the temperature of the imparted water can be between 30 and 60° C.

When heat development is conducted using water as the solvent, it is effective to adopt a method disclosed in EP-A-210,660 or U.S. Pat. No. 4,740,445 of producing the base by combining a base metal compound slightly soluble in water and a compound capable of undergoing complexation reaction (a complexing compound) with metal ions constituting the base metal compound in water as a medium. In this case, it is preferable from the point of freshness-keeping property to add the base metal compound slightly soluble in water to the photosensitive material and complexing compound to the processing material.

(1-2) Second photosensitive material

The heat-developable photosensitive material to be explained next comprises a support provided thereon with at least three photosensitive layers which are photosensitive in different wavelength regions, each of the layers comprising at least photosensitive silver halide grains, a binder, a color developing agent and a dye-providing coupler, the dyes formed from the oxidized color developing agent and the dye-providing coupler being different in hue. The developing agent capable of reacting with the dye-providing coupler is preferably incorporated in the photosensitive material.

The three photosensitive layers are each preferably sensitive to one of blue light, green light and red light. The layers are ordinarily disposed in the order of the red-sensitive layer, the green-sensitive layer and the blue-sensitive layer from the support side. Different orders are, however, possible according purpose. An arrangement as set out in column 162 of JP-A-7-152129 can be adopted, for example. Although the color sensitivities of the photosensitive layers are substantially the same, they can be divided into a plurality of silver halide emulsion layers with different sensitivities.

While the relationship between the spectral sensitivity of each layer and the hue of the coupler is not restricted, use of cyan coupler in the red-sensitive layer, magenta coupler in the green-sensitive layer and yellow coupler in the blue-sensitive layer facilitates image writing to conventional color paper and the like.

In addition to the silver halide emulsion layer, there can be provided various light-insensitive layers such as a protective layer, subbing layer, interlayer, yellow filter layer and antihalation layer, and various auxiliary layers such as a backing layer on the opposite side of the support. A magnetic recording layer can also be imparted.

The couplers used in the second photosensitive material can be four-equivalent or two-equivalent couplers. Their nondiffusible groups can have the form of a polymer chain. Specific examples of such couplers are described in detail in T.H. James, *The Theory of the Photographic Process,* 4th Ed., pp. 291 to 334 and 354 to 361, JP-A-58-123533, JP-A-58-149046, JP-A-58-149047, JP-A-59-111148, JP-A-59-124399, JP-A-59-174835, JP-A-59-231539, JP-A-59-231540, JP-A-60-2950, JP-A-60-2951, JP-A-60-14242, JP-A-60-23474, JP-A-60-66249, JP-A-8-110608, JP-A-8-146552 and JP-A-8-146578.

For the purpose of reducing development time, enhancing sensitivity, increasing image density and the like, it is preferable to incorporate in the photosensitive material a color developing agent which, when oxidized by silver development, produces dyes by coupling with the aforesaid couplers.

For example, a combination of a p-phenylenediamine developing agent with phenol or active methylene coupler, as described in U.S. Pat. No. 3,531,256, and a combination of a p-aminophenol developing agent with active methylene coupler, as described in U.S. Pat. No. 3,761,270, can be used. Combinations of sulfonamidophenol with four-equivalent couplers as described, for example, in U.S. Pat. No. 4,021,240 and JP-A-60-128438, are preferable combinations in light of their excellent freshness-keeping property when incorporated in the photosensitive material. The color developing agent can be incorporated in the photosensitive material in the form of a precursor thereof. Examples of such precursor include the indoaniline compounds described in U.S. Pat. No. 3,342,597, the Schiff base type compounds described in U.S. Pat. No. 3,342,599, RD Nos. 14850 and 15159, the aldol compounds described in RD No. 13924, the metal complexes described in U.S. Pat. No. 3,719,492 and the urethane compounds described in JP-A-53-135628. In addition, the combinations of couplers with the sulfonamidophenol developing agent described in Japanese Patent Application No. 7-180568, and the combinations of couplers with the hydrazine developing agent described in Japanese Patent Application Nos. 7-49287 and 7-63572 can be preferably used in the second photosensitive material.

The silver halide grains and the dye-providing coupler can be incorporated in the same layer as the developing agent or, if they react with each other, they can be incorporated in different layers. For example, when the developing agent and the silver halide grains are contained in different layers, the freshness-keeping property of the photosensitive material is enhanced.

An organic metal salt can be used as an oxidizer in combination with the photosensitive silver halide. Particularly preferred among these organic metal salts are organic silver salts. Examples of organic compounds which can be used to form such an organic silver salt as an oxidizer include, among others, the benzotriazoles and aliphatic acids disclosed in U.S. Pat. No. 4,500,626, columns 52 and 53. Other useful examples of organic compounds include silver acetylene as described in U.S. Pat. No. 4,775,613. Two or more of organic silver salts can be used in combination. The above mentioned organic silver salts are preferably used in an amount of 0.01 to 10 mole, more preferably 0.01 to 1 mole per mole of photosensitive silver halide. The sum of the coated amount of photosensitive silver halide and organic silver salt is preferably in the range of 0.05 to 10 $g/m^2$, more preferably 0.1 to 4 $g/m^2$ as calculated in terms of silver.

A hydrophilic binder is preferably used as the binder in the layers comprising the photosensitive material. Examples of such a hydrophilic binder include those described in the above cited Research Disclosures and JP-A-64-13546, pp. 71–75. Specifically, a transparent or semitransparent hydrophilic binder is preferred. Examples of such a transparent or semitransparent hydrophilic binder include proteins such as gelatin and gelatin derivative, natural compounds such as polysaccharides, for example, cellulose derivatives, starch, gum arabic, dextran, and pullulan, and synthetic high molecular compounds such as polyvinyl alcohol, polyvinyl pyrrolidone and acrylamide polymer. Further, a high water absorption polymer as disclosed in U.S. Pat. No. 4,960,681 and JP-A-62-245260, i.e., a homopolymer of vinyl monomer having —COOM or —$SO_3$ M (in which M is a hydrogen atom or alkali metal atom) or copolymer of such vinyl monomers or copolymer of such vinyl monomers with other vinyl monomers (e.g., sodium methacrylate, ammonium methacrylate, or Sumikagel L-5H, a product of Sumitomo Chemical Co., Ltd.) can be used. Two or more of these binders can be used in combination. In particular, a combination of gelatin and the foregoing binders is preferred. Gelatin can be selected according to purpose from the group consisting of lime-treated gelatin, acid-treated gelatin and so-called delimed gelatin having a reduced content of calcium or the like. These gelatins can be preferably used in combination.

When a nondiffusible developing agent is used, an electron transmitter and/or a precursor thereof can optionally be used in combination therewith in order to accelerate electron transfer between the nondiffusible developing agent and the developable silver halide. Particular preferable for use are those disclosed in the above cited U.S. Pat. No. 5,139,919 and in EP-A-418,743. Further, a method for stable incorporation in the layers as disclosed in JP-A-2-230143 and JP-A-2-235044 can be preferably used. The electron transfer agent or precursor thereof can be selected from among the above mentioned developing agent or precursors thereof. The electron transfer agent or precursor thereof preferably exhibits a greater mobility than the nondiffusing developing agent (electron donor). Particularly useful electron transfer agents are 1-phenyl-3-pyrazolidones and aminophenols. Further, an electron donor precursor as disclosed in JP-A-3-160443 can be preferably used.

Moreover, the interlayer and protective layer may have the foregoing reducing agents incorporated therein for various purposes such as prevention of color mixing and improvement of color reproducibility. Specifically, reducing agents as disclosed in EP-A-524,649, EP-A-357,040, JP-A-4-249245, JP-A-2-46450 and JP-A-63-186240 are preferably used. Further, development inhibitor-releasing reducing compounds as disclosed in JP-B-3-63733, JP-A-1-150135, JP-A-2-46450, JP-A-2-64634, JP-A-3-43735 and EP-A-451,833 can be used.

The heat-developable photosensitive material preferably includes a base or its precursor for the purpose of promoting the silver development and the dye forming reaction. Known precursors of bases include salts formed by organic acids and bases which undergo decarboxylation upon heating, and compounds which release amines by intramolecular nucleophilic substitution reaction, Lossen rearrangement or Beckmann rearrangement. Specific examples of such precursors of basis are described in U.S. Pat. Nos. 4,514,493 and 4,657,848 and Kochi Gijutsu No. 5, pp. 55–86 (published Mar. 22, 1991, by Azutec Company Inc.). Otherwise, the bases can be produced by the method of combining a base metal compound slightly soluble in water and a compound capable of undergoing complexation reaction (a complexing compound) with metal ions constituting the base metal compound in water as a medium. This method is disclosed in EP-A-210,660 and U.S. Pat. No. 4,740,445 discussed later.

A thermal solvent can be added to the heat-developable photosensitive material for the purpose of promoting heat development. Examples of thermal solvent include the polar organic compounds described in U.S. Pat. Nos. 3,347,675 and 3,667,959. More specifically, amide derivatives (such as benzamide), urea derivatives (such as methyl urea and ethylene urea), sulfonamide derivatives (such as the compounds described it JP-B-1-40974 and JP-B-4-13701), polyol compounds (such as sorbitols) and polyethylene glycols. When the thermal solvent is insoluble in water, it is preferably used in the form of a solid dispersion. The thermal solvent can be added to either photosensitive layers or light-insensitive layers depending on the purpose of the addition.

As the support for the heat-developable photosensitive material there is used one which can withstand processing temperatures. In general, the photographic supports, including paper and synthetic polymer films described in *Shashin Kogaku no Kiso-Ginen Shashin Hen (Fundamentals of Photographic Engineering—The Book of Silver Salt Photography)*, Society of Photographic Science of Japan, Corona Co., Ltd., 1979, pp. 223–240, can be used. Specific examples of such support materials include polyethylene terephthalate, polyethylene naphthalate, polycarbonate, polyvinyl chloride, polystyrene, polypropylene, polyimide and cellulose (e.g., triacetyl cellulose). These support materials can be used alone, or a paper or film laminated with a synthetic polymer on one or both sides can be used as the support. Other supports which can be employed include those described, for example, in JP-A-62-253159, pp. 29–31, JP-A-1-161236, pp. 14–17, JP-A-63-316848, JP-A-2-22651, JP-A-3-56955, and U.S. Pat. No. 5,001,033.

When the requirement for anticurling property is particularly high, the support of the photosensitive material is preferably selected from among those described in JP-A-6-41281, JP-A-6-43581, JP-A-6-51426, JP-A-6-51437, JP-A-6-51442, JP-A-6-82926, JP-A-6-82960, JP-A-6-123937, JP-A-6-266050, JP-A-6-82959, JP-A-6-67346, JP-A-6-202277, JP-A-6-175282, JP-A-6-118561, JP-A-7-219129 and JP-A-7-219144. A support constituted mainly of a syndiotactic. styrene polymer can also be used to advantage.

Photographic additives which can be used in the heat-developable photosensitive material are described in Research Disclosure (RD) issue Nos. 17643, 18716 and 307105. The relevant portions are shown in the following table.

| Additives | RD 17643 | RD 18176 | RD 307105 |
|---|---|---|---|
| 1. Chemical Sensitizer | p. 23 | p. 648, right column | p. 866 |
| 2. Sensitivity Rising Agent | | p. 648, right column | |
| 3. Spectral Sensitizer, and Supersensitizing Agent | pp. 23–24 | p. 648, right column, to p. 649, right column | pp. 866–868 |
| 4. Brightening Agent | p. 24 | p. 648, right column | p. 868 |
| 5. Antifoggant and Stabilizer | pp. 24–26 | p. 649, right column | pp. 868–870 |
| 6. Light Absorbent, Filter Dye, and UV Absorbent | pp. 25–26 | p. 649, right column, to p. 650, left column | p. 873 |
| 7. Dye Image Stabilizer | p. 25 | p. 650, left column | p. 872 |
| 8. Hardener | p. 26 | p. 651, left column | pp. 872–875 |
| 9. Binder | p. 26 | p. 651, left column | pp. 873–874 |
| 10.. Plasticizer, and Lubricant | p. 27 | p. 650, right column | p. 876 |
| 11. Coating Aid, and Surfactant | pp. 26–27 | p. 650, right column | pp. 875–876 |
| 12. Antistatic Agent | p. 27 | p. 650, right column | pp. 876–877 |
| 13. Matting Agent | | | pp. 878–879 |

The processing material used for development-processing the aforesaid photosensitive material will now be explained. The processing material is constituted as a processing layer provided on a support different from that of the photosensitive material so that the during heat development it can serve to shut out air, prevent vaporization of constituents from the photosensitive material, supply processing materials to the photosensitive material, remove photosensitive material constituents no longer needed after development (such as yellow filter dye and antihalation dye) and remove unnecessary components generated during development. During heat development the processing material is superimposed on the photosensitive surface of the photosensitive material and heated. The support and binder used in the processing material can be of the same types as used in the photosensitive material.

The processing layer of the processing material can be added with a mordant for removing the aforesaid dyes and other purposes. Conventional mordants known in the field of photography can be used. Examples include the mordants disclosed in U.S. Pat. No. 4,500,626, columns 58 and 59, JP-A-61-88256, pp. 32–41, JP-A-62-244043 and JP-A-62-244036. Further, the dye-accepting high molecular compounds disclosed in U.S. Pat. No. 4,463,079 can be used.

The processing layer of the processing material can include a base required for development or a precursor of the base. When, for example, the base is produced by adopting the earlier mentioned method of combining a base metal compound slightly soluble in water and a complexing compound capable of undergoing complexation reaction with metal ions constituting the base metal compound in water as a medium, the base can be produced by adding the base metal compound slightly soluble in water to a constituent layer of the heat-developable photosensitive material, adding the complexing compound to the processing layer of the processing material, and at the time of heat development superimposing the photosensitive material and the photosensitive material after imparting a small amount of water to one of them. The processing layer of the processing material can also include a thermal solvent for the purpose of promoting development or promoting removal of unnecessary substances.

The heat development will now be explained. The development of the heat-developable photosensitive material of this invention is conducted by superimposing the processing material on the surface of the photosensitive layer of the exposed heat-developable photosensitive material and heating the two materials in this state to develop the exposed silver halide. Diffusible dye is released in response to or in counter response to this silver development and a color image is formed on the heat-developable photosensitive material owing to migration of the diffusible dye to the processing material where it is fixed. The heating temperature in the heat development is preferably in the approximate range of 50 to 250° C., more preferably in the range of 60 to 150° C.

In order to accelerate development, transfer of processing materials and dispersion of unnecessary materials, a solvent can be used in the heat development step. This is described in detail in U.S. Pat. Nos. 4,704,245 and 4,740,445, and JP-A-61-238056. Examples of usable solvents include water, a basic aqueous solution containing an inorganic alkaline metal salt or organic base, a low-boiling solvent, and a mixture of a low-boiling solvent and water or the aforesaid basic aqueous solution. Moreover, a surface active agent, an antifoggant, a complexing compound capable of undergoing complexation reaction with a scarcely soluble metal salt, a mildew-proofing agent, a bactericide, etc. can be added to these solvents. It suffices to use the solvent in an amount by weight equal to or less than the weight of a volume thereof equivalent to the maximum swelling volume of all coated layers. In this method the heating temperature is preferably not higher than the boiling point of the solvent used. For instance, when the solvent is water, the heating temperature is preferably 50 to 100° C.

Water is preferably used as the solvent employed in the heat development process. Any commonly used water can be used. Specific examples include distilled water, tap water, well water, and mineral water. The water can be used up or the unused portion be recycled. The water is imparted to either or both of the heat-developable photosensitive material and the processing material. The method of imparting the water can, for example, be that disclosed JP-A-62-

253159, p. 5, or JP-A-63-85544. Alternatively, the solvent sealed in microcapsules or in the form of a hydrate can be incorporated in either or both of the photosensitive material and the processing material beforehand. As disclosed in JP-A-63-85544, the temperature of the imparted water can be between 30 and 60° C.

When heat development is conducted using water as the solvent, it is effective to adopt a method disclosed in EP-A-210,660 or U.S. Pat. No. 4,740,445 of producing the base by combining a base metal compound slightly soluble in water and a compound capable of undergoing complexation reaction (a complexing compound) with metal ions constituting the base metal compound in water as a medium. In this case, it is preferable from the point of freshness-keeping property to add the base metal compound slightly soluble in water to the photosensitive material and complexing compound to the processing material.

(1-3) Third photosensitive material

Another photosensitive material preferable for use in the method and system of this invention will now be described. The development processing of the photosensitive material will also be explained. The example explained in the following is of a photosensitive material containing color developing agent and couplers which exhibits extremely high stability when no base is present. It derives from the discovery that when the photosensitive material of this type is heat-developed in the presence of a small amount of water using a processing material containing a base and/or a base precursor so as to form an image based on non-diffusible dyes on the photosensitive material, the image obtained exhibits excellent graininess and sharpness and the further discovery that when data of this image are output to another recording material such as color paper or heat-developable color printing material, a highly superior color image can be obtained. Since the photosensitive material is isolated from the base until development, it provides the high preservability demanded of a photographic material while simultaneously enabling rapid development.

Moreover, when incorporated with a colorless color developing agent and coupler, this photosensitive material is advantageous over the case of using a dye-release type compound in point of sensitivity, which is a quality of extreme importance in a photographic material.

The silver halide emulsion used in the heat-developable photosensitive material can be any of silver iodobromide, silver bromide, silver chlorobromide, silver chloroiodide, silver chloride or silver chloroiodobromide. silver chloroiodide, silver chlorobromide or silver chloroiodobromide. The silver halide grains preferably have a size expressed as the diameter of a sphere of the same volume in the range of 0.1 to 2 $\mu$m, more preferably 0.2 to 1.5 $\mu$m.

The silver halide grains can be of cubic, octahedral, tetradecahedral or other regular form, or be in the form of hexagonal or rectangular plates. Among these, it is preferable to use tabular grains with an aspect ratio of not less than 2, more preferably not less than 8 and most preferably not less than 20. Preferably there is used an emulsion in which such tabular grains account for not less that 50%, more preferably not less than 80%, most preferably not less than 90% of the projected area of the grains.

In addition, silver halide grains of a thickness smaller than 0.07 $\mu$m and having still higher aspect ratios, such as described in, for example, U.S. Pat. Nos. 5,494,789, 5,503, 970, 5,503,971 and 5,536,632, can also be used to advantage.

Other silver halide grains that can be preferably used include the high chloride silver halide tabular grains having the (111) plane as the major surface, as described, for example, in U.S. Pat. Nos. 4,400,463, 4,713,323 and 5,217, 858, and the high chloride silver halide tabular grains having the (100) plane as the major surface, as described, for example, in U.S. Pat. Nos. 5,264,337, 5,292,632 and 5,310, 635.

Examples of actual application of these silver halide grains are set out, for example, in Japanese Patent Application Nos. 8-46822, 8-97344 and 8-238672.

The emulsion is preferably subjected to ordinary chemical sensitization and spectral sensitization.

The chemical sensitization can be effected by a chalcogen sensitization method using a sulfur, selenium or tellurium compound, a noble metal sensitization method using gold, platinum, iridium or the like, or a so-called reduction sensitization method in which high sensitivity is obtained by using a compound with appropriate reducing power to introduce a reducing silver nucleus in the course of grain formation. These methods can be used singly or in combination.

The spectral sensitization is conducted by use of one or a combination of two or more so-called spectral sensitizing dyes. These dyes, which adhere to and sensitize the silver halide grain to their own absorption wavelength, include cyanine dye, melocyanine dye, composite cyanine dye, composite melocyanine dye, holopolar dye, hemicyanine dye, styryl dye and hemioxonol dye. They are preferably used together with a strong color sensitizing agent.

For such purposes as fog prevention and enhancement of stability during storage, the silver halide emulsion is preferably added with various stabilizers including such nitrogen-containing heterocyclic compounds as azaindenes, triazoles, tetrazoles, purines and such mercapto compounds as mercaptotetrazoles, mercaptotriazoles, mercaptoimidazoles and mercaptothiazoles.

The photographic additives for silver halide emulsion described in RD Nos. 17643 (December 1978), 18716 (November 1979), 307105 (November 1989) and 38957 (September 1996) can be preferably used.

The photosensitive silver-halide is preferably used in an amount in the range of 0.05 to 20 g/m$^2$, more preferably 0.1 to 10 g/m$^2$ as calculated in terms of silver.

A hydrophilic binder is preferably used in the photosensitive material. Examples of such a hydrophilic binder are described in the above cited Research Disclosures and JP-A-64-13546, pp. 71–75. Preferable among these are gelatin and a combination of gelatin and another hydrophilic binder such as polyvinyl alcohol, denatured polyvinyl alcohol, cellulose derivative and acrylamide polymer. The coverage rate of the binder is preferably 1 to 20 g/m$^2$, more preferably 2 to 15 g/m$^2$, most preferably 3 to 12 g/m$^2$. Of this, gelatin preferably accounts for 50 to 100%, more preferably 70 to 100%.

Usable color developing agents include p-phenylenediamine and p-aminophenols. Still more preferable color developing agents include the sulfonoamidophenols described in JP-A-8-110608, JP-A- 8-122994 and JP-A-8-146578 and Japanese Patent Application Nos. 7-180568 and 8-251894 (general formula (1) above), the sulfonylhydrazines described in EP-A-545,491 and JP-A-8-166664 and 8-227131 (general formula (2) above), the carbamoylhydrazines described in Japanese Patent Application No. 7-334211 (general formula (4) above), the sulfonylhydrazones described in JP-A- 8-202002 (general formula (3) above), and the carbamoylhydrazones described in Japanese Patent Application No. 7-60110 (general formula (5) above).

One or a combination of two or more types of color developing agent are used, preferably in a total amount of 0.05 to 20 mmol/m$^2$, more preferably 0.1 to 10 mmol/m$^2$.

Couplers which form dyes by coupling reaction with the oxidized color developing agent are used in the photosensitive material. Preferable examples of the coupler include the compounds generally referred to as active methylene, 5-pyrazolone, pryrazolazole, phenol, naphthole and pyrrolotriazole. Specific examples that can be preferably used are cited in RD No. 38957 (September 1996), pp. 616–624. Particularly preferable are pryrazolazole couplers as described in JP-A-8-110608 and pyrrolotriazole couplers as described, for example, in JP-A-8-122994 and Japanese Patent Application No. 8-45564.

These couplers are preferably used in 0.05 to 10 mmol/m$^2$, more preferably 0.1 to 5 mmol/m$^2$.

The photosensitive material can contain a colored coupler to compensate for unnecessary absorption of formed dye, a compound (which may be a coupler) which reacts with the oxidized developing agent to release residue of photographically useful compounds such as development inhibitor, and the like.

The photosensitive material ordinarily comprises three or more photosensitive layers which differ in color sensitivity. While the photosensitive layers include at least one containing a silver halide emulsion layer, they are typically constituted as multiple silver halide emulsion layers which have substantially the same color sensitivity but different photosensitivity. Each photosensitive is a unit layer sensitive to blue light, green light or red light. In a multilayer silver halide color photographic film, the unit photosensitive layers are ordinarily disposed in the order of the red-sensitive layer, the green-sensitive layer and the blue-sensitive layer from the support side. Depending on purpose, however, they can be disposed in reverse order from the foregoing or with layers having the same color sensitivity sandwiching a different photosensitive layer.

The total photosensitive layer thickness is preferably 1 to 20 $\mu$m, more preferably 3 to 15 $\mu$m.

The coupler can be incorporated in the same photosensitive layer as the silver halide and the color developing agent, or in a different layer. In addition to the photosensitive layers, there can be provided various light-insensitive layers such as a subbing layer, interlayer, yellow filter layer and antihalation layer, and a backing layer can be provided on the opposite side of the support. The thickness of all layers formed on the photosensitive layer side is preferably 3 to 25 $\mu$m, more preferably 5 to 20 $\mu$m.

The photosensitive material can for various purposes be incorporated with a hardener, surface active agent, photographic stabilizer, antistatic agent, slipping agent, matting agent, latex, formalin scavenger, dye, UV absorbing agent and the like. Specific examples are set out, for example, in the aforementioned RDs and Japanese Patent Application No. 8-30103. Particularly preferable antistatic agents include fine particles of such metal oxides as ZnO, TiO$_2$, SnO$_2$, Al$_2$O$_3$, In$_2$O$_3$, SiO$_2$, MgO, BaO, MoO$_3$ and V$_2$O$_5$.

The photographic supports described in *Shashin Kogaku no Kiso-Ginen Shashin Hen* (*Fundamentals of Photographic Engineering—The Book of Silver Salt Photography*), Society of Photographic Science of Japan, Corona Co., Ltd., 1979, pp. 223–240, can be preferably used as the support of the photosensitive material. Specific examples of such support materials include polyethylene terephthalate, polyethylene naphthalate, polycarbonate, syndiotactic polystyrene and cellulose (e.g., triacetyl cellulose). Also preferable are copolymer of naphthalenedicarboxylic acid unit, ethyleneglycol unit and terephthalic acid unit, polymer blend of polyethylene terephthalate and polyethylene naphthalate.

These supports can be improved in optical properties and physical properties by heat treatment (crystallization and orientation control), uniaxial or biaxial stretching (orientation control), blending with various polymers, surface treatment and the like.

A support having a magnetic recording layer as described, for example, in JP-A-4-124645, JP-A-5-40321, JP-A-6-35092 and JP-A-6-31875 is preferably used and recorded with photographic information and the like.

The surface of the photosensitive material support is preferably coated with a waterproofing polymer as described in JP-A-8-292514.

A particularly preferable polyester support for a photosensitive material having the aforesaid magnetic recording layer is described in detail in *Kokai Giho* 94-6023 (Hatsumei Kyokai; Mar. 15, 1994).

The thickness of the support is preferably 5 to 200 $\mu$m, more preferably 40 to 120 $\mu$m.

The exposed photosensitive material is developed using a separate processing material. The processing material includes at least a base and/or a base precursor.

Most preferably, the base is produced by the method described in EP-A-210,660 and U.S. Pat. No. 4,740,445, namely, by combining a base metal compound slightly soluble in water and a compound capable of undergoing complexation reaction with metal ions constituting the base metal compound in water as a medium. In this case, it is preferable to add the base metal compound slightly soluble in water to the photosensitive material and the complexing compound to the processing material, but the reverse is also possible. The preferable combination of compounds for use in the processing material is to use fine particles of zinc hydroxide in the photosensitive material and a picolate such as guanidine picolate.

The processing layer can be added with a mordant. A polymer mordant is preferable. As described in JP-A-7-332454, the processing material can be incorporated with a physical development nucleus such as colloidal silver or palladium sulfate and a silver halide solvent such as hydantoin so that silver halide in the photosensitive material is made soluble and adheres to the processing material simultaneously with development.

In addition, the processing material can be incorporated with a development stopper, a printout preventer and the like.

Aside from the processing layer, the processing material can also have a protective layer, a subbing layer, a backing layer and other auxiliary layers.

The processing material is preferably constituted as a continuous web provided with the processing layer, supplied by a feed-out roller, and taken up by another roller without being cut after it is used for processing. An example of this mode of use is described in JP-A-7-240445.

The support of the processing material is not particularly limited. It can be plastic film as described regarding the photosensitive material, or paper. The thickness of the support is preferably 4 to 120 $\mu$m, more preferably 6 to 70 $\mu$m.

As described in Japanese Patent Application No. 8-52586, a film vapor-deposited with aluminum can also be preferably used as the support.

When the photosensitive material is developed, the photosensitive material and the processing material are superimposed with the photosensitive layers of the photosensitive material and the processing layer of the processing material facing each other in the presence of 0.1 to 1 time the amount of water required to cause maximum swelling of all coating layers of the photosensitive material and the processing material other than their backing layers, whereafter the superimposed photosensitive material and the processing material are heated to a temperature between 60 and 100° C. and maintained in this temperature range for 5 to 60 seconds.

Any commonly used water can be used. Specific examples include distilled water, ion-exchanged water, tap water, and mineral water. The water can be used up or be the unused portion can be recycled. The water is imparted to either or both of the heat-developable photosensitive material and the processing material. Any of these waters can preferably be added with a small amount of scale preventer or antiseptic for preventing fouling or be filtered by an active carbon filter or an ion-exchange filter and recycled.

The amount of water required for maximum swelling volume can be determined by immersing the photosensitive material and processing material coated with the layers whose water requirement is to be measured in the water to be used, measuring the layer thickness after thorough swelling, calculating the maximum swelling amount, and subtracting the weight of the coating layers. An example of this swelling degree measurement method is described in *Photographic Science Engineering,* Vol. 16, 1972, p. 449.

(2) Exposure

The means for exposing the photosensitive material will now be explained.

Like conventional photographic film, the photosensitive materials described in the foregoing can be processed into a desired photographic film format by cutting and perforation. As in the case of 135 film and the like, therefore, these photosensitive materials can be used to take photographs with a single lens reflex camera such as a Nikon F4 or with a lens-fitted photographic film unit described in JP-B-2-32615, JU-B-(examined published Japanese utility model application)3-39784.

For this, it suffices to load a film magazine (or cartridge) containing the photographic film into the camera or lens-fitted photographic film unit or, in the case of a lens-fitted photographic film unit, to load the film directly, as described in Dutch Patent No. 6,708,489.

The lens-fitted photographic film unit includes a unit body consisting of a plastic case formed, for example, by extrusion molding and equipped with a taking lens and a shutter. At the time of manufacturing the unit body, an unexposed color or monochrome photographic photosensitive material in sheet or roll form is loaded into the unit body in light-tight condition either directly or as housed in a container. After the photographic film has been exposed by the user, the whole unit is sent to or left with a photographic film finishing agent for development. The agent removes the photographic film from the unit, develops it and prepares photographic prints.

As described in JU-B-3-6910, JU-B-5-31647, JP-A-7-225454 and JU-B-6-43798, for example, a taking lens, finder and other optical components required for taking photographs and a shutter release button, film-winding knob and other components required for photograph-taking operations are exposed to the exterior and the unit is used as covered with cardboard or plastic which is printed with use instructions and a decorative design.

As described in JU-B-4-1546 and JP-B-7-1380, the lens-fitted photographic film unit covered with cardboard or plastic is marketed as further enclosed in a package made of a moisture-proof material or a moisture-absorption resistant material with absorptivity of not more than 0.1% as measured by ASTM test method D-570. Such materials include aluminum foil laminate and sheet, and transparent or opaque plastic coated with aluminum foil or vapor-deposited with a metal. In view of the storability of the photographic film housed in the lens-fitted photographic film unit, the lens-fitted photographic film unit in the moisture-proof package should preferably be adjusted to a relative humidity at 25° C. of 40 to 70%, more preferably 50 to 65%. Further, as disclosed in JU-B-6-6346, JU-B-6-8589 and U.S. Pat. No. 5,239,324, lens-fitted photographic film units covered with cardboard or plastic are available which are further imparted with underwater use and waterproof capability by housing them in a transparent waterproof case that enables shutter and film-advance operations to be performed from the outside.

As described in JP-B-7-56363, JP-A-63-199351, JU-B-3-22746, JU-B-3-39784, JU-B-5-38353, JU-B-7-33237 and JU-B-7-50746, a plastic lens consisting of one or two spherical or aspherical lenses is used. To correct for the spherical aberration of the lens, the film-receiving surface at the rear cover in the exposure section is preferably formed as a surface bowed to be concave relative to the taking lens in the direction of film travel. As disclosed in JU-B-2-41621, JU-B-3-6910 and JU-B-3-39784, the finder can be a passage-type finder consisting of only finder windows defined in the case or, as disclosed in JP-B-7-10345, for example, can be constituted as an inverted-Galilean or Alberta finder by installing an eyepiece and object lens in the passage. Moreover, as disclosed in JP-A-7-64177, JP-A-6-250282 and JP-A-7-128732, the finder can be given surface-to-surface switching capability and the exposure frame can be made switchable in response to enable either ordinary size or panorama size pictures to be taken. It is also possible in response to switching of the finder to record optically or magnetically on the film whether the exposure was made in standard, panorama or H-size. Lens-fitted photographic film units in which the focal length of the taking lens is variable and the finder field can be specified so as to enable closeup photography and telephotography are also available.

Either sheet or roll film can be used in the lens-fitted photographic film unit. Further, as disclosed in Dutch Patent No. 6,708,489 cited earlier, the film can be directly accommodated in the lens-fitted photographic film unit or, as indicated in JP-B-2-32615, can be loaded therein after being placed in a container.

When roll-type photographic film is used in the lens-fitted photographic film unit, the roll film is preferably loaded into the lens-fitted photographic film unit after being accommodated in a container. As the container for this it is advantageous to use a 135 film magazine conforming to the ISO standard, as described, for example, in JP-A-54-111822, JP-A-63-194255, U.S. Pat. Nos. 4,832,275, 4,834,306, 5,226,613, JP-A-2-124564, JP-A-3-155544, JP-A-2-264248, JU-B-5-40508, JP-B-2-32615 and JP-B-7-117707, a magazine of smaller diameter than the ISO standard but loadable with ISO standard photographic film, or a uniaxial cartridge or magazine having a spool to which one end of the film is fastened such as the an APS (Advanced Photo System) cartridge disclosed in JP-A-8-211509, JP-A-8-262645 and JP-A-8-262639. A biaxial cartridge for 110-standard film as described in JU-B-4-14748 and JU-B-3-22746 can also be used. It is also possible to use a film with backing paper if necessary.

When a uniaxial cartridge or magazine having a spool to which one end of the film is fastened is used, the cartridge or magazine can be accommodated in the housing on one side of the lens-fitted photographic film unit and the film be factory prewound at the time of manufacturing the film by drawing most of the film out of the cartridge or magazine and storing the drawn-out film as wound into a roll in the housing. In this case, an exposed portion of the film drawn out upon the exposure of each frame is wound back into the cartridge or magazine by rotating the cartridge or magazine with an external winding member. Otherwise, in reverse to the foregoing, a spool separate from the cartridge or magazine having one end of the film fastened thereto can be loaded into the housing on one side of the lens-fitted photographic film unit and the cartridge or magazine be loaded into the other housing with most of the film accommodated therein. In this case, an exposed portion of the film drawn out of the cartridge or magazine upon the exposure of each frame is wound on the spool separate from the cartridge or magazine.

In the factory-prewound film system, the photographic film drawn out of the cartridge or magazine can be housed in the other housing as wound on a spool separate from the cartridge or magazine or, as described in JP-B-2-32615, it can be housed in the other housing in a hollow state. Moreover, as disclosed in JP-B-7-56564, the factory prewinding can be conducted by drawing the photographic film out of the cartridge or magazine and winding it into a roll in a darkroom, loading the cartridge or magazine and the film roll into the lens-fitted photographic film unit and closing the rear cover of the lens-fitted photographic film unit to shut out light or, as disclosed in the aforesaid JP-B-2-32615, it can be conducted by loading a cartridge or magazine housing most of the film into one housing, loading a spool separate from the cartridge or magazine having one end of the film fastened thereto into the other housing, closing the rear cover to shut out light, and winding the photographic film onto the separate spool by rotating the spool from the exterior of the lens-fitted photographic film unit.

As disclosed in JU-B-4-1546 and JU-B-7-20667, the lens-fitted photographic film unit is preferably provided with a self-cocking mechanism which charges the shutter mechanism for kicking the shutter blade by the operation of a follower sprocket engaged with the film perforations when the film is wound at each exposure, whereafter it prevents further film winding. When the shutter release button is pressed, the charged shutter mechanism is released from the charged position and kicks the shutter blade to conduct an exposure. Another film winding operation is then possible.

As disclosed in JU-B-2-34688, JU-B-6-41227, JP-A-7-122389 and JP-B-6-12371, the lens-fitted photographic film unit can also further be incorporated with a flash circuit board having an external switch for charging the flash circuit. In this case, a configuration can be adopted in which the activation of a synchro switch in response to the exposure operation of the shutter blade causes the flash to fire synchronously with the exposure.

On the other hand, as described in JU-B-4-1546, the lens-fitted photographic film unit can be equipped with a counter for displaying the number of exposures or the remaining number of exposures and the counter can be further equipped with a mechanism which responds to the winding operation following the exposure of the last frame by prohibiting disablement of shutter charging and frame-by-frame winding. With this arrangement, the winding operation can be repeated after exposure of the last frame until the film has been advanced to its final wound-up position.

As explained in the foregoing, a camera or a lens-fitted photographic film unit can be used as the exposure means for the photosensitive material. In view of this, it would be confusing to house the photosensitive material of this invention in a container completely identical to the conventional 135 film magazine or APS cartridge. Specifically, such packaging would make it difficult to distinguish film types for use in the system and might lead to cartridges containing non-system film being mistakenly loaded into the invention system. Therefore, while an exposure means which is functionally identical to a conventional one can be used, it should preferably have a distinguishing feature. In the case of a lens-fitted photographic film unit, for example, the cardboard or plastic covering should be given a different shape than the conventional one and/or the cardboard or film should be marked with an identifier indicating the film type.

Even if the body of the lens-fitted photographic film unit is provided with a distinguishing feature in the forgoing manner, however, correct discrimination of the film type may still not be possible if the user changes the film in the lens-fitted photographic film unit. In order to ensure correct discrimination at all times, therefore, the lens-fitted photographic film unit should preferably be directly loaded with the photographic film made of the aforesaid photosensitive material, as disclosed in Dutch Patent No. 6,708,489 cited earlier, so that the user cannot easily change the film.

Known methods of exposing the photosensitive material include not only the photographic method but also such other methods such as exposure by scanning with a laser beam or the like. Since an object of this invention is to provide a development system which, owing to the simplicity of the development method, can be installed in a convenience store or the like, the explanation in this specification is directed to the development of photographic film exposed with a camera or the like. However, the technical concept of the invention is not limited in this respect and also encompasses exposure other than photographic exposure.

(3) Development

The photosensitive material development method and system will now be explained.

(3-1) Removal of photographic film from container

As explained in the foregoing, the development is conducted by superimposing the photographic film and a processing material and heating them together. Therefore, when a photographic film exposed by photography using one of the aforesaid photographic means is to be developed, it first has to be subjected to an operation for removing it from the film container.

For this it is preferable to provide a setting section for setting the film cartridge or lens-fitted photographic film unit containing used (exposed) film in the system. To prevent the user from setting another type of film housing by mistake, the setting section is preferably designed to accept only containers containing developable film.

Specifically, the photographic film made of the photosensitive material is provided as housed in a lens-fitted photographic film unit or cartridge of a specific and special shape and the setting section is given a recessed shape which, for example, accepts only a lens-fitted photographic film unit having the special shape.

Otherwise, the lens-fitted photographic film unit or cartridge is marked with an identifier indicating the film type. The identifier can be in the form of characters, symbols, a bar code or the like. The identifier is optically read when the film container set in the setting section. If the container is missing an identifier or if the identifier indicates a different type of film, a warning can be sounded or an error message be displayed on a system monitor or the like. The identifier can be read by any of various widely used methods such as a POS system, bar-code reader or OCR.

When a film container has been properly set in the setting section, it is automatically taken into the system interior. The taking of the film container into the system is necessary because the film container must be shielded from light at the time the film is drawn out of it. It is enabled, for example, by providing a light-shielding shutter which is closed to prevent light from reaching the container from the outside when setting of the film container is completed.

As the method for removing the exposed photographic film from the container taken into the system there can be used that described, for example, in JP-B-6-16158 and JU-B-7-15545. In the disclosed method, film is removed from a lens-fitted photographic film unit by opening a cover provided for this purpose on the bottom of the lens-fitted photographic film unit case. Otherwise, as disclosed in Dutch Patent No. 6,708,489, the film can be removed by opening or breaking the rear cover. Alternatively, as described in U.S. Pat. No. 5,202,713, a portion of the lens-fitted photographic film unit case can be formed with a normally light-sealed opening and the film can be removed by gripping one of its ends and pulling it out through this opening. Any of the various other methods conventionally used for 135 film or in the APS system can also be adopted.

While other types of film can be rejected by the foregoing methods of configuring the container setting section to have a special shape or reading an identifier affixed to the container, it is also possible discriminate the film type after the film has been drawn out.

For example, since the light transmittance of photographic film differs depending on the photosensitive material used therein, the type of film can be discriminated by measuring its light transmittance after it has been drawn out. The discrimination can also be conducted based on some other physical property of the film, such as its reflectance, spectral characteristic or surface roughness.

Otherwise, if a portion of the film can be magnetically recorded with various information as in the case of APS photographic film, for example, the discrimination can be conducted by reading this information. In this case, as in the earlier mentioned case where discrimination is conducted based on identifying information on the container, is it preferable, after setting of the container has been completed, to use a prescribed user interface to inform the user of the fact that the set film is of a type that cannot be developed.

(3-2) Development processing

The photographic film drawn out of the container by one of the foregoing methods is next developed. This is conducted, for example, by installing conveyance rollers or conveyance drums along a prescribed conveyance path, conveying the photographic film drawn out of the container along this path and, in the process of this conveyance, imparting solvent to the photographic film and superimposing it with a processing material.

For example, one specific method usable for conducting the development is to install a roll of the processing material on a feed reel, convey the processing material from the feed reel toward the conveyance rollers installed in the photographic film conveyance path, convey the photographic film and the processing material so that they are superimposed at a prescribed portion of the film conveyance path, heat them in this state, and peel the processing material off the photographic film after heating by, for example, taking it up on a separate reel.

Methods available for superimposing the photosensitive material and the processing material include those described in JP-A-62-253159 and JP-A-61-147244.

When it is preferable to provide water as a solvent in the course of the development, a method can be adopted of immersing the photosensitive material (photographic film) or the processing material in water and then removing excess water with a squeegee roller. It is preferable, however, to apply all of a fixed amount of water to the photosensitive material or the processing material as by a coating method. Another preferable method is, as described in Japanese Patent Application No. 8-196945, to spray water by use of a water-imparting apparatus having multiple water-jetting nozzles disposed along a straight line intersecting the direction in which the photosensitive material and the processing material are conveyed with their nozzle holes spaced at regular intervals and an actuator for directing the nozzles toward the photosensitive material or the processing material on the conveyance path. Water can also be preferably supplied by use of a sponge or the like.

The heating in the development step can be effected, for example, by contact with a heated block or plate, by contact with a hot plate, a hot presser, a hot roller, a hot drum, a halogen lamp heater, an infrared or a far infrared lamp heater, or by passage through a high temperature atmosphere.

Otherwise, the heating means for heat development can be an electrically conductive heat-emission layer provide on the photosensitive material or processing material during its manufacture. As such a heating element there can be used the one described in JP-A-61-145544.

In the image forming method and system according to this invention, the superimposition and/or heating of the photosensitive material and the processing material can be conducted by use of any of various conventional heat developing apparatuses either with or without modification. For instance, apparatuses as disclosed in JP-A-59-75247, JP-A-59-177547, JP-A-59-181353, JP-A-60-18951, JU-A (unexamined published Japanese utility model application) 62-25944, JP-A-6-130509, JP-A-6-95338, JP-A-6-95267, JP-A-8-29955 and JP-A-8-29954 can be preferably used.

Examples of commercially available heat development apparatuses which can be used in the present invention include Pictrostat 100, Pictrostat 200, Pictrostat 300, Pictrostat 330, Pictrostat 50, Pictrography 3000 and Pictrography 2000 available from Fuji Photo Film Co., Ltd.

This invention does not require a separate bleach-fix step for further removal of silver halide and developed silver remaining on the photosensitive material after development. A fixing step and/or a bleaching step can, however, be included in order to reduce the load during image read-out and to enhance image preservability. While these steps can be conducted by ordinary solution processing, they are preferably conducted, as described in Japanese Patent Application No. 8-89977, by a step of heating together with a separate sheet applied with processing agent.

In the conventional solution processing machine, foreign matter such as dust adhering to the photographic film is removed into the processing solutions. As a result, it is not a cause of uneven development and such material adhering to one photographic film does not affect other photographic films processed thereafter. In the image forming method and system according to this invention, however, unlike in the conventional method and system, the photographic film is not immersed in a processing solution during the development step and foreign matter adhering to the photographic film is a direct cause of development unevenness. In addition, not only the dust and the like adhering to the photographic film but also that adhering to the container and other components may also affect the film processing. As in the case of conventional photosensitive materials, moreover, the photographic film may be scratched by foreign matter adhering to the film take-out section etc.

Adherence of dust and the like to the photographic film should therefore preferably be prevented by, for example, providing means for removing dust etc. from the setting section, film take-out section, film container and the like and adopting a dustproof structure for the conveyance path.

Various known means can be adopted as the dust removing means, including such mechanical techniques as air jetting, suction, use of an adhesive roller, brush or wiper, and vibration by ultrasonic waves or the like.

(3-3) Waste material processing after development

Components of the cartridge or lens-fitted photographic film unit removed of photographic film in the aforesaid development step are preferably reused if found to be usable upon inspection. The system for this should preferably provide for collection of the cartridge or lens-fitted photographic film unit removed of film at the film take-out section and, in the case of the lens-fitted photographic film unit, for a prescribed series of procedures for disassembling the unit into, for example, the lens section, body etc. and sorting and collecting these independently. Adoption of such a system makes it possible to recover the collected plastic components at regular intervals, reuse the reusable ones, and recycle those that cannot be reused by melting and pelletizing them.

The system can also be arranged to load new photographic film into reusable film containers after removal of the exposed photographic film therefrom.

(4) Digital image data generation (4-1) Photographic film read-out

The read-out of the developed photographic film with a transmission type reader (film scanner) and the generation of digital image data will now be explained.

The photographic film peeled from the processing material in the aforesaid development step includes residual silver halide and developed silver. In the conventional image forming method, the residual silver halide and developed silver are removed from the photographic film by desilvering. Desilvering is not required in the image forming method and system of this invention. Although desilvering is necessary, for example, when the developed photographic film is to be used for preparing prints by projection exposure of printing material, no desilvering is as a rule conducted in the image forming method and system of this invention unless requested by the customer. This is for simplifying the development processing. When the invention image forming system is installed in a convenience store or the like, desilvering is conducted on request of the customer by an outside service provider who picks up the photographic film for this purpose.

The photographic film is read by use of a film scanner in the same way as conventional film. When the developed film is read without desilvering, however, the color saturation of the image data read from the silver image is inferior to that when desilvering is conducted. While this can be coped with by regulating the intensity of the light source during read-out, for example, it is preferable to deal with it by subjecting the image data obtained by the read-out to image processing to correct for the silver image portion. Since the amount of developed silver differs corresponding to the amount of formed dye during the development process, correction is preferably conducted with respect to the R, G and B signals individually after read-out.

The developed photographic film should preferably not be returned to the customer without being desilvered because this makes it impossible to recover the silver. Since the read-out photographic film is therefore as a rule collected within the system, the system is preferably equipped with a conveyance path and collection means for this purpose.

When the water is applied during development, the read-out can be conducted while the photographic film is still wet. This may be preferable depending on the photosensitive material because when the transparent glass plate of the scanner is pressed onto a photographic film with surface scratches while the film is still wet, the water is sealed in the scratches during the read-out and prevents the scratches from affecting the read-out image data.

(4-2) Image processing of the image data

When digital image data are generated for display, printing or the like, they are ordinarily processed in various ways to improve image quality. This is also true in the image forming method and system of this invention. The processing for image quality improvement in the image forming method and system of this invention falls in two general categories: (a) image processing to prevent or correct for image degradation caused by the characteristics of the photosensitive material used in the image forming method and system of this invention and (b) customary image processing of the types commonly conducted in all fields such as for noise reduction and the like.

The image processing for preventing or correcting for image degradation owing to the characteristics of the photosensitive material will be explained first. As explained in the foregoing, the photosensitive material used as the material of the photographic film in the method and system of this invention is heated for image formation. Since the formed image is affected by temperature change at this time, it is unstable for some time following the heat development.

As a result, the image quality of image data obtained by conducting read-out of the photographic film immediately after completion of the heat development is not necessarily good. The temperature condition therefore has to be taken into consideration for obtaining high image-quality image data with little read-out error. One specific method usable for this is, for example, to provide heat retaining means for maintaining the temperature of the photographic film constant after development and conducting the read-out in the heat-retained state. Another is to stop the conveyance of the developed photographic film and let it stand until it reaches room temperature (reaches a constant temperature) before conducting the read-out. Another is to measure the temperature of the photographic film immediately before read-out and conduct the read-out under conditions suitable for the temperature. Another is to estimate the temperature of the photographic film at the time of read-out and, at the time of image-processing the acquired image data, carrying out conversion processing based on the relationship between the color density and the temperature of the photosensitive material determined in advance. The film temperature need not be directly measured but can be estimated from the temperature of the ambient environment.

The image processing preferably carried out with respect to the image data will now be explained. The same image processing need not necessarily be conducted with respect to all photographic films or all of the image data and the image processing is preferably varied depending on the image data. To give a well-known example, there is known a method of image-processing snapshots and the like in which image recognition processing is conducted to extract portions corresponding to the human face in particular and these portions are processed to obtain especially high image quality.

In another known method, various exposure conditions are recorded on a magnetic information recording section of the film and image processing is conducted based on the exposure conditions read from this section. One exposure condition that should be taken into consideration at the time of the image processing is the type of light under which the exposure was made. Photos taken under fluorescent light are in particular need of correction since they generally do not result in high-quality images as they are. When the background at the time of exposure is substantially a single color (when the background is a gold-colored screen, the sky, a grass-covered field or the like), on the other hand, "color-failure" correction is necessary because an error arises in human subject color tone correction when ordinary image processing is conducted. The exposure conditions can be recorded on the film or be input separately by an user.

Since the photosensitive material usable in the image forming method and system according to the invention comes in a number of types, different image processing can be conducted for each type of photographic film.

The customary image processing includes color, gradation and density correction. Generally speaking, color correction is preferably conducted so as to reproduce the color of the subject photographed as faithfully as possible. However, faithful color representation many not always be the best color representation from the customer's viewpoint. For example, avoidance of pasty tones may be desired. Some users want skin color to be rendered on the bright side. The invention system should therefore preferably be arranged to display the processed image data on a monitor screen, allow the user to make color settings while observing the displayed image, and conducting the image processing again based on the input settings.

The image quality can also be improved by sharpness enhancement processing and dynamic compression or expansion. Although sharpness enhancement processing is in principle conducted for recovering sharpness lost during scanning, similarly to in the case of the aforesaid color correction, it is preferable to provide a user interface for enabling input of a sharpness setting so as to be able to respond to the desire of the user.

Noise reduction processing is also necessary. While it is of course desirable to reduce electrical noise arising in the course of the signal processing, it is also preferable to reduce granular noise from the photosensitive material. Removal or suppression of granular noise can be conducted by the method described in Japanese Patent Application No. 7-337510, for example. In this method, the image signal is resolved into low-, medium- and high-frequency components, the high-frequency component is exaggerated, the medium-frequency component is suppressed, and the frequency components are then merged to obtain an image with reduced graininess and enhanced sharpness.

When the generated digital image data are to be used for preparing a print, enlargement or reduction processing may be conducted to match the printing material. When the digital image data are to be output as a file or transmitted via a network, they are preferably subjected to processing for compression in conformance with the JPEG (Joint Photographic Experts Group) standard, for instance. In other words, each type of image data are preferably subjected to the required image processing most appropriate in light of the purpose for which the digital image data were generated. All types of customary image processing used in various fields can be employed.

(5) Output of digital image data

The digital image data obtained by the foregoing image processing can be used in two different modes: either as they are or as printed on a prescribed recording medium.

(5-1) Output of digital image data as file

The spread of personal computers in recent years has lead to more photographs being kept not as prints but as digital image data which can be displayed on a monitor and processed with a computer. Moreover, as a new type of photographic service, it has also been proposed that digital image data obtained by development and scanning be stored and used directly for preparing prints without need for scanning the film again when the customer orders additional prints.

In view of these circumstances, the image forming method and system of this invention is preferably arranged so that digital image data obtained by image processing data read from the photographic film made of the aforesaid photosensitive material can be utilized directly as digital image data such as by output as a file to an MO or other removable memory media for supply to the customer or be stored on the hard disk of a server computer at a photo shop for use in responding to orders for additional prints.

In other words, the system is preferably equipped with various removable memory drives so that the digital image data processed by the aforesaid digital image processing means can be output as a file when requested by the customer. It can also be equipped with communication means for enabling the digital image data to be transmitted to a computer outside the system. Various types of media drives are preferably provided to enable response to various customer requirements.

(5-2) Printed output of digital image data

Various types of digital printers can be used for outputting the digital image data in printed form. The digital printer can be accommodated in the same case as the system for conducting the aforesaid development and image processing or be installed in a separate case and connected with the system by an appropriate data transmission means. It is also possible connect multiple digital printers to a single development machine or to house different types of digital printers in a single case and switch among the printers as required. When the order data input by the customer designate the printing means, the printer is preferably selected in response to the input information.

One digital printer usable in the image forming method and system of this invention is the type which records an image by scanning a photosensitive material such as color paper with a laser beam modulated by digital image data and produces a color print by carrying out wet development and fixing processing on the photosensitive material.

This type of printer prints an image by passing the medium to be formed with the image through a processing solution for causing chemical reactions. Since equipment requiring use of a processing solution for chemical reactions is not so good for use in a system to be installed in a convenience store or the like, however, it is preferable to use a printer of a type that does not require the image-receiving material to be immersed in a processing solution. Available printers meeting this description include the xerographic printer, the jet printer and the thermal sublimation dye transfer printer. Another type of printer preferable for use is that of the type which exposes a heat-developable photosensitive material to digital image data by use of a laser beam, superimposes the heat-developable photosensitive material and an image-receiving material, and transfers the image recorded by laser beam exposure to the image-receiving material by heat-development transfer, thereby forming and image on the image-receiving material. The foregoing types of digital printers will be explained in the following.

Various methods have been proposed for obtaining a color image by the xerographic method, some of which have been put to practice. Xerographic full color images are generally produced by repeatedly conducting, once for each color, as many times as necessary, the basic xerographic process of imagewise exposing a uniformly charged xerographic photosensitive (photoconductive) drum based on a specific color signal obtained by color separation, thereby forming a latent electrostatic image, and developing the latent image using toner of a color corresponding to the specific color, thereby forming a toner image of the specific color on the photosensitive drum. The process can be conducted either by a method which produces a full color image by use of only a single photosensitive drum or a method which produces a full color image by forming a toner image of a different color on each of multiple photosensitive drums.

JP-A-59-121348 describes a method of forming a color image in which the charging, exposure and development of the photosensitive drum are repeated as many times as necessary to overlay toner images on the photosensitive drum in the required number of colors and the color images are then transferred to printing paper all at one time.

JP-A-4-337747, for example, teaches another method which uses a single photosensitive drum disposed opposite a transfer drum which electrostatically supports recording paper and different color development apparatuses disposed opposite the photosensitive drum. The original image information is color-separated and an image corresponding to each color is formed on the photosensitive drum. Each time a color toner image is formed, it is transferred to the recording paper. Multiple color toner images are transferred to and overlaid on the recording paper by repeating these operations.

In another method, such as described in JP-A-5-333662, multiple photosensitive drums are disposed along a belt apparatus for conveying recording paper, means for forming a toner image of a different color is disposed opposite each photosensitive drum, and a full color image is obtained by successively transferring the color toner images from the photosensitive drums to recording paper as the recording paper is being conveyed.

All of the foregoing methods include a step for directly transferring a toner image formed on one or more photosensitive drums to a final support such as paper. One widely known ordinary method for conducting this transfer is to irradiate the back surface of the final support by corrotoron charging in the opposite polarity from the toner charge or to apply a voltage of opposite polarity to the rear surface and to transfer the toner to the final support by causing electrostatic force to act on the toner (the so-called "electrostatic transfer method"). Owing to the drawbacks set out below, however, it is extremely difficult to obtain an image of high quality and high gradation property by this method.

One drawback of this method is that 100% transfer of the toner from the photosensitive drum to the support is extremely difficult to achieve because the toner transfer efficiency depends on the toner image density. Since the transfer is particularly poor at the high- and low-density portions, an attempt to obtain an image with continuous tone by this method results in skipped highlight portions and loss of gradation at the high-density portions. Moreover, since the toner on the photosensitive drum is not completely transferred by this method, the residual toner remaining on the photosensitive drum has to be removed with a blade or the like. As a result, the photosensitive drum is apt to incur scratches which cause streaks and unevenness that make it impossible to obtain a high-quality image.

Another drawback of this method is that microscopic level differences in the electrical property of the paper or other final support to which the toner image is to be transferred make it difficult to keep the electrostatic force acting on the toner constant. The toner transfer efficiency is therefore not uniform. This causes uneven transfer and makes stable image quality difficult to achieve since the electrical property of the paper varies with the ambient conditions.

A method is known for overcoming this problem by once transferring the toner image formed on the photosensitive drum to an intermediate transfer member and then retransferring the toner image to a final support such as paper. JP-B-49-209 and JP-A-62-206567, for example, teach a method in which primary transfer is made to a belt-like intermediate transfer member and the unadhered toner image is again transferred (secondary transfer) from the intermediate transfer member to a recording medium. In the case of forming a color image, the different color toner images formed on the photosensitive drum are transferred to the intermediate transfer member one by one as they are formed, thereby producing a full color image consisting of superimposed different color images on the intermediate transfer member, and the full color image is then transferred to a recording medium such as paper in a single operation. On the other hand, JP-A-5-341666 teaches a method in which an intermediate transfer drum is used instead of a belt-like intermediate transfer member.

All of the foregoing methods transfer the toner image formed on the photosensitive drum to the intermediate transfer member electrostatic force produced either by irradiation with corona ions or application of bias voltage. Another method, which uses adhesive force, is disclosed in JP-B-49-38172, for example. In this method, the latent electrostatic image formed on the photosensitive drum is developed with liquid toner, tape with adhesive property is pressed onto to the toner image and the toner image peeled off, and the tape is then adhered to the final support. JP-A-2-278276 and JP-A-4-81786, for example, further teach a method for obtaining a full color image for each color by conducting the step of transferring 100% of the toner image from the photosensitive drum to an intermediate film with adhesive property and the step of further transferring 100% of the toner image from the intermediate film to a support.

The methods which once transfer the toner image formed on the photosensitive drum to an intermediate transfer member have the following feature which makes them advantageous to the methods which directly transfer the toner image from the photosensitive drum to the final support.

In the conventional method of directly transferring the toner image from the photosensitive drum to the final support, the transfer efficiency is difficult to maintain constant because of the uneven thickness and nonuniform electrical property of the support itself at the time of transfer. As a result, a high-quality image is difficult to obtain. In contrast, while the method which transfers the toner image to an intermediate transfer member has the drawback of enlarging the apparatus size owing to the need for multiple transfer steps, it is well adapted for high-quality image formation since the various properties of the intermediate transfer member can easily be uniformly optimized to enhance toner image transfer efficiency and enable stable, highly uniform transfer.

This merit is especially important in the formation of high-quality full color images. The reason for this is that the final color obtained when images of different colors are superimposed undergo color change when the transfer efficiency is not uniform. In addition, the method using an intermediate transfer member enables the transfer to the final support to be conducted independently. It is therefore a feature of this method that transfer can be made to a wider range of substrates, such as paper, plastic and the like. Since, as explained in the foregoing, the method using an intermediate transfer member is well suited for formation of high-quality full color images, it can be preferably used in this invention.

Preferable methods for transferring toner and toner images to and fixing them on the final support and preferable final support properties will now be explained. As is well known, a liquid toner with an average toner grain diameter of 1 µm or less is generally easy to obtain. The graininess of the toner image obtained by development with such a liquid toner is markedly superior to the graininess of a toner image obtained with a dry toner having an average grain diameter of around 5 µm and is close to that of a silver halide photo. This why images produced by the xerographic method usually look rough is basically because the toner grains are large and the graininess is therefore poor. Reducing toner size is highly effective for rendering smooth gradation in high-gradation images. Although liquid toners are very suitable, use is not limited to such toners. It is also generally true that the image quality of images produced by the xerographic method depends not only on toner property but also greatly on the properties of the final support and the method of transfer to and fixing on the final support.

JP-B-5-82939 and JP-B-5-82940 describe coated paper subjected to smoothing treatment for enhancing faithful color reproduction and luster, while JP-A-8-194349 discloses a color toner, a heat-fixing process and the like for obtaining images without uneven luster. Owing to the different amounts of toner which adhere at the high-density portions and the low-density portions of a xerographic image, moreover, the toner tends to form a relief-like image even after toner fixing. Methods for preventing this are taught by, for instance, JP-A-8-194394, Japanese National-Publication-of-translated-version Nos. 4-501925 and 5-500869, while JP-A-5-281863 discloses a method for simultaneously improving faithfulness of color reproduction and a finish with good luster by using a transparent material to increase the transfer efficiency of color toner from the intermediate transfer member to the final support. As pointed out in the foregoing, improvement of image luster, reduction of luster unevenness, improvement of color reproduction faithfulness, reduction of relief degree, improvement of sharpness and the like are indispensable for obtaining high-quality xerographic images. In this invention similar measures, not limited to the examples set out in the foregoing, should also be taken.

Preferable image exposure methods will now be explained. In the image forming method and system of this invention, the image data are read using a CCD scanner with three-color (RGB). color separation capability and the read image data are converted to digital image data by an A/D converter and subjected to optimum image processing such as shading correction, sharpness enhancement, gamma correction, color density gradation conversion and the like. The image exposure in the image forming method explained in the foregoing is conducted based on these data after image processing, ordinarily by laser beam scanning exposure. Methods known for image recording include the density gradation (continuous tone) method of conducting exposure and recording with a laser beam whose intensity is modulated based on the original image density data, the halftoning method of representing the image data basically in binary dots and varying the apparent density by varying the number of dots per a small unit area, and the method commonly used in printing technology of reproducing an continuous tone image using a generally known straight-line screen or the like.

The first of these is described in JP-A-63-113576 and elsewhere. To obtain an image with excellent gradation by this method, it is important to ensure 100% transfer of the toner image on the photosensitive drum so as to overcome the problem commonly encountered in xerographic photos of poor density reproduction at the highlight portions.

The latter methods are frequently used in xerographic photography and are the subject of a very large number of patents. These methods cannot easily achieve both excellent gradation and excellent resolution, however, because there is a tradeoff between these two qualities. The methods also have other inherent drawbacks, including a tendency to produce noise, such as textures and contour not in the original image, and, in the case of full color images, a susceptibility to color change, particularly at the highlight portions, owing to change in dot superimposition dependent on the precision of the superimposition of the multicolor images. Various techniques have been proposed for overcoming these problems. While the present invention can preferably adopted those taught by JP-A-6-98184 and JP-A-8-163363, for example, it is not limited to these.

As explained in the foregoing, an image forming method capable of producing full color images of a high quality on a par with silver halide photographic and printed images can be achieved with a xerographic type laser printer by: subjecting digital full color image data read from photographic film to optimum data processing enabling securement of a high-quality full color image comparable to a silver halide photographic or printed image; forming latent images by, preferably in a xerographic full color printer having an intermediate transfer member, irradiating a photosensitive drum with a laser beam intensity modulated or pulse-width modulated for halftoning based on a color image signal for each color; developing the latent images with liquid color toner or dry color toner; superimposing the toner images obtained on an intermediate transfer member by successively transferring them to the intermediate transfer member as they are formed; retransferring the so-obtained color toner composite image to a preferable final support; and fixing it thereon.

Ink-jet digital printers preferable for use in this invention will now be explained.

Various methods have been proposed for producing full color images by the ink-jet method and numerous systems have been practically implemented. Full color image formation by the ink-jet system is generally conducted by jetting ink of a specific color from a recording head in the form of ink droplets or mist in accordance with an original image signal so as to adhere dots or dot clusters on recording paper and conducting this for each of multiple specific colors while two-dimensionally scanning the recording paper.

The following basic ink-jet systems are known.

One is the thermal (bubble jet) system. As described in JP-A-8-104837, for example, this system enables an image to be recorded on recording paper by imparting thermal energy to a recording head in accordance with an image signal, thereby causing a part of the ink inside the recording head to vaporize and produce an impulse that jets ink droplets out of nozzles.

Another system uses the piezoelectric effect. As described in JP-A-6-256696 and elsewhere, this system enables an image to be recorded on recording paper by constituting a part of the recording head of piezoelectric elements and applying voltages to the piezoelectric elements in accordance with the image signal so as to reduce the volume of ink chambers by the flexing of the piezoelectric elements, thereby jetting ink droplets out of nozzles.

Another system uses ultrasonic waves. As described in JP-A-5-238006 and elsewhere, this system enables an image to be recorded on recording paper by focusing ultrasonic waves on the ink surface in an ink chamber, thereby jetting ink droplets from the ink surface.

Another system uses charge control. As described in JP-A-62-56149 and elsewhere, this system enables an image to be recorded on recording paper by continuously jetting charged ink droplets from nozzles by piezoelectric elements or the like and electrostatically deflecting the charged ink droplets in accordance with an image signal.

Another system uses an electrostatic method. As described in JP-A-59-225984 and elsewhere, this system enables an image to be recorded on recording paper by using oil-based ink and applying a high voltage between a recording head and the recording paper so as to draw the ink out of nozzles and bring it in contact with the recording paper. This invention can use any of these systems, although it is not restricted to the particulars of the cited examples.

The following types of ink are available for use in the different ink-jet systems mentioned above.

One is water-base ink. As described in JP-A-3-258870, for example, this ink is obtained by dissolving water soluble dye in a solvent including water.

Another example is oil-base ink. As described in JP-A-2-276871 and JP-A-4-248879, for example, this ink is obtained by dissolving dye in an organic solvent.

Another example is pigment ink. As described in JP-A-4-214781, for example, this ink is obtained by dispersing pigment in a solvent including water.

Another example is microcapsule ink. As described in JP-A-1-170672, for example, this ink contains dye formed into microcapsules.

Another example is hotmelt ink. As described in JP-A-4-117468. for example, this ink is solid at normal room temperature and is melted at high temperature to be jetted by the ink-jet printer.

This invention can use any of these inks, although it is not restricted to the particulars of the cited examples.

Gradation expression is required to record a variable-density image using any of the ink-jet systems referred to above. Gradation recording systems known to be usable in the different ink-jet systems include the following.

One is a system employing dot diameter control. As described for example in JP-A-63-134250, this system produces gradation by controlling the size of the ink dots adhered to the recording paper. Methods available for controlling dot diameter include those of controlling the width of a pulse signal applied to the recording head, that of varying jetted ink droplet diameter by a method using multiple types of recording heads differing in nozzle diameter, and the method described below of varying dot diameter by varying blotting through control of the number of ink overstrikes (JP-B-54-21095 and JP-B-7-29446).

Another is a system employing ink overstrike. As described for example in JP-A-3-231859, this system produces gradation by controlling the number of relatively low-density ink dots jetted at each point on the recording paper.

Another is a system that combines inks of different densities. As described for example in JP-B-2-14905, this system uses multiple recording heads which each jets ink of a specific color at different densities and controls gradation by selecting among the recording heads.

Another is a system that employs ink mist. As described for example in JP-A-5-57893, this system jets ink from a head in the form of mist by use of, for example, ultrasonic wave vibration produced by piezoelectric elements and varies the density of clusters of fine dots on the recording paper by, for example, controlling the application period of the ultrasonic wave vibration.

Another is a system that employs the matrix method. As described for example in JP-A-64-47553, this system produces each pixel on the recording paper as a matrix of m×n dots and varies the manner in which the matrix is filled in to control its average density. Various methods are available for filling the matrix in with dots, such as the error dispersion method, the Bayer systematic design method and the density pattern method.

Systems which suitably combine the foregoing gradation recording methods are also available, as described in JP-B-5-46744 and elsewhere. This invention can use any of the foregoing systems alone or in combinations, although it is not restricted to the particulars of the cited examples.

To obtain an image by two-dimensionally arranging the pixels recorded on recording paper by the foregoing ink-jet systems, the recording head has to be scanned two-dimensionally relative to the recording paper. Various methods are also available for this scanning, as set out below.

As described in JP-B-5-46744, for example, one method is to mechanically scan a recording head mounted on a carriage in the main scanning direction and feed the recording paper in the sub-scanning direction.

As described in JP-B-1-59111, for example, another method is to interchange the main scanning and the sub-scanning directions of the foregoing method, i.e., to use a screw or the like to move the recording head relative to a rotating drum on which the recording paper is attached.

As described in JP-A-5-57893, for example, another method is to use a wide, multi-nozzle recording head to record in the main scanning direction without scanning and to feed the recording paper in the sub-scanning direction.

This invention can use any of these methods, although it is not restricted to the particulars of the cited examples.

Various types of recording paper are also available for use in the different ink-jet systems mentioned above.

On type of recording paper is the pictorico sheet described in JP-A-62-111782 and elsewhere. This is a recording sheet including a porous particle layer on a support. It is characterized by little ink blotting after recording.

Another type of recording paper is the polymer coated sheet described in JP-A-7-179032 and elsewhere. This is a recording sheet having a layer including a hydrophilic resin on a support.

Another type of recording paper is the recording sheet whose support is made of resin coated paper, as described in JP-A-7-179032 and elsewhere. Aside from the recording sheet described in this publication, recording sheets are also known which comprise at least two, preferably three, coating layers on a support coated with, for instance, polyolefine, wherein at least one of the layers contains at least one polymer represented by general formulas (6), (7) and (8) shown below.

General formula (6)

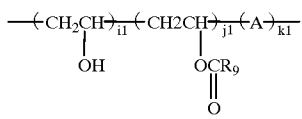

where $R_9$ represents an alkyl group having 1 to 4 carbon atoms and A represents a repeating unit of a copolymerizable ethylenic unsaturated monomer. i1, j1 and k1 represent the mole percentages of the respective components, where i1+j2+k1=100, i1 being in the range of 50–100, j1 of 0–50 and k2 of 0–30.

General formula (7)

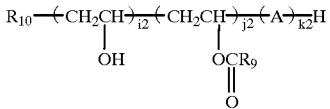

where $R_{10}$ represents an alkyl group or phenyl group having not less than 8 carbon atoms, $R_9$ represents an alkyl group having 1 to 4 carbon atoms and A represents a repeating unit of a copolymerizable ethylenic unsaturated monomer. i2, j2 and k2 represent the mole percentages of the respective components, where i2+j2+k2=100, i2 being in the range of 50–100, j2 of 0–50 and k2 of 0–30.

General formula (8)

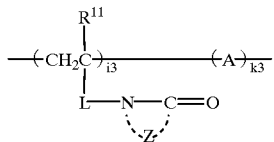

where $R_{11}$ represents a hydrogen atom or an alkyl group having 1 to 4 carbon atoms and A represents a repeating unit of a copolymerizable ethylenic unsaturated monomer. Z represents an atom group required for forming a pyrolidone ring, oxazolidone ring or lactam ring. L represents single bond —CO—, —COO(CH$_2$)$_n$— (where n is an integer between 1 and 5), or —CONR$^{12}$(CH$_2$)$_n$— (where n is an integer between 1 and 5 and $R^{12}$ is a hydrogen atom or an alkyl group having 1 to 4 carbon atoms). i3 and k3 represent the mole percentages of the respective components, where i3+k3=100, i3 being in the range of 10–100 and k3 of 0–90.

In the general formulas (6), (7) and (8) shown above, A does not include a tertiary or quaternary alkyl group. Moreover, at least one of the aforesaid layers preferably contains at least one polymer containing a polyvinyl alcohol unit at a ratio of not less than 60 mole % and not more than 95 mole %. In addition, at least one of the layers preferably contains a matting agent of a grain diameter of not less than 3 μm and not more than 30 μm, preferably of not less than 10 μm and not more than 30 μm.

This invention can use any of the foregoing recording papers, although it is not restricted to the particulars of the cited examples.

Aside from the aforesaid recording sheets, there can also of course be used any of printing papers currently in wide use for printing and making hard copies, including copying machine paper, OHP sheet, paper for postcards etc., plastic sheet, cloths and so on.

As explained in the foregoing, the ink-jet printer is capable of using digital full color image data read from the aforementioned photographic film to produce a high-quality full color image comparable to a silver halide photograph or printed image. Specifically, a high-quality full color image comparable to a silver halide photograph or printed image can be obtained by using ink suitable for the ink-jet printer, conducting optimum binary image processing by a combination of any of various gradation recording systems, and printing the processed image on whatever type of recording sheet is appropriate for the purpose concerned using a suitable scanning mechanism.

Thermal sublimation dye transfer digital printers preferable for use in this invention will now be explained.

Various methods for obtaining full color images with the thermal sublimation dye transfer system have been proposed. A number of these have been practically implemented. The method used to form a full color image by the thermal sublimation dye transfer system generally is to transfer dye to an image-receiving sheet by heating an ink sheet containing heat diffusing dye in accordance with digital image data.

As disclosed in JP-A-6-106861, for example, the heat diffusing dye is preferably one having a diene or dienophyl compound and the image-receiving sheet preferably contains a dienophyl compound or a diene compound.

Alternatively, the heat diffusing dye can be a chelatable dye such as disclosed in JP-A-8-224966 and the image-receiving sheet can be one containing a metal ion-providing compound.

The heat diffusing dye can further be one containing a reactive amino group such as disclosed in JP-A-8-276673. In this case, the image-receiving sheet preferably includes a polymer including an alkylacrylamidoglycolate alkylether group.

The support of the image-receiving sheet is preferably a polyethylene coated paper as disclosed in JP-A-5-162473.

Otherwise the support of the image-receiving sheet can be one obtained by, as described in JP-A-8-99472, laminating a minutely voided thermoplastic core layer and a thermoplastic surface layer substantially free of voids.

The invention image forming method and system can also preferably employ a digital printer which, as described earlier, exposes a heat-developable photosensitive material to digital image data using a laser beam, superimposes the heat-developable photosensitive material and an image-receiving material, and heat-development transfers the image recorded by laser beam exposure to the image-receiving material to form an image thereon. The Pictrography 3000 available from Fuji Photo Film Co., Ltd. is an example of a printer employing this system.

Although many of the aforesaid digital printers record an image by exposing a photosensitive material constituting the final support or some other photosensitive material, means of exposure is not limited to the aforesaid scanning with a laser beam and any means is usable insofar as it is capable of modulating image data in pixel units.

If an LED (light emitting diode) array is used as the light source, for example, modulation can be conducted by controlling the emission intensity of the individual LEDs. Otherwise a spatial modulation device can be used which controls the projection of recording light onto the photosensitive material by controlling the orientation of each of a large number of tiny mirrors arranged in a two-dimensional array so as to vary the direction of recording light reflection (called a "mirror array device"). Another usable method is that of controlling the projection of recording light onto the photosensitive material by controlling the transmittance or reflectance of each of a large number of liquid crystal cells arranged in a two-dimensional array so as to vary the direction of recording light transmission or reflection. Further, the aforesaid tiny mirrors can be arranged in a single line rather than an array, the photosensitive material be exposed along a line, and the recording light and the photosensitive material be moved relative to each other substantially perpendicularly to the exposure line so as to record a two-dimensional image.

Other usable ways of generating digital exposure light include that of generating directly modulated exposure light using a light-emitting type image display device and that of using a light-receiving type image display device which produces exposure light by spatially modulating light projected onto the photosensitive material. Usable light-emitting type image display devices include, for example, the CRT, the plasma display (PDP), the electroluminescent display (ELD), the vacuum fluorescent display (VFD) and the light emitting diode (LED). Usable light-receiving type image display devices include, for example, the electro-chemical display (ECD), the electrophoretic image display (EPID), the suspended particle display (SPD), the twisting ball display (TBD) and the PLZT display.

The digital image data can be recorded on unexposed photographic film instead of printing material to obtain a reproduced photographic film.

Various other digital printers can also be applied for outputting the image data read from the photographic film made of the aforesaid photosensitive material.

(6) Order processing

In order to conduct the aforesaid file and print output, a user interface is required for receiving output processing order data from the customer. Specific input means preferably provided include display means such as a monitor for enabling the customer to confirm the desired photo frame and a keyboard or the like for inputting order data and responding to confirmation requests. It is also possible to adopt a touch panel of the type used in bank ATMs. In addition, a speaker and/or microphone can be installed for voice prompting input of order data and/or accepting voice input. Usable user interfaces include not only those employed in the field of photo services but also those used in any other field.

The actual order processing is preferably conducted, for instance, by displaying the sets of digital image data read from the developed film side by side on the screen of a monitor and having the customer select the desired set or sets of digital data from among those displayed by, for example, clicking a mouse.

Conventionally, the photo service business has ordinarily been conducted by preparing prints or index prints of all photos at once at the time of development, whereafter the customers views the prints and orders additional prints of desired frames or requests trimming. In contrast, in the image forming method and system of this invention, the photo images are displayed on a monitor upon the completion of the development, read-out and image processing, and the customer orders services based on the displayed images.

In other words, prints or index prints are prepared immediately but the customer can order prints of only the desired frames in the desired number. As a result, unwanted prints need not be prepared, the conventional need to make repeated trips to the photo shop when multiple prints are required is eliminated, and the number of order mistakes tending to occur during transcription of numerals etc. stamped on the back of the prints to the order form at the time of order processing is reduced. The system is thus a friendly one both from the viewpoint of the user and the service provider.

The system is preferably capable of collecting payment for the output processing conducted based on the order data. For example, it is preferably arranged to indicate the total charge for the development and the prints on the monitor screen when the photographic film has been set and developed and the customer requests prints of desired frames on the screen. A configuration like that of a vending machine can be used for accepting cash payment.

EXAMPLES

The image forming method and system according to the invention will now be illustrated in greater detail.

(1) Preparation and exposure of photographic film

Examples will first be given of the method of preparing the photosensitive material and the processing material used in the image forming method and system according to this invention and of preparing photographic film from the prepared photosensitive material.

(1-1) Layer structure of the photosensitive material and the processing material Table 1 shows an example of the layer structure of the photosensitive material.

TABLE 1

Constitution of Photosensitive Material

| Ordinal number of layer | Name of layer | Ingredients | Coverage rate (mg/m$^2$) |
|---|---|---|---|
| 13th | Protective layer | Lime-treated gelatin | 1000 |
| | | Matting agent (silica) | 100 |
| | | Surface active agent (b) | 100 |
| | | Surface active agent (c) | 300 |
| | | Water-soluble polymer (a) | 20 |
| 12th | Interlayer | Lime-treated gelatin | 500 |
| | | Surface active agent (c) | 15 |
| | | Zinc hydroxide | 3400 |
| | | Water-soluble polymer (a) | 30 |
| 11th | Yellow color developing layer (High-sensitivity layer) | Lime-treated gelatin | 560 |
| | | Photosensitive silver halide emulsion (a) | 507* |
| | | Sensitizing dye (a) | 1.08 |
| | | Yellow coupler | 93 |
| | | Developing agent (a) | 104 |
| | | Antifoggant | 0.8 |
| | | High-boiling solvent | 156 |
| | | Surface active agent (a) | 48 |
| | | Water-soluble polymer (a) | 48 |
| 10th | Yellow-color developing layer (Low-sensitivity layer) | Lime-treated gelatin | 835 |
| | | Photosensitive silver halide emulsion (b) | 233* |
| | | Photosensitive silver halide emulsion (c) | 233* |
| | | Sensitizing dye (a) | 2.02 |
| | | Yellow coupler | 286 |
| | | Developing agent (a) | 319 |
| | | Antifoggant | 0.8 |
| | | High-boiling solvent | 476 |
| | | Surface active agent (a) | 48 |
| | | Water-soluble polymer (a) | 48 |
| 9th | Interlayer (Yellow filter layer) | Lime-treated gelatin | 1000 |
| | | Leuco dye Y | 250 |
| | | Surface active agent (c) | 8 |
| | | Water-soluble polymer (a) | 5 |
| | | Hardener (a) | 65 |
| | | Brightener | 1500 |
| 8th | Magenta-color developing layer (High-sensitivity layer) | Lime-treated gelatin | 362 |
| | | Photosensitive silver halide emulsion (d) | 552* |
| | | Sensitizing dye (b) | 1.02 |
| | | Sensitizing dye (c) | 0.21 |
| | | Sensitizing dye (d) | 0.08 |
| | | Magenta coupler | 42 |

TABLE 1-continued

Constitution of Photosensitive Material

| Ordinal number of layer | Name of layer | Ingredients | Coverage rate (mg/m$^2$) |
|---|---|---|---|
| | | Developing agent (a) | 36 |
| | | Antifoggant | 0.06 |
| | | High-boiling solvent | 47 |
| | | Surface active agent (a) | 33 |
| | | Water-soluble polymer (a) | 14 |
| 7th | Magenta-color developing layer (Low-sensitivity) | Lime-treated gelatin | 158 |
| | | Photosensitive silver halide emulsion (e) | 231* |
| | | Sensitizing dye (b) | 0.71 |
| | | Sensitizing dye (c) | 0.15 |
| | | Sensitizing dye (d) | 0.06 |
| | | Magenta coupler | 46 |
| | | Developing agent (a) | 41 |
| | | Antifoggant | 0.06 |
| | | High-boiling solvent | 52 |
| | | Surface active agent (a) | 33 |
| | | Water-soluble polymer (a) | 14 |
| 6th | Magenta color developing layer (High-sensitivity) | Lime-treated gelatin | 441 |
| | | Photosensitive silver halide emulsion (f) | 420* |
| | | Sensitizing dye (b) | 0.90 |
| | | Sensitizing dye (c) | 0.19 |
| | | Sensitizing dye (d) | 0.07 |
| | | Magenta coupler | 238 |
| | | Developing agent (a) | 177 |
| | | Antifoggant | 0.06 |
| | | High-boiling solvent | 265 |
| | | Surface active agent (a) | 33 |
| | | Water-soluble polymer (a) | 14 |
| 5th | Interlayer | Lime-treated gelatin | 1000 |
| | | Surface active agent (c) | 8 |
| | | Zinc hydroxide | 1200 |
| | | Water-soluble polymer (a) | 5 |
| 4th | Cyan-color developing layer (High-sensitivity) | Lime-treated gelatin | 778 |
| | | Photosensitive silver halide emulsion (g) | 1058* |
| | | Sensitizing dye (e) | 1.44 |
| | | Sensitizing dye (f) | 0.07 |
| | | Sensitizing dye (g) | 2.09 |
| | | Cyan coupler | 68 |
| | | Developing agent (a) | 85 |
| | | Developing agent (b) | 42 |
| | | Antifoggant | 0.12 |
| | | High-boiling solvent | 61 |
| | | Surface active agent (a) | 24 |
| | | Water-soluble polymer (a) | 10 |
| 3rd | Cyan color developing layer (Medium-sensitivity) | Lime-treated gelatin | 345 |
| | | Photosensitive silver halide emulsion (h) | 267* |
| | | Sensitizing dye (e) | 1.70 |
| | | Sensitizing dye (f) | 0.08 |
| | | Sensitizing dye (g) | 2.46 |
| | | Cyan coupler | 45 |
| | | Developing agent (a) | 19 |
| | | Developing agent (b) | 9 |
| | | Antifoggant | 0.12 |
| | | High-boiling solvent | 45 |
| | | Surface active agent (a) | 24 |
| | | Water-soluble polymer (a) | 10 |
| 2nd | Cyan-color developing layer (Low-sensitivity layer) | Lime-treated gelatin | 514 |
| | | Photosensitive silver halide emulsion (i) | 456* |
| | | Sensitizing dye (e) | 0.67 |
| | | Sensitizing dye (f) | 0.03 |
| | | Sensitizing dye (g) | 0.97 |
| | | Cyan coupler | 267 |
| | | Developing agent (a) | 111 |
| | | Developing agent (b) | 55 |
| | | Antifoggant | 0.12 |
| | | High-boiling solvent | 239 |
| | | Surface active agent (a) | 24 |
| | | Water-soluble polymer (a) | 10 |
| 1st | Antihala-tion layer | Lime-treated gelatin | 1000 |
| | | Leuco dye B | 221 |
| | | Leuco dye M | 28 |
| | | Brightener | 740 |
| | | Oil | 491 |
| | | Surface active agent (a) | 46 |
| | Support: PEN base (thickness: 90 μm) | | |

*silver basis

Table 2 and 3 show and example of the layer structure of the photosensitive material.

TABLE 2

Constitution of Processing Material

| Ordinal number of layer | Name of layer | Ingredients | Coverage rate (mg/m$^2$) |
|---|---|---|---|
| 4th | Protective layer | Acid-treated gelatin | 220 |
| | | Water-soluble polymer (b) | 60 |
| | | Water-soluble polymer (c) | 200 |
| | | Additive | 20 |
| | | Potassium nitrate | 12 |
| | | Matting agent | 10 |
| | | Surface active agent (c) | 7 |
| | | Surface active agent (d) | 7 |
| | | Surface active agent (e) | 10 |
| 3rd | Interlayer | Lime-treated gelatin | 240 |
| | | Water-soluble polymer (c) | 24 |
| | | Hardener (b) | 360 |
| | | Surface active agent (a) | 9 |
| 2nd | Base generating layer | Lime-treated gelatin | 4800 |
| | | Water-soluble polymer (d) | 1400 |
| | | Guanidine picolate | 5820 |
| | | Potassium quinolinate | 450 |
| | | Sodium quinolinate | 360 |
| | | Surface active agent (a) | 48 |
| 1st | Subbing layer | Lime-treated gelatin | 280 |
| | | Water-soluble polymer (c) | 12 |
| | | Surface active agent (c) | 14 |
| | | Hardener (b) | 370 |
| | Support A (thickness: 63 μm) | | |

TABLE 3

Constitution of Processing Material Support

| Name of layer | Ingredients | Coverage rate (mg/m$^2$) |
|---|---|---|
| Front subbing layer | Lime-treated gelatin | 100 |
| Polymer layer | Polyethylene terephthalate | 62500 |
| Back subbing layer | Polymer (copolymer of methylmethacrylate-styrene, 2-ethylhexylacrylate and methacrylic acid) | 1000 |
| | PMMA latex | 120 |

The additives listed in Tables 1 and 2 and the raw materials used for preparation of these additives are as follows.

Surface active agents (a)

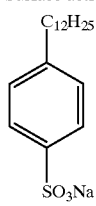

Surface active agents (b)

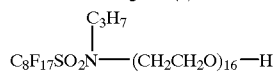

Surface active agents (c)

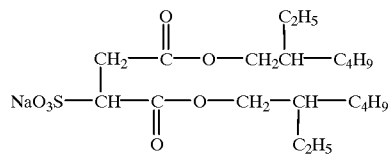

Surface active agents (d)

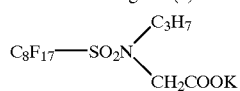

Surface active agents (e)

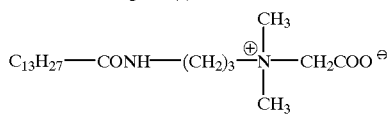

Water-soluble polymer (a)

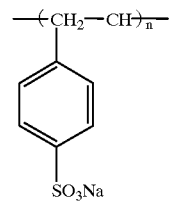

Water-soluble polymer (b)
(Copper)
κ-Carrageenan

Water-soluble polymer (c)
Sumikagel L5H
(product of Sumitomo Chemical Co., Ltd.)

Water-soluble polymer (d)
Dextran (molecular weight: 70,000)

Sensitizing dyes (a)

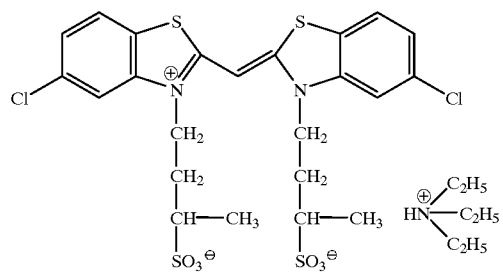

Sensitizing dyes (b)

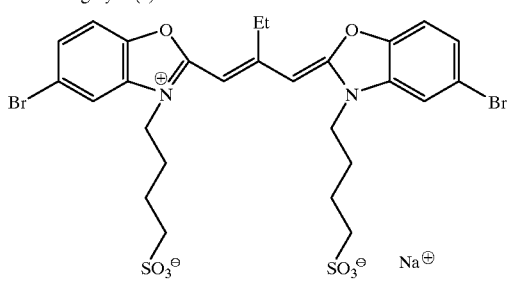

Sensitizing dyes (c)

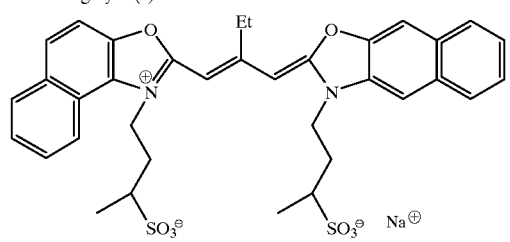

Sensitizing dyes (d)

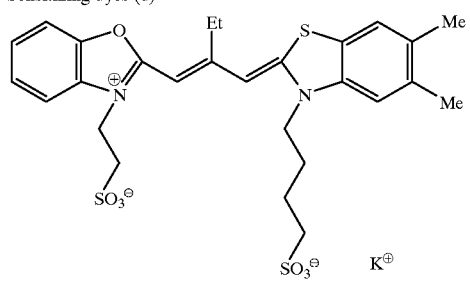

Sensitizing dyes (e)

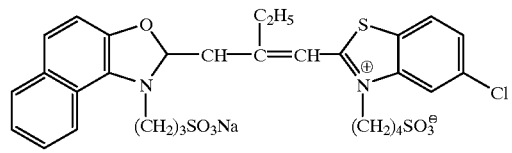

Sensitizing dyes (f)

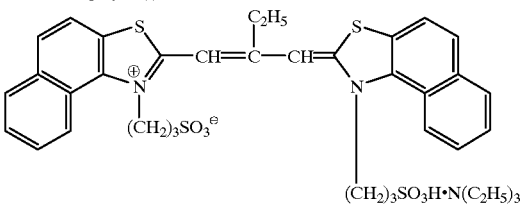

Sensitizing dyes (g)

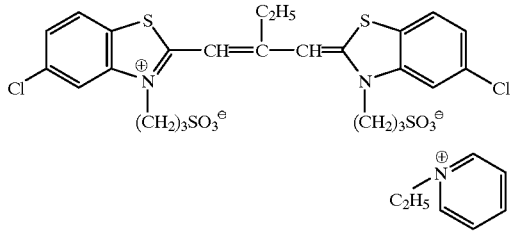

Developing agents (a)
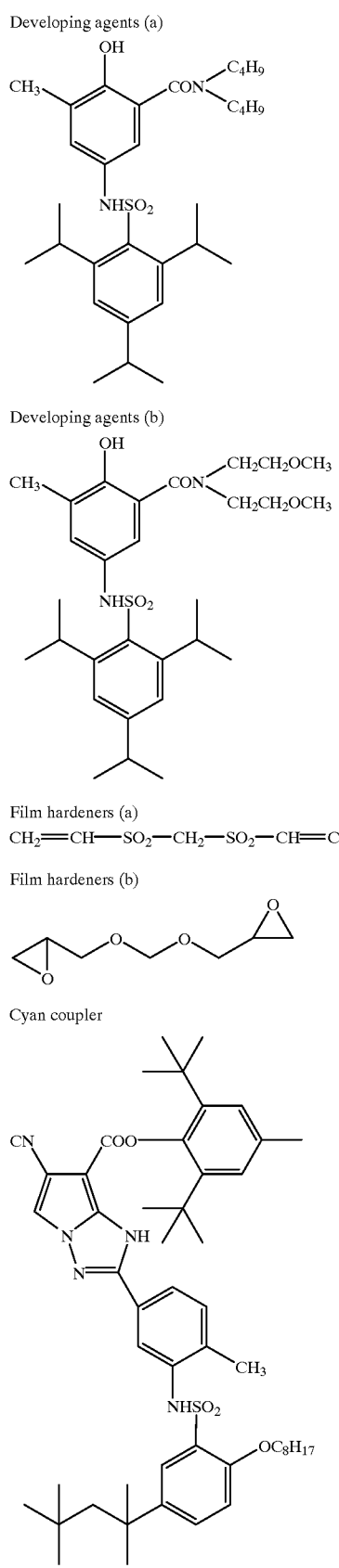
Developing agents (b)
Film hardeners (a)
CH₂=CH—SO₂—CH₂—SO₂—CH=CH₂
Film hardeners (b)
Cyan coupler
Magenta coupler
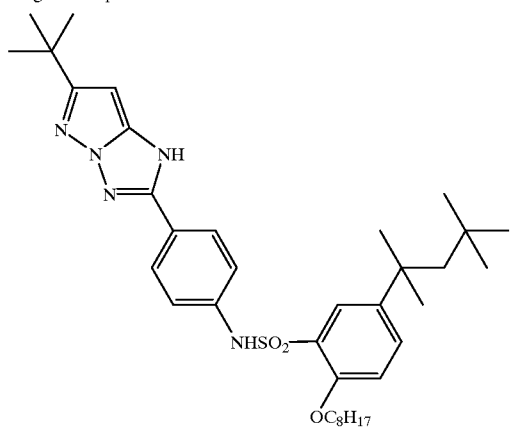
Yellow coupler
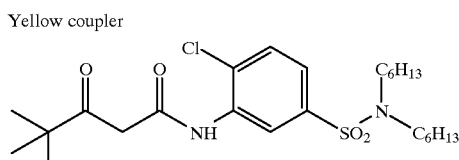
Leuco dye Y
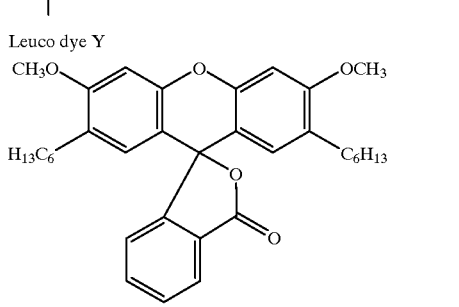
Leuco dye B
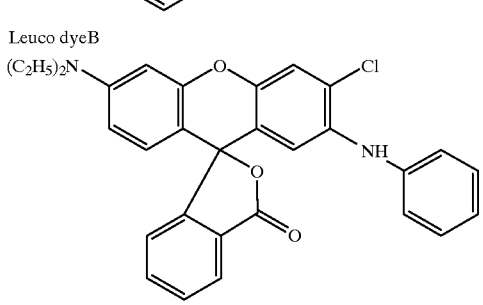
Leuco dye M
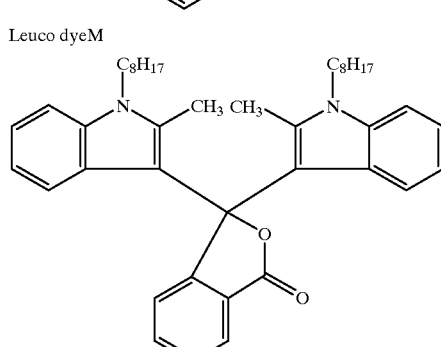
Antifogging agent
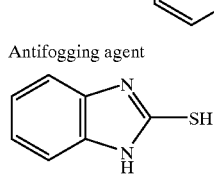

-continued

High boiling solvent

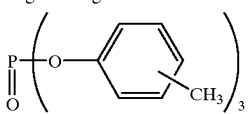

Brightening agent

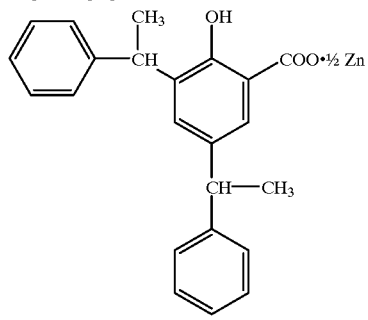

Oil $C_{26}H_{46.9}C_{17.1}$

Selenium sensitizing agent

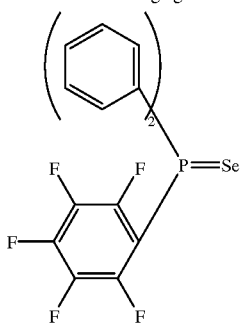

Mercapto compound

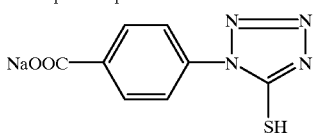

Additive

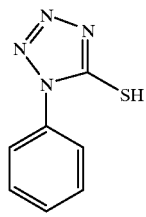

Matting agent

SYLOID 79 (product of Fuji Davison)

(1-2) Preparation of the main additives

The methods of preparing the main additives shown in Table 1 will now be described.

Photosensitive silver halide emulsion (a)

The method of preparing the blue-sensitive silver halide emulsion (a) is as follows.

A solution obtained by dissolving 0.96 g of gelatin (average molecular weight: 12,000) and 0.9 g of potassium bromide in 1,191 ml of distilled water was placed in a reaction vessel and heated to 40° C. Under vigorous stirring, the solution was added with 10.5 ml of aqueous solution (A) containing 0.5 g of silver nitrate and with 10 ml of aqueous solution (B) containing 0.35 g of potassium bromide over a period of 150 seconds. Thirty seconds after completion of the addition, 12 ml of a 10% aqueous potassium bromide solution was added thereto and, 30 seconds later, the temperature of the reaction solution was increased to 75° C. After addition of 35.0 g of lime-treated gelatin and 250 ml of distilled water to the reaction solution, 39 ml of aqueous solution (C) containing 10.0 g of silver nitrate and 30 ml of aqueous solution (D) containing 6.7 g of potassium bromide were added thereto at an accelerating addition flow rate over a period of 3 minutes 15 seconds. Next, 302 ml of aqueous solution (E) containing 96.7 g silver nitrate and aqueous solution (F) containing potassium iodide at a molar ratio to potassium bromide of 7:93 (potassium iodide concentration: 26%) was added thereto over a period of 20 minutes at an accelerating addition flow rate and so that the silver potential of the reaction solution became −20 mV relative to a saturated calomel electrode. Further, 97 ml of aqueous solution (G) containing 24.1 g of silver nitrate and 21.9% aqueous solution of potassium bromide (H) were added over a period of 3 minutes so that the silver potential of the reaction solution became 25 mV relative to the saturated calomel electrode. After the addition, the temperature of the reaction solution was maintained at 75° C. for 1 minute and then lowered to 55° C. Next, 15 ml of a 1N solution of sodium hydroxide was added. Two minutes after the addition, 100 ml of aqueous solution (I) containing 5 g of silver nitrate and 200.5 ml of aqueous solution (J) containing 4.7 g of potassium iodide was added to the reaction solution over a period of 5 minutes. After completion of the addition, 7.11 g of potassium bromide was added and the solution was held at 55° C. for 1 minute, whereafter 248 ml of aqueous solution (K) containing 62 g of silver nitrate and 231 ml of aqueous solution (L) containing 48.1 g of potassium bromide were added over a period of 8 minutes. Thirty seconds later, aqueous solution containing 0.03 g of ethyl thiosodiumsulfonate was added. The reaction solution was lowered in temperature and the emulsion grains were desalted by coagulating sedimentation using Demol, a product of Kao Soap Co., Ltd. Dispersion was conducted by addition of benzene thiosodiumsulfonate, phenoxyethanol, water-soluble polymer (a) and lime-treated gelatin.

Chemical sensitization was conducted at 60° C. Sensitizing dye (a) was dispersed in gelatin and added prior to chemical sensitization, whereafter a mixed solution of potassium thiocyanate and chloroauric acid was added, followed by addition of sodium thiosulfate and selenium sensitizing agent. The chemical sensitization was stopped using a mercapto compound. The amounts of sensitizing dye, chemical sensitizing agent and mercapto compound were optimize for sensitivity and fog.

Tabular grains having an aspect ratio of 2 or more accounted for more than 99% of the total projected area of all grains obtained. The average diameter of the sphere equivalent to the volume of each grain was 1.07 μm, the average grain thickness was 0.38 μm, the average diameter of the circle(s) equivalent to the projected area of each grain was 1.47 μm and the average aspect ratio of the grains was 3.9.

Photosensitive silver halide emulsion (b)

The method of preparing the blue-sensitive silver halide emulsion (b) will now be described.

A solution obtained by dissolving 0.96 g of gelatin (average molecular weight: 12,000) and 0.9 g of potassium bromide in 1,191 ml of distilled water was placed in a reaction vessel and heated to 40° C. Under vigorous stirring, the solution was added with 37.5 ml of aqueous solution (A) containing 1.5 g of silver nitrate and with 37.5 ml of aqueous solution (B) containing 1.051 g of potassium bromide over a period of 90 seconds. Thirty seconds after completion of the addition, 12 ml of a 10% aqueous potassium bromide solution was added thereto and, 30 seconds later, the temperature of the reaction solution was increased to 75° C. After addition of 35.0 g of lime-treated gelatin and 250 ml of distilled water to the reaction solution, 116 ml of aqueous solution (C) containing 29.0 g of silver nitrate and 91 ml of aqueous solution (D) containing 20 g of potassium bromide were added thereto at an accelerating addition flow rate over a period of 11 minutes 35 seconds. Next, 302 ml of aqueous solution (E) containing 96.7 g silver nitrate and aqueous solution (F) containing potassium iodide at a molar ratio to potassium bromide of 3.3:96.7 (potassium iodide concentration: 26%) was added thereto over a period of 20 minutes at an accelerating addition flow rate and so that the silver potential of the reaction solution became 2 mV relative to a saturated calomel electrode. Further, 97 ml of aqueous solution (G) containing 24.1 g of silver nitrate and 21.9% aqueous solution of potassium bromide (H) were added over a period of 3 minutes so that the silver potential of the reaction solution became 0 mV relative to the saturated calomel electrode. After the addition, the temperature of the reaction solution was maintained at 75° C. for 1 minute and then lowered to 55° C. Next, 15 ml of a 1N solution of sodium hydroxide was added. Two minutes after the addition, 153 ml of aqueous solution (I) containing 10.4 g of silver nitrate and 414.5 ml of aqueous solution (J) containing 9.35 g of potassium iodide was added to the reaction solution over a period of 5 minutes. After completion of the addition, 7.11 g of potassium bromide was added and the solution was held at 55° C. for 1 minute, whereafter 228 ml of aqueous solution (K) containing 57.1 g of silver nitrate and 201 ml of aqueous solution (L) containing 43.9 g of potassium bromide were added over a period of 8 minutes. Thirty seconds later, aqueous solution containing 0.04 g of ethyl thiosodiumsulfonate was added. The reaction solution was lowered in temperature and desalting and dispersion were carried out in the same manner as in the case of the blue-sensitive silver halide emulsion (a). Chemical sensitization was conducted in the same manner as for the blue-sensitive silver halide emulsion (a), except that no selenium sensitizing agent was added. The sensitizing dye and the mercapto compound for terminating chemical sensitization were approximately proportional to emulsion grain surface area.

Tabular grains having an aspect ratio of 2 or more accounted for more than 99% of the total projected area of all grains obtained. The average diameter of the sphere equivalent to the volume of each grain was 0.66 μm, the average grain thickness was 0.17 μm, the average diameter of the circle(s) equivalent to the projected area of each grain was 1.05 μm and the average aspect ratio of the grains was 6.3.

Photosensitive silver halide emulsion (c)

The method of preparing the blue-sensitive silver halide emulsion (c) will now be described.

A solution obtained by dissolving 17.8 g of lime-treated gelatin, 6.2 g of potassium bromide and 0.46 g of potassium iodide in 1,345 ml of distilled water was placed in a reaction vessel and heated to 45° C. Under vigorous stirring, the solution was added with 70 ml of aqueous solution (A) containing 11.8 g of silver nitrate and with 70 ml of aqueous solution (B) containing 3.8 g of potassium bromide over a period of 45 seconds. The temperature of the reaction mixture was maintained at 45° C. for 4 minutes and then increased to 63° C. After addition of 24 g of lime-treated gelatin and 185 ml of distilled water to the reaction solution, 208 ml of aqueous solution (C) containing 73 g of silver nitrate and 24.8% aqueous solution of potassium bromide (D) were added thereto over a period of 13 minutes at an accelerating addition flow rate and so that the silver potential of the reaction solution became 0 mV relative to a saturated calomel electrode. After the addition, the temperature of the reaction solution was maintained at 63° C. for 2 minutes and then lowered to 45° C. Next, 15 ml of a 1N solution of sodium hydroxide was added. Two minutes after the addition, 60 ml of aqueous solution (E) containing 8.4 g of silver nitrate and 461 ml of aqueous solution (F) containing 8.3 g of potassium iodide was added to the reaction solution over a period of 5 minutes. Further, 496 ml of aqueous solution (G) containing 148.8 g of silver nitrate and 25% aqueous solution of potassium bromide (H) were added over a period of 47 minutes so that the silver potential of the reaction solution became 90 mV relative to the saturated calomel electrode. Thirty seconds after completion of the addition, aqueous solution containing 2 g of potassium bromide and 0.06 g of ethyl thiosodiumsulfonate was added. The temperature of the reaction solution was lowered and desalting, dispersion and chemical sensitization were carried out in the same manner as in the case of the blue-sensitive silver halide emulsion (b). The emulsion obtain consisted of hexagonal tabular grains, wherein the average diameter of the sphere equivalent to the volume of each grain was 0.44 μm, the average grain thickness was 0.2 μm, the average diameter of the circle(s) equivalent to the projected area of each grain was 0.53 μm and the average aspect ratio of the grains was 2.6.

Photosensitive silver halide emulsion (d)

The method of preparing the green-sensitive silver halide emulsion (d) will now be described.

A solution obtained by dissolving 0.96 g of gelatin (average molecular weight: 12,000) and 0.9 g of potassium bromide in 1,191 ml of distilled water was placed in a reaction vessel and heated to 40° C. Under vigorous stirring, the solution was added with 17.5 ml of aqueous solution (A) containing 0.7 g of silver nitrate and with 17.5 ml of aqueous solution (B) containing 1.051 g of potassium bromide over a period of 120 seconds. Thirty seconds after completion of the addition, 12 ml of a 10% aqueous potassium bromide solution was added thereto and, 30 seconds later, the temperature of the reaction solution was increased to 75° C. After addition of 35.0 g of lime-treated gelatin and 250 ml of distilled water to the reaction solution, 56 ml of aqueous solution (C) containing 19.0 g of silver nitrate and 461 ml of aqueous solution (D) containing 10 g of potassium bromide were added thereto at an accelerating addition flow rate over a period of 7 minutes 35 seconds. Next, 302 ml of aqueous solution (E) containing 96.7 g silver nitrate and aqueous solution (F) containing potassium iodide at a molar ratio to potassium bromide of 3.3:96.7 (potassium iodide concentration: 26%) was added thereto over a period of 20 minutes at an accelerating addition flow rate and so that the silver potential of the reaction solution became 0 mV relative to a saturated calomel electrode. Further, 97 ml of aqueous solution (G) containing 24.1 g of silver nitrate and 21.9% aqueous solution of potassium bromide (H) were added over a period of 3 minutes so that the silver potential of the reaction solution became 0 mV relative to the saturated calomel electrode. After the addition, the temperature of the reaction solution was maintained at 75° C. for 1 minute and then lowered to 55° C. Next, 122 ml of aqueous solution (I) containing 8.3 g of silver nitrate and 332 ml of aqueous solution (J) containing 7.48 g of potassium iodide was added to the reaction solution over a period of 5 minutes. After completion of the addition, 7.11 g of potassium bromide was added and the solution was held at 55° C. for 1 minute, whereafter 228 ml of aqueous solution (K) containing 62.8 g of silver nitrate and 201 ml of aqueous solution (L) containing 48.3 g of potassium bromide were added over a period of 8 minutes. The reaction solution was lowered in temperature and desalting and dispersion were carried out in the same manner as in the case of the blue-sensitive silver halide emulsion (a). Chemical sensitization was also conducted in the same manner as for the blue-sensitive silver halide emulsion (a), except that a gelatin dispersion of a mixture of sensitizing dye (b), sensitizing dye (c) and sensitizing dye (d) was added in place of sensitizing dye (a).

Tabular grains having an aspect ratio of 2 or more accounted for more than 99% of the total projected area of all grains obtained. The average diameter of the sphere equivalent to the volume of each grain was 0.85 μm, the average grain thickness was 0.26 μm, the average diameter of the circle(s) equivalent to the projected area of each grain was 1.25 μm and the average aspect ratio of the grains was 4.8.

Photosensitive silver halide emulsion (e)

The method of preparing the green-sensitive silver halide emulsion (e) will now be described.

The green-sensitive silver halide emulsion (e) was prepared in the same manner as the blue-sensitive silver halide emulsion (b), except that addition of sodium hydroxide and ethyl thiosodiumsulfonate was omitted during grain formation. After desalting and dispersion, chemical sensitization was conducted in the same manner as for the green-sensitive silver halide emulsion (d).

Tabular grains having an aspect ratio of 2 or more accounted for more than 99% of the total projected area of all grains obtained. The average diameter of the sphere equivalent to the volume of each grain was 0.66 μm, the average grain thickness was 0.17 μm, the average diameter of the circle(s) equivalent to the projected area of each grain was 1.05 μm and the average aspect ratio of the grains was 6.3.

Photosensitive silver halide emulsion (f)

The method of preparing the green-sensitive silver halide emulsion (f) will now be described.

The green-sensitive silver halide emulsion (f) was prepared in the same manner as the blue-sensitive silver halide emulsion (c), except that addition of sodium hydroxide was omitted and the amount of ethyl thiosodiumsulfonate added was changed to 4 mg during grain formation. After grain formation, desalting and dispersion, chemical sensitization was conducted in the same manner as for the green-sensitive silver halide emulsion (d) except that addition of selenium chemical sensitizing agent was omitted.

The emulsion obtain consisted of hexagonal tabular grains, wherein the average diameter of the sphere equivalent to the volume of each grain was 0.44 μm, the average grain thickness was 0.2 μm, the average diameter of the circle(s) equivalent to the projected area of each grain was 0.53 μm and the average aspect ratio of the grains was 2.6.

Photosensitive silver halide emulsion (g)

The method of preparing the red-sensitive silver halide emulsion (g) will now be described.

The red-sensitive silver halide emulsion (g) was prepared in the same manner as the green-sensitive silver halide emulsion (d), except that the sensitizing agent added during chemical sensitization was a gelatin dispersion of sensitizing dye (e) and a gelatin dispersion of a mixture of sensitizing dye (f) and sensitizing dye (g).

Tabular grains having an aspect ratio of 2 or more accounted for more than 99% of the total projected area of all grains obtained. The average diameter of the sphere equivalent to the volume of each grain was 0.85 μm, the average grain thickness was 0.26 μm, the average diameter of the circle(s) equivalent to the projected area of each grain was 1.25 μm and the average aspect ratio of the grains was 4.8.

Photosensitive silver halide emulsion (h)

The method of preparing the red-sensitive silver halide emulsion (h) will now be described.

The red-sensitive silver halide emulsion (h) was prepared in the same manner as the green-sensitive silver halide emulsion (e), except that the sensitizing agent added during chemical sensitization was a gelatin dispersion of sensitizing dye (e) and a gelatin dispersion of a mixture of sensitizing dye (f) and sensitizing dye (g).

Tabular grains having an aspect ratio of 2 or more accounted for more than 99% of the total projected area of all grains obtained. The average diameter of the sphere equivalent to the volume of each grain was 0.66 μm, the average grain thickness was 0.17 μm, the average diameter of the circle(s) equivalent to the projected area of each grain was 1.05 μm and the average aspect ratio of the grains was 6.3.

Photosensitive silver halide emulsion (i)

The method of preparing the red-sensitive silver halide emulsion (i) will now be described.

The red-sensitive silver halide emulsion (i) was prepared in the same manner as the green-sensitive silver halide emulsion (f), except that the sensitizing agent added during chemical sensitization was a gelatin dispersion of sensitizing dye (e) and a gelatin dispersion of a mixture of sensitizing dye (f) and sensitizing dye (g)

The emulsion obtain consisted of hexagonal tabular grains, wherein the average diameter of the sphere equivalent to the volume of each grain was 0.44 μm, the average grain thickness was 0.2 μm, the average diameter of the circle(s) equivalent to the projected area of each grain was 0.53 μm and the average aspect ratio of the grains was 2.6

Preparation of Zinc Hydroxide Dispersion:

A mixture of 31 g of the powder of zinc hydroxide having a particle size of the primary particles of 0.2 μm, 1.6 g of carboxymethyl cellulose as a dispersing agent, 0.4 g of sodium polyacrylic acid, 8.5 g of lime-treated ossein gelatin, and 158.5 ml of water was dispersed by a mill using glass beads for one hour. After dispersing, the glass beads were removed by filtration to provide 188 g of the dispersion of zinc hydroxide.

Preparation of Emulsified Dispersion of Color Developing Agent and Coupler:

Each of the oil-phase component and the aqueous component having the compositions shown in Table 4 below was combined with the aqueous component and dispersed in a one liter stainless steel container by a dissolver equipped with a disperser having a diameter of 5 cm at 10,000 rpm for 20 minutes To the dispersion was added warm water of the amount shown in Table 4 below as post addition water and the mixture was mixed at 2,000 rpm for 10 minutes.

Thus, the emulsified dispersions of cyan, magenta, and yellow three color couplers were prepared.

TABLE 4

| Preparation of the Emulsified Dispersions | | | |
|---|---|---|---|
| Ingredients | Cyan | Magenta | Yellow |
| [Oily Phase] | | | |
| Cyan Coupler | 5.63 g | — | — |
| Magenta Coupler | — | 6.87 g | — |
| Yellow Coupler | — | — | 7.86 g |
| Developing Agent (a) | 3.57 g | 5.11 g | 5.11 g |

TABLE 4-continued

Preparation of the Emulsified Dispersions

| Ingredients | Cyan | Magenta | Yellow |
|---|---|---|---|
| Developing Agent (b) | 1.53 g | — | — |
| Antifoggant | 3.0 mg | 1.0 mg | 10.0 mg |
| High Boiling Solvent | 8.44 g | 5.27 g | 6.09 g |
| Ethyl Acetate | 24.0 ml | 24.0 ml | 24.0 ml |
| [Aqueous Phase] | | | |
| Gelatin | 12.0 g | 12.0 g | 12.0 g |
| Surfactant (a) | 0.60 g | 0.60 g | 0.60 g |
| Water | 138.0 ml | 138.0 ml | 138.0 ml |
| Water added after emulsification | 180.0 ml | 180.0 ml | 180.0 ml |

Preparation of Yellow Filter and Antihalation Layer Dye Compositions

The dye composition was prepared as an emulsified dispersion as shown below and added.

To a leuco dye, a developer, and, if necessary, a high-boiling organic solvent was added with ethyl acetate, and the mixture was dissolved by heating to about 60° C. to form a uniform solution. To 100 ml of the solution were added 1.0 g of Surfactant (7) and 190 ml of an aqueous solution of 6.6% lime-treated gelation heated to about 60° C. and the mixture was dispersed by a homogenizer at @10,000 rpm for 10 minutes.

Thus, two kinds of dye dispersions shown in Table 25 below were prepared.

TABLE 5

Preparation of the Dye Dispersions

| Ingredient | Yellow Filter Dye | Antihalation Dye |
|---|---|---|
| Leuco Dye Y | 5.32 g | — |
| Leuco Dye B | — | 4.5 g |
| Leuco Dye M | — | 0.58 g |
| Developer | 30.2 g | 15.1 g |
| Oil | — | 10.0 g |
| Ethyl Acetate | 60.0 ml | 75.0 ml |

(1-3) Preparation of the support

The support of the photosensitive material was prepared by the method illustrated below.

One hundred weight units of polyethylene-2, 6-naphthalate (PEN) polymer and 2 weight units of Tinuvin P.326 (ultraviolet absorbent; product of Ciba-Geigy Corporation) were dried, melted by heating to 300° C., extruded through a T-die, longitudinally stretched 3.3 fold at 140° C., laterally stretched 3.3 fold at 130° C., and heat-fixed for 6 seconds at 250° C. to obtain a 90-$\mu$m-thick PEN film.

The PEN film was added with appropriate amounts of blue dye, magenta dye and yellow dye (I-1, 1-4, 1-6, I-24, 1-26, I-27 and II-5 described in Kokai Giho 94-6023). It was further wrapped about a 20-cm-diameter stainless steel core and imparted with a 110° C., 48-hr heat history to obtain a support resistant to curling.

Coating with subbing layers

Both surfaces of the support were subjected to corona discharge treatment, UV irradiation treatment and glow discharge treatment. Each surface was then coated with subbing solutions of gelatin at 0.1 g/I$^2$, salicylic acid at 0.04 g/m$^2$, p-chlorophenol $(CH_2=CHSO_2CH_2CH_2NHCO)_2CH_2$ at 0.012 g/m$^2$ and polyamide-epichlorohydrin polymer at 0.02 g/m$^2$ (10 cc/m$^2$, by use of a bar coater). The subbing layer was formed on the high-temperature side during stretching. Drying was conducted at 115° C. for 6 minutes. (The rollers and conveyance apparatus portions in the drying zone were all kept at 115° C.)

Coating with backing layers

After subbing, an antistatic layer, a transparent magnetic recording layer and a slipping layer of the compositions shown below were coated on one surface of the support as backing layers.

Coating with antistatic layer

The antistatic layer was formed by coating a dispersion of fine particles of a composite of tin oxide-antimony oxide having an average grain diameter of 0.005 $\mu$m and exhibiting a specific resistance of 5$\Omega$•cm (secondary coagulation grain diameter of 0.08 $\mu$m) at 0.2 g/m$^2$, gelatin at 0.05 g/m$^2$, $(CH_2=CHSO_2CH_2CH_2NHCO)_2CH_2$ at 0.02 g/m$^2$ and poly (polymerization degree: 10) oxyethylene-p-nonylphenyl at 0.005 g/m$^2$, and resorcinol.

Coating with transparent magnetic recording layer

A 1.2-$\mu$m-thick magnetic recording layer was formed by using a bar coater to apply 0.06 g/m$^2$ of cobalt-$\gamma$-iron oxide coated with 3-poly (polymerization degree: 15) oxyethylene-propyloxytrimethoxysilane (15 wt %) (specific surface area: 43 m$^2$/g; major axis: 0.14 $\mu$m; minor axis: 0.03 $\mu$m; saturation magnetization: 89 emu/g; $Fe^{+2}/Fe^{+3}$=6/94; surface treated with alumina-silica at 2 wt % of the iron oxide) dispersed in 1.2 g/m$^2$ of acetyl cellulose (dispersion of the iron oxide was conducted with an open kneader and a sand mill) using 0.3 g/m$^2$ Of $C_2H_5C(CH_2CONH-C_6H_3 (CH_3)NCO)_3$ as curing agent and acetone, methylethylketone, cyclohexanone and dibutylphthalate as solvent. Fifty mg/m$^2$ of $C_6H_{13}CH(OH)C_{10}H_{20}COOC_{40}H_8i$ was added as slipping agent. Silica particles (1.0 $\mu$m) and alumina abrasive powder (0.20 $\mu$m and 0.10 $\mu$m) coated with 3-poly (polymerization degree: 15) oxyethylene-propyloxytrimethoxysilane (15 wt %) were added as matting agents in respective amounts to obtain coverage rates of 50 mg/n$^2$ and 10 mg/m$^2$. Drying was conducted at 115° C. for 6 minutes. (The rollers and conveyance apparatus portions in the drying zone were all kept at 115° C.) The increase in $D_B$ color density of the magnetic recording layer under X-light (blue filter) was approximately 0.1. The magnetic recording layer exhibited a saturation magnetization moment of 4.2 emu/g, a coercive force of 7.3×10$^4$ A/m and squareness ratio of 65%.

Preparation of slipping layer

The slipping layer was prepared by coating with hydroxyethyl cellulose (25 mg/m$^2$), $C_6Hl_3CH(OH)C_{10}H_{20}COOC_{40}H_{81}$ (6 mg/m$^2$) and 1.5 mg/m$^2$ of silicone oil (BYK-310, product of Bic Chemi Japan). This mixture was prepared by melting at 105° C. in xylene/propylene glycol monomethyl ether (1/1), dispersion by pouring into propylene monomethyl ether (ten-fold amount) at normal room temperature, and addition after being made into a dispersion (average grain diameter: 0.01 $\mu$m) in acetone. Drying was conducted at 115° C. for 6 minutes. (The rollers and conveyance apparatus portions in the drying zone were all kept at 115° C.) The slipping layer exhibited excellent properties: a coefficient of dynamic friction of 0.10 (5 mm $\phi$ hard stainless steel sphere, load of 100 g, speed of 6 cm/min), a coefficient of static friction of 0.08 (clip method) and coefficient of dynamic friction between itself and the emulsion agent surface of 0.15.

(1-4) Other additive examples

The foregoing photosensitive material was defined as Example 1. Examples 2 to 5 of the photosensitive material were prepared in exactly the same way as Example 1 except that combination of color developing agent and coupler used in the Example 1 was changed as shown in Table 6. As in the case of Example 1, the images obtained by exposure and development of Examples 1 to 4 were also excellent. The mole amounts of the additives used were the same as in Example 1.

TABLE 6

Examples of Other Developing Agent and Coupler Combinations

| | Photosensitive material | | | | | |
|---|---|---|---|---|---|---|
| | RL | | GL | | BL | |
| | Devel Agent | Coupler | Devel Agent | Coupler | Devel Agent | Coupler |
| Exmp. 2 | (c) | (c) | (c) | (a) | (f) | (d) |
| Exmp. 3 | (c) | (c) | (d) | (b) | (f) | (d) |
| Exmp. 4 | (f) | (f) | (d) | (b) | (g) | (e) |
| Exmp. 5 | (f) | (f) | (d) | (b) | (e) | (a) |

The developing agents and couplers shown in Table 6 are as indicated by the following formulas.

Developing agent (c)

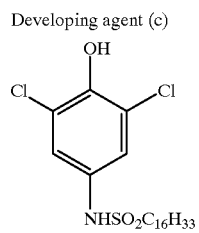

Developing agent (d)

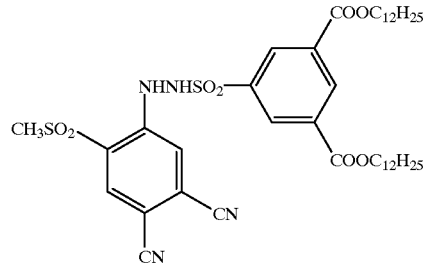

Developing agent (e)

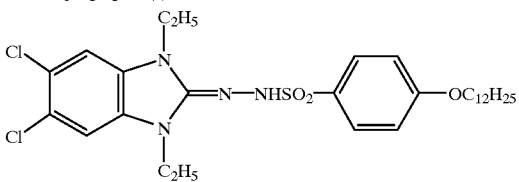

Developing agent (f)

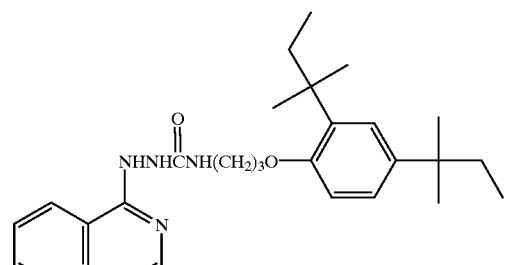

Developing agent (g)

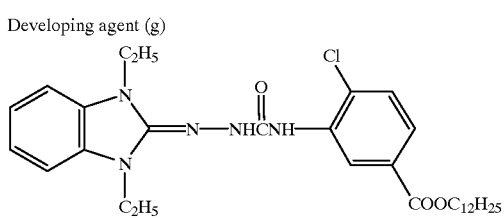

Coupler (a)

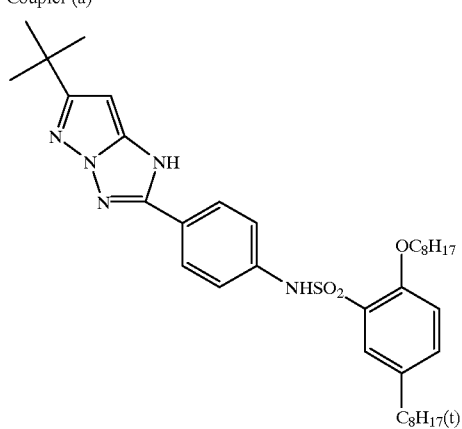

Coupler (b)

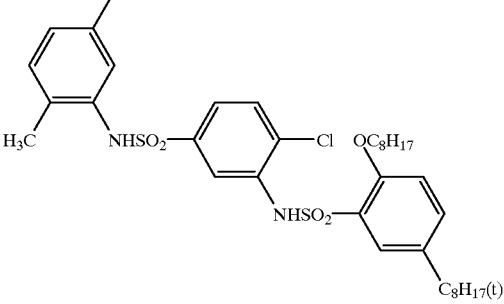

Coupler (c)

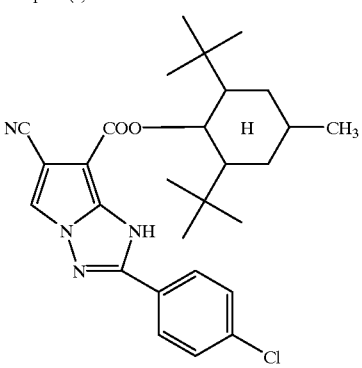

-continued

Coupler (d)

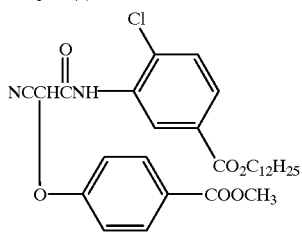

Coupler (e)

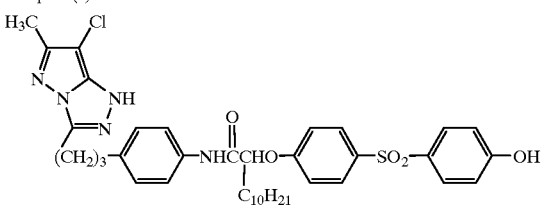

Coupler (f)

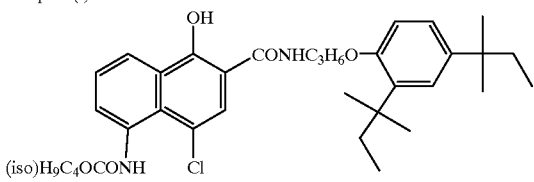

(1-5) Preparation and exposure of photographic film

The prepared photosensitive materials were cut to APS format, i.e., to a width of 24 mm and a length of 160 cm, perforated, loaded into an APS camera, and used to photograph human subjects and a Macbeth chart. While the following explanation is made with respect to the APS format, the photosensitive material of this invention is of course also usable in the 135 film format.

Using the image forming system described later, the exposed photosensitive material was imparted with 40° C. water at 15 cc/m² (corresponding to a maximum swelling amount of 45%), superimposed on a processing material prepared in manner described earlier, and heated for 20 seconds from the back surface of the photosensitive material using an 83° C. heating drum. A negative image was obtained on the photosensitive material when the processing material was peeled off the photosensitive material.

Photosensitive materials similarly processed after being left to stand for three days in a 45° C., 80% relative humidity environment also all afforded excellent images.

Similarly cut photosensitive materials were formed 0.7 mm inward from one longitudinal side with pairs of 2 mm×2 mm perforations. The members of each pair were separated by 5.8 mm and the pairs were formed at intervals of 32 mm. Each cut sample was loaded into a plastic film cartridge of the type illustrated in FIGS. 1–7 of U.S. Pat. No. 5,296,887.

The samples accommodated in the cartridges were loaded into lens-fitted photographic film units of the type illustrated in FIG. 2 of EP-A-723,180.

Various subjects differing in brightness were simultaneously photographed using flashless lens-fitted photographic film units each loaded with a so-obtained cartridge containing a different type of film. As in the case of using APS cameras, images of excellent graininess and sharpness were obtained.

(2) Image forming system

An embodiment of the image forming system according to the invention will now be explained in detail. The configuration of the image forming system of this invention is shown by the block diagram of FIG. 2 touched on briefly earlier. The blocks of the system shown in this diagram can all be housed in a single case or can be constituted as stand-alone units, such as a developer, a film scanner, a personal computer for image processing, a digital printer and the like, interconnected into a single system. Otherwise, each block can be provided as a separate component mountable in a dedicated case and a system suitable for the needs at hand can be built by selecting the required components and mounting them in the case.

Since various types of media drives and digital printers can be utilized in the output section, this section of the system is preferably equipped with drives and printer of different types and arranged to switch among them automatically in response to the order received from the customer.

The case of the all-in-one system incorporating all system functions can be constituted as a generally box-like unit of somewhat smaller size the conventional laboratory system. It is not limited to this shape, however, and can have various appearances depending on the type of digital printer and user interface.

The embodiment described in the following comprises a developer-reader and an output section.

The developer-reader is made up of the setting section 5, the developing section 1, the read-out section 2 and the image processing section 3 shown in the block diagram of FIG. 2. The output section, indicated by reference numeral 4 in FIG. 2, is connected with the developer-reader and includes three types of digital printers (a xerographic digital printer, an ink-jet digital printer and a printer which produces prints by developing a photosensitive material after exposing it with a laser beam). The developer-reader and the digital printers are each equipped with a monitor, a number of dedicated operating buttons and a keyboard. Each is also provided with a speaker for sounding warnings. The steps of processing an exposed photographic film between setting of the film into the system to preparation of prints will now be explained in order.

(2-1) Developing section

Figure 3:
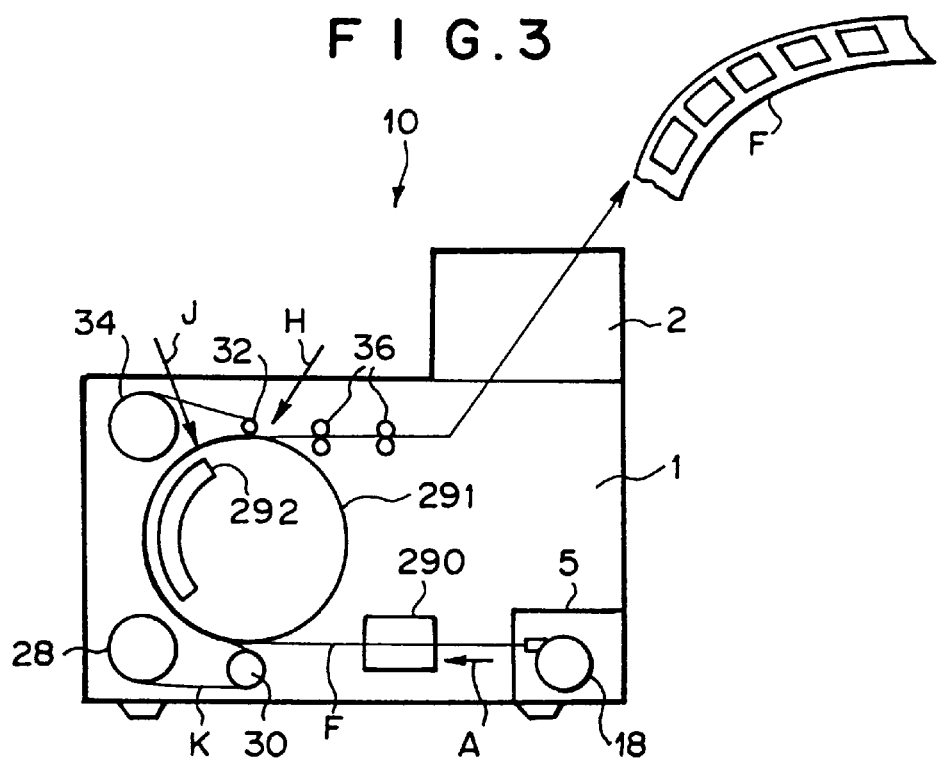
FIG. 3 is a diagram showing a developer-reader in an embodiment of the invention.

As shown in FIG. 3, the developing section 1 is equipped with a setting section 5 adapted to be loaded with a film container containing exposed film F. The setting section 5 has a recessed cartridge retaining section 18 and a recessed lens-fitted photographic film unit retaining section (not shown) specially configured for snugly receiving photographic film used in the system of this invention, namely, for receiving a specially configured cartridge and a specially configured lens-fitted photographic film unit.

The setting section 5 is equipped with a light-shielding shutter. The light-shielding shutter closes automatically when the user presses a "ready" button (not shown) to notify the system that setting of a cartridge or lens-fitted photographic film unit has been completed.

The cartridges and lens-fitted photographic film unit usable in the invention system is marked with a bar code identifying the film type. When the ready button is pressed, a bar-code reader built into the system reads this bar code. If the bar codes indicates that the set film is of a type that the system cannot process, the system issues a warning via the speaker and displays an error message on the monitor to inform the user that the film cannot be processed. In such a case, the light-shielding shutter is not closed and the film container is returned to the user.

The following explanation will be made on the assumption that the setting of a cartridge placed in the setting section by the user has been properly completed.

When the light-shielding shutter has closed and the film container is shielded from light, the film F is drawn out of the set cartridge and conveyed in the direction of the arrow A by conveyance rollers (not shown). The empty cartridge removed of the film F is transferred along a separate conveyance path to a prescribed collecting section (not shown) where it is collected.

A solvent-imparting apparatus 290 is provided in the film conveyance path downstream of the cartridge retaining section 18 as means for imparting solvent to the film F. A drum 291 and a conveyance roller 30 are provided downstream of the solvent-imparting apparatus 290. After the film F has passed through the solvent-imparting apparatus 290, it passes between the drum 291 and the conveyance roller 30.

The developing section 1 is provided with a feed reel 28 wound with a roll of processing material K comprising a support bearing a layer containing mordant for developing the film F. The processing material K is conveyed from the feed reel 28 toward the conveyance roller 30, passed around the outer side of the conveyance roller 30 and wrapped around one side of the drum 291 (the left side in FIG. 3). The processing material K further passes around a conveyance roller 32 provided near the topside of the drum 291 and is taken up and stored on a take-up reel 34.

The film F passes between the bottom surface of the drum 291 and the top surface of the conveyance roller 30, wraps along one side of the drum 291 and is conveyed along this side of the drum 291 as sandwiched between the processing material K and the surface of the drum 291. As a result, the film F and the processing material K are conveyed in a superimposed state. Since the film F has been imparted with water by the solvent-imparting apparatus 290, the film F and the processing material K are conveyed along the surface of the drum 291 in close, gap-free contact.

Near the left-side surface of the drum 291 as viewed in FIG. 3 is provided a heating section 292 for heating the film F and the processing material K in the superimposed state. Whether or not the leading end of the film F has reached the end of the heating region of the surface of the drum 291 (i.e., the region heated by the heating section 292, the end of which is indicated by the arrow J) is monitored by a sensor. The conveyance rollers are controlled in response to the output of the sensor for continuing conveyance of the film F and the processing material K until the film F reaches the heating position. When the film F reaches the heating region, the conveyance of the film F and the processing material K is once halted and then resumed after the film F and the processing material K have been heated at the heating region by the heating section 292 for a prescribed time period.

When the superimposed film F and processing material K reach the top of the drum 291, the processing material K is turned back about the conveyance roller 32 and peeled off the film F. The film F removed of the processing material K is conveyed to the read-out section 2 by conveyance rollers 36.

Since the diameter of the conveyance roller 32 is much smaller than that of the drum 291, the turning back of the processing material K by the conveyance roller 32 at the top of the drum 291 reduces the radius of curvature of the processing material K conveyance path. As a result, the processing material K is readily peeled off the film F.

The structure of the solvent-imparting apparatus 290 will now be explained with reference to FIGS. 3 to 5. This embodiment uses water as the solvent for image formation.

Figure 4:
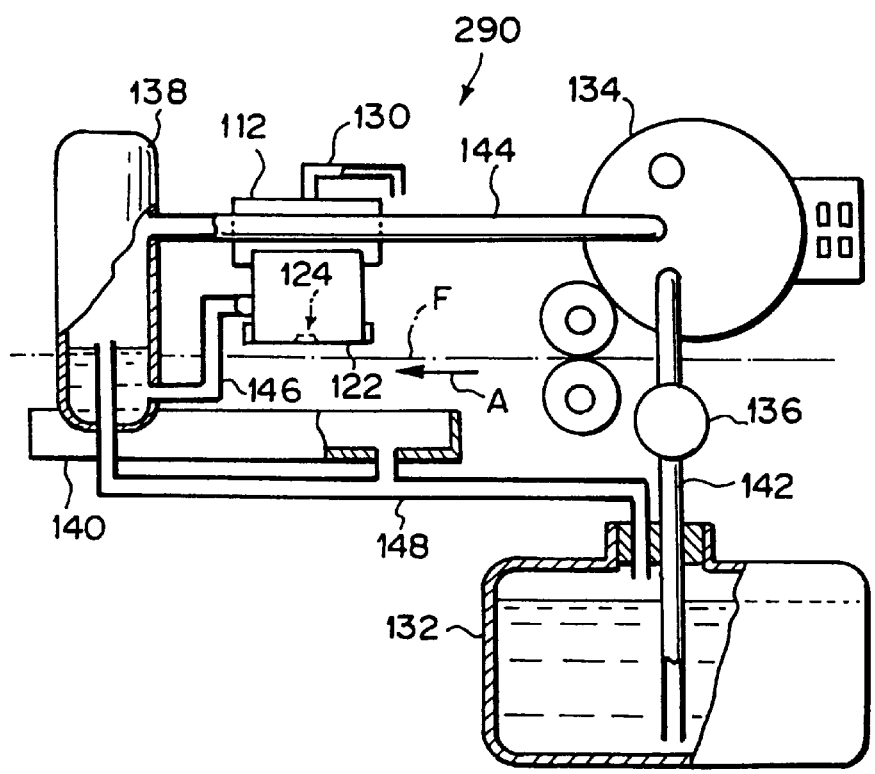
FIG. 4 is a diagram showing a solvent-imparting apparatus.

As shown in FIG. 4, the solvent-imparting apparatus 290 is equipped with a jet tank 112 for storing water to be jetted onto the film F and jetting water onto the film F under the control of a developer-reader control section 40 to be explained later.

A water bottle 132 for storing water for supply to the jet tank 112 is disposed diagonally below the jet tank 112. A filter 134 is disposed above the water bottle 132 for filtering the water. The water bottle 132 and the filter 134 are connected by a water feed pipe 142 fitted midway with a pump 136.

A sub-tank 138 for storing water to be passed to the water bottle 132 is disposed to the side of the jet tank 112. The sub-tank 138 is connected with the filter 134 via a water feed pipe 144.

When the pump 136 is operated, therefore, water is passed from the water bottle 132 to the filter 134, is filtered by the filter 134 and the filtered water is forwarded to the sub-tank 138, where it is temporarily stored.

The sub-tank 138 and the jet tank 112 are connected by a water feed pipe 146. The jet tank 112 is filled by water supplied from the water bottle 132 by the pump 136 through the filter 134, the sub-tank 138, the water feed pipe 146 etc.

A tray 140 connected with a return pipe 148 leading to the water bottle 132 is provided below the jet tank 112. Overflow water from the jet tank 112 is received by the tray 140 and returned to the water bottle 132 through the return pipe 148. The return pipe 148 also extends to and projects into the sub-tank 138 so that water in excess of the required amount accumulating in the sub-tank 138 is returned to the water bottle 132. A nozzle plate 122 formed by bending a rectangular piece of elastically deformable thin plate material is disposed at the lower extremity of the jet tank 112 (i.e., at the portion facing the conveyance path of the film F).

Multiple nozzle holes 124 (measuring several tens of $\mu$m in diameter, for example) for jetting water contained in the jet tank 112 are disposed in the nozzle plate 122 at regular intervals along a straight line which intersects the direction of film F conveyance (lies perpendicular to the drawing sheet of FIG. 4) and extends across the whole width of the film F.

An air release pipe 130 extends from the upper portion of the jet tank 112 for enabling communication between the interior and exterior of the jet tank 112. The air release pipe 130 can be opened and closed by a valve installed therein (not shown). By opening and closing of the valve, the interior of the jet tank 112 can be communicated with and shut off from the external air.

Figure 5:
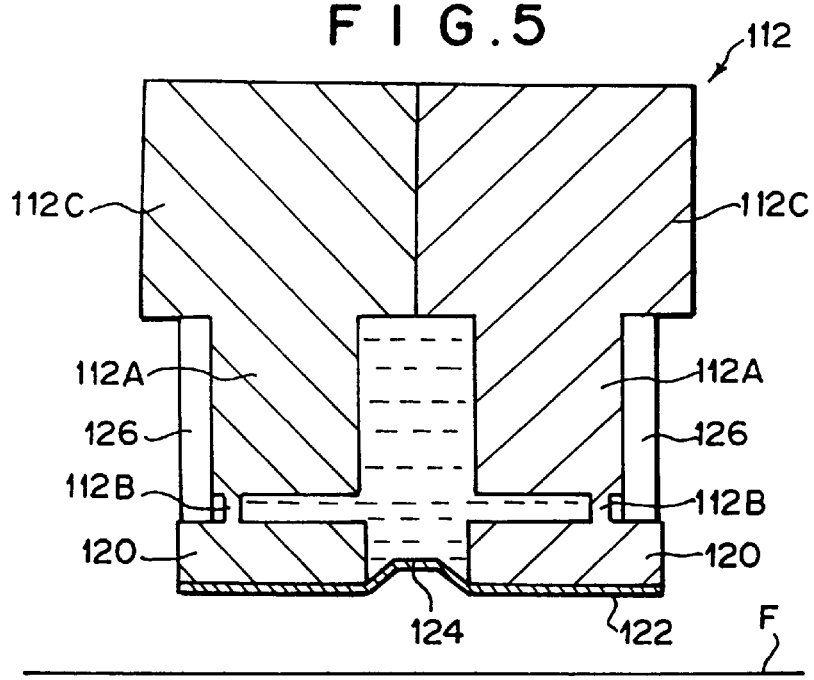
FIG. 5 is a sectional view of a jet tank provided in the solvent-imparting apparatus of FIG. 4.

The jet tank 112 is shown in FIG. 5. As illustrated, the end portions of the nozzle plate 122 are fixed one to each of a pair of lever plates 120 as by adhesion with a bonding agent or the like. Each lever plate 120 is attached to one of a pair of side walls 112A of the jet tank 112 through a support member 112B of thin width formed at the lower portion of the side wall 112A.

The surface of the crown of the jet tank 112 is formed by a pair of abutting crown walls 112C parts of which project outward of jet tank 112 proper and a number of piezoelectric elements 126 (three per side, for example) are attached to the undersurfaces of the projecting portions of the crown walls 112C. The lower surfaces of these piezoelectric elements 126 are attached to the outer edge portions of the lever plates 120, thereby connecting the piezoelectric elements 126 and the lever plates 120.

Figure 6:
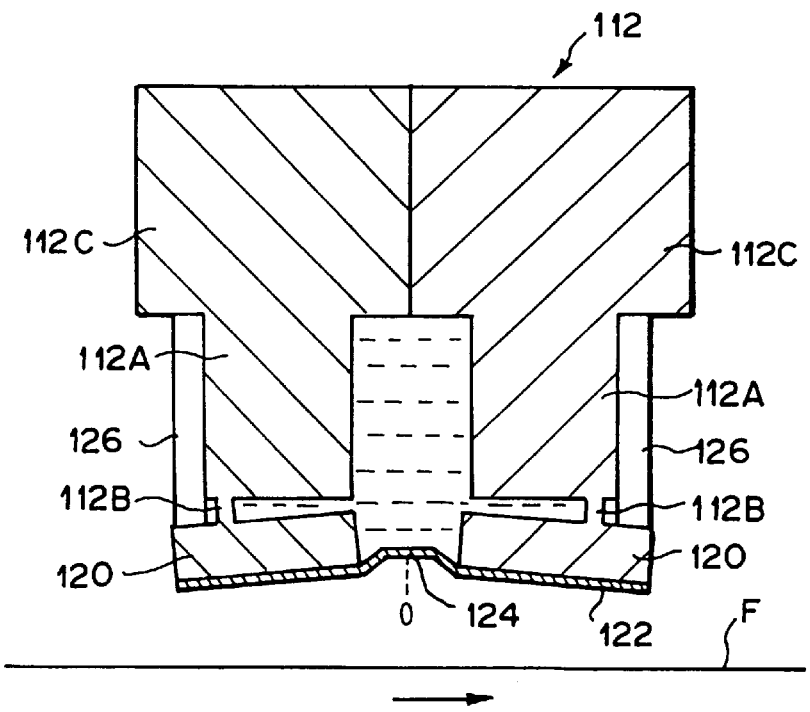
FIG. 6 is a sectional view showing the jet tank of FIG. 5 at the time of jetting solvent.

The piezoelectric elements 126, the lever plates 120 and the support members 112B thus constitute a lever mechanism. Specifically, as shown in FIG. 6, when the outer edge portions of the lever plates 120 are moved downward by the piezoelectric elements 126, the inner edge portions of the lever plates 120 are moved upward. This displacement is transferred to the nozzle plate 122, whereby the nozzle plate 122 is displaced and the water in the jet tank 112 pressurized. As a result, water is jetted from the jet tank 112 through the nozzle holes 124 toward the film F.

Figure 7:
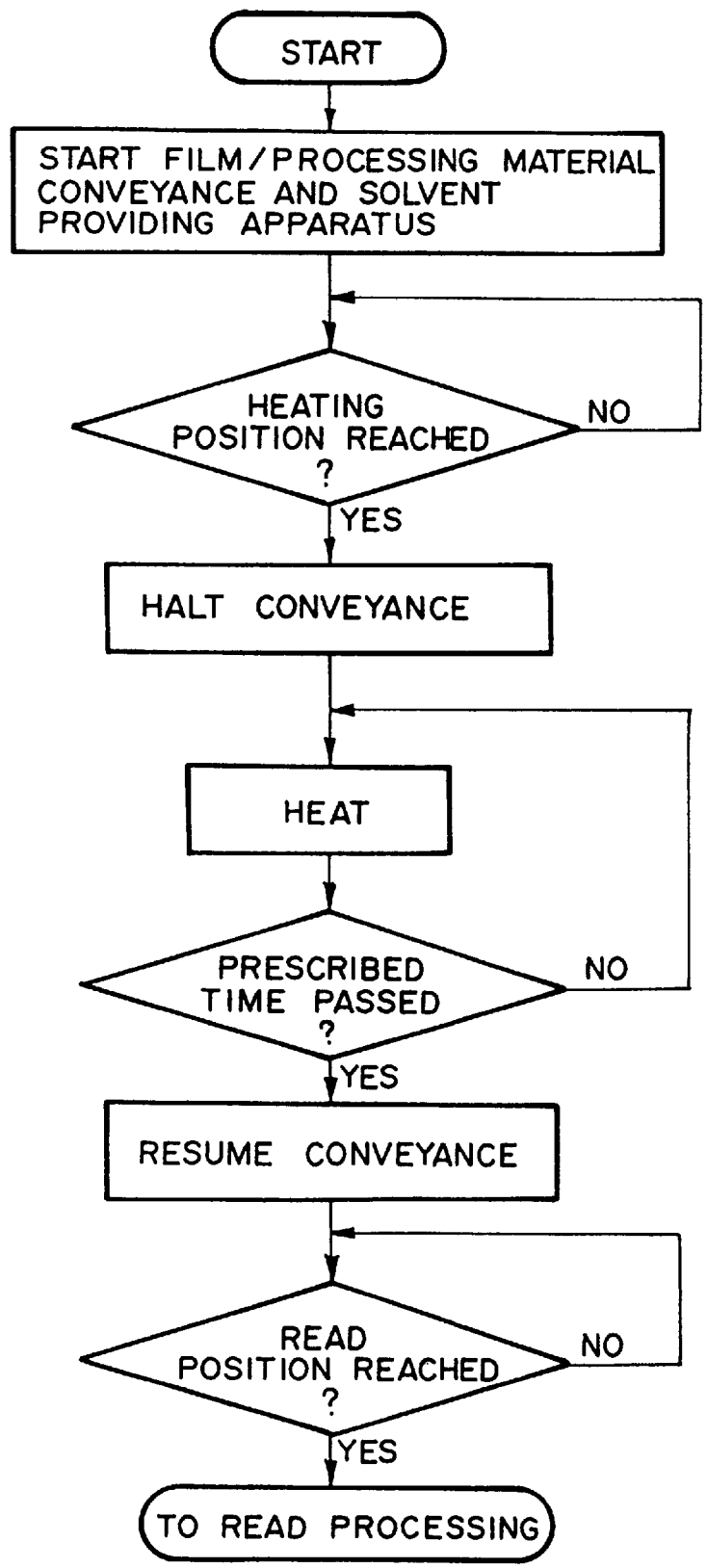
FIG. 7 is a flowchart showing a control routine executed by the control section of the developer-reader of FIG. 3.

An example of the processing for controlling the solvent-imparting apparatus 290, the conveyance rollers and the like is shown by the flowchart of FIG. 7.

As explained in the foregoing, the entire film F can be heat-developed by halting the conveyance of the film F and the processing material K so that they can be heated by the heating section 292. The invention is not limited to this, however, and it is alternatively possible, for example, to start the heating by the heating section 292 at the time of starting the conveyance of the film F and the processing material K and to heat-develop the film F imparted with water by the solvent-imparting apparatus 290 by heating it as it is conveyed at a constant speed as held between the processing material K and the drum 291. Conveying the film F at a constant speed as held in this manner ensures that the image of every frame of the film F is heated for the same time, thereby enabling heat development to be conducted without unevenness from start to finish. This method of heat development also eliminates the need to make the heating region produced by the heating section 292 large enough to cover the entire film F and enables the film F to be heat developed during conveyance without requiring conveyance of the film F and the processing material K to be halted and resumed.

(2-2) Read-out section and image processing section

The read-out section 2 and the image processing section 3 will now be explained. Read-out sections 2a and 2b will be described as two examples of the configuration of the read-out section 2.

Figure 8A:
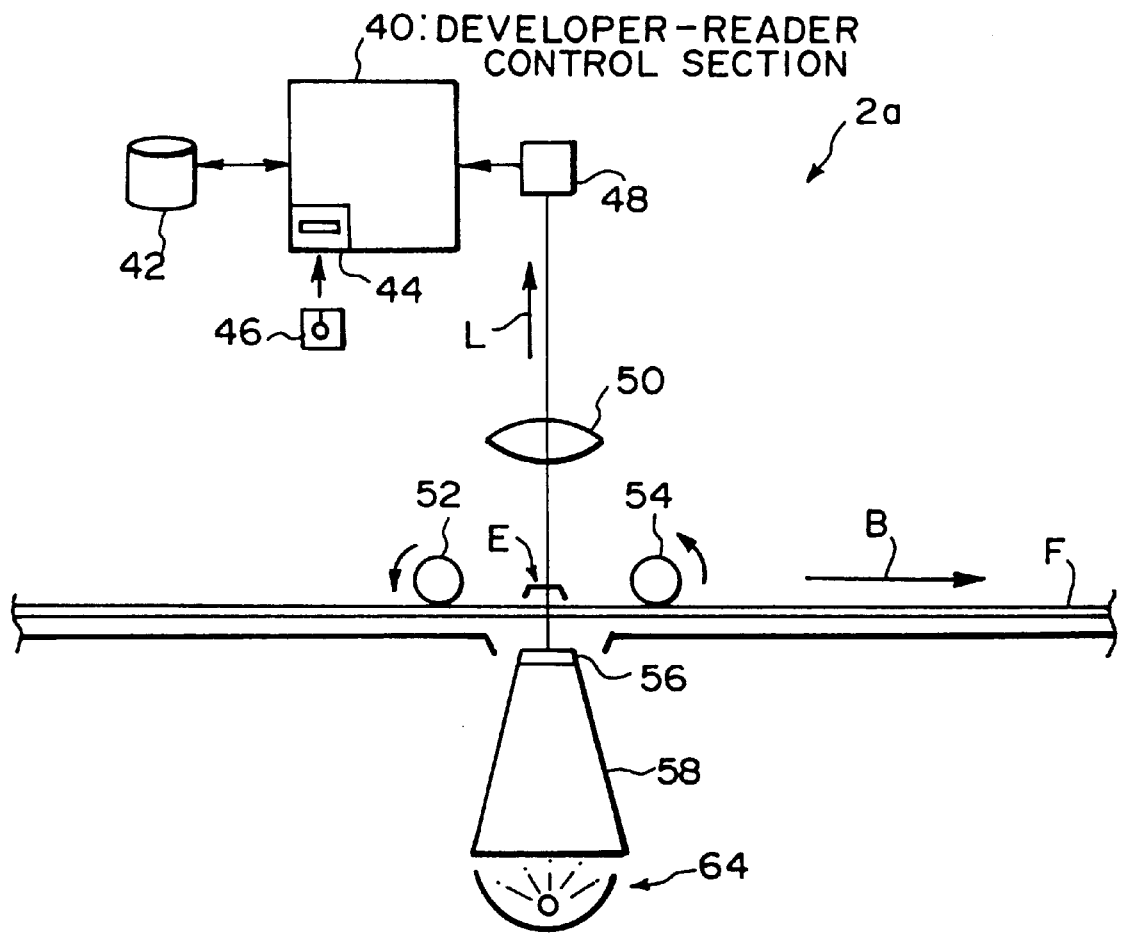
FIG. 8(A) is diagram showing an example of the configuration of a read-out section and FIG. 8(b) is a schematic view of a CCD sensor.

The read-out section 2a will be explained first with reference to FIGS. 8(A) and 8(B). FIG. 8(A) is a diagram showing the read-out section 2a as viewed in a direction perpendicular to the conveyance direction of the film F indicated by the arrow B. The film F developed by the developing section 1 and conveyed to the read-out section 2a by conveyance rollers (not shown) arrives at a prescribed read-out position E between conveyance rollers 52 and 54. Similarly to in the conveyance of the film F to the heating section 292, a sensor in the read-out section monitors whether or not the film F has arrived at read-out position E and the conveyance is halted when its arrival is detected.

The read-out section 2a is equipped with a light source 64 for emitting a light beam toward the read-out position E. To prevent unevenness in the light quantity, a mirror box 58 and a diffusion plate 56 are provided in the order mentioned downstream of the light source 64 relative to direction of light travel (indicated by the arrow L).

A lens 50 is provided further downstream, on the other side of the film conveyance path, and, downstream of this, a CCD sensor 48 is disposed for reading a transmitted image produced by transmission of light through the film F. The lens 50 is for focusing the light transmitted through the film F on the CCD sensor 48.

Figure 8B:
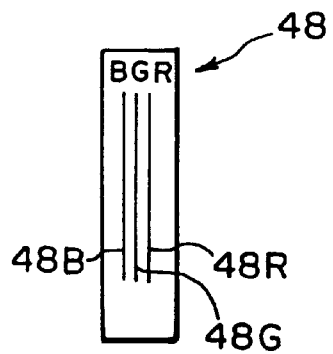

As shown in FIG. 8(B), the CCD sensor 48 comprises a blue-component reading section 48B constituted of a line sensor for reading the blue component of the image, a green-component reading section 48G constituted as a line sensor for reading the green component, and a red component reading section 48R constituted as a line for reading the red component. The so-configured CCD sensor 48 digitally reads each color component of the image produced by the light transmitted through the film F line by line as the film F passes through the read-out position E.

As shown in FIG. 8(A), the CCD sensor 48 is connected with a developer-reader control section 40 which includes a microcomputer and controls the various processing operations of the developer-reader. The CCD sensor 48 transmits the image data read for each color component to the developer-reader control section 40. The developer-reader control section 40 is provided with a floppy disk drive 44 and is further connected with a magnetic storage unit 42. After the developer-reader control section 40 has effected prescribed image processing on the received image data, it can store the processed data on a floppy disk 46 inserted in the floppy disk drive 44 or in the magnetic storage unit 42. It can also read the stored data.

Figure 9:
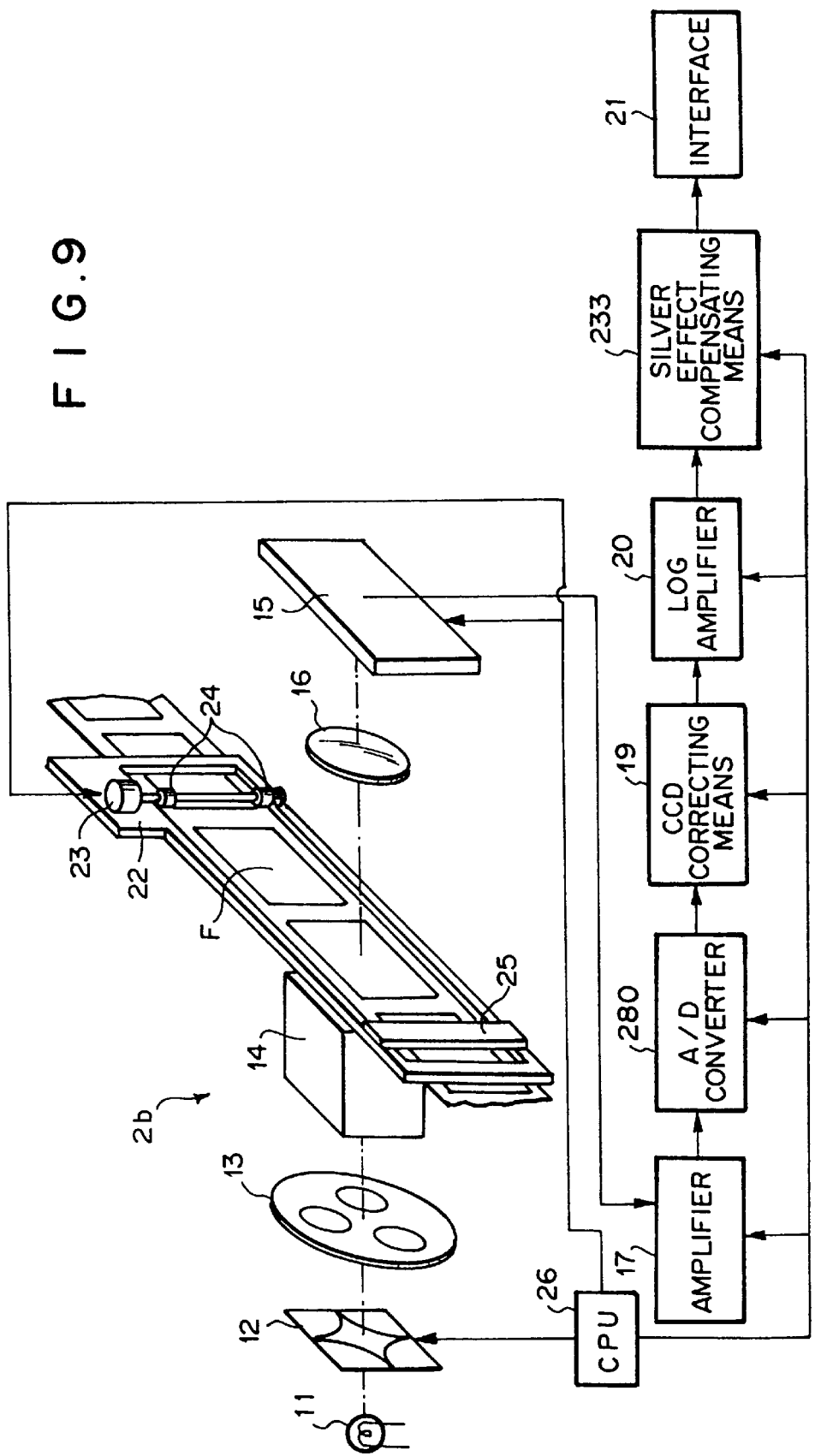
FIG. 9 is a diagram showing another configuration of the read-out section.

As in the read-out section 2b shown in FIG. 9, it is also possible to use a CCD area sensor 15 capable of two-dimensional image reading.

The read-out section 2b shown in FIG. 9 is adapted to photoelectrically read a color image by directing light onto a color image recorded on a film F which is a negative film made of the photosensitive material used in the invention and detecting the light transmitted through the film. It comprises a light source 11, a light regulating unit 12 for regulating the passage (quantity) of the light emitted by the light source 11, a color separation unit 13 for separating the light emitted by the light source 11 into R (red), G (green) and (B) color components, a diffusing unit 14 for diffusing the light emitted by the light source 11 so that it evenly illuminates the film F, a CCD area sensor 15 for photoelectrically detecting the light transmitted through the film F and a motor-driven zoom lens 16 for focusing the light transmitted through the film F on the CCD area sensor 15. By exchanging a film carrier (not shown), the read-out section 2b can be adapted for reading out various types of film, including 135 negative film, 135 positive film and advanced photo system (APS) film.

A halogen lamp is used as the light source 11, while the light regulating unit 12 is adapted to regulate passage of light by the movement of two diaphragm plates, the distance of plate movement being an index of the quantity of light passed. The color separation unit 13 sequentially separates the light into three colors frame to frame by rotating a disk fitted with R, G and B filters. The light-receiving elements of the CCD area sensor 15 are arranged to provide 920 pixels vertically and 1,380 pixels laterally. This is sufficient for high-resolution reading of film image data. The CCD area sensor 15 is configured so that during reading of a color image it first transmits an odd field of image data consisting of odd-numbered lines of the photoelectrically read image and then transmits an even field of image data consisting of even-numbered lines thereof.

The read-out section 2b further includes an amplifier 17 for amplifying R, G, B image signals generated by the CCD area sensor 15 based on the photoelectrically detected R, G and B color components, an A/D (analog/digital) converter 280 for digitizing the image signals, CCD correcting means 19 for processing the digitized image signals from the A/D converter 280 to correct for dark current and variance in sensitivity among the individual pixels, a log amplifier 20 for converting R, G, B image data into density data, and a silver effect compensating means 233 for effecting a correction to reduce the overall density value of the image data by the amount attributable to silver, thereby canceling the effect of silver halide and developed silver remaining on the photographic film. The silver effect compensating means 233 is connected with an interface 21.

The film F is held in a carrier 22. After one frame of the film F held in the carrier 22 has been conveyed to a prescribed position by rollers 24 driven by a motor 23, it is maintained stationary for read-out. When read-out of the color image of the frame has been completed, the next frame is conveyed to the read-out position. For handling negative film, an NC135S autocarrier (available from Fuji Photo Film Co., Ltd.) or other such autocarrier used in the conventional photofinishing equipment can be adopted. Images can be read over a range corresponding to such print types as full size, panorama size and H-size. Adoption of a trimming carrier of the type used in conventional photofinishing equipment enables an approximately X1.4 center-to-center enlargement taking the center as an axis. Usable reversal film carriers include those disclosed in Japanese Patent Application Nos. 7-271048, 7-275358, 7-275359, 7-277455 and 7-285015.

Reference numeral 25 in FIG. 9 designates a picture region detection sensor which detects the density distribution of the color images recorded on the film F and outputs a density signal indicative of the detected density to a CPU 26 for controlling the read-out section 2b. The CPU 26 uses the density signal to calculate the position of the color image picture region and stops the motor 23 when it discriminates that the color image picture region has reached the prescribed position.

The image forming system of this embodiment is configured not only to develop photographic film made of the photosensitive material used in this invention but also to read color prints for reproduction on other media. In addition to being equipped with the aforesaid transmission-type read-out section for reading film, therefore, it is further equipped with a reflection-type image read-out section for photoelectrically reading color images recorded on color prints and is configured to switch between these two read-out sections.

A detailed explanation having been made regarding the read-out section 2 shown in FIG. 2, an explanation will now be given regarding the image processing section 3 shown in FIG. 2.

Figure 10:
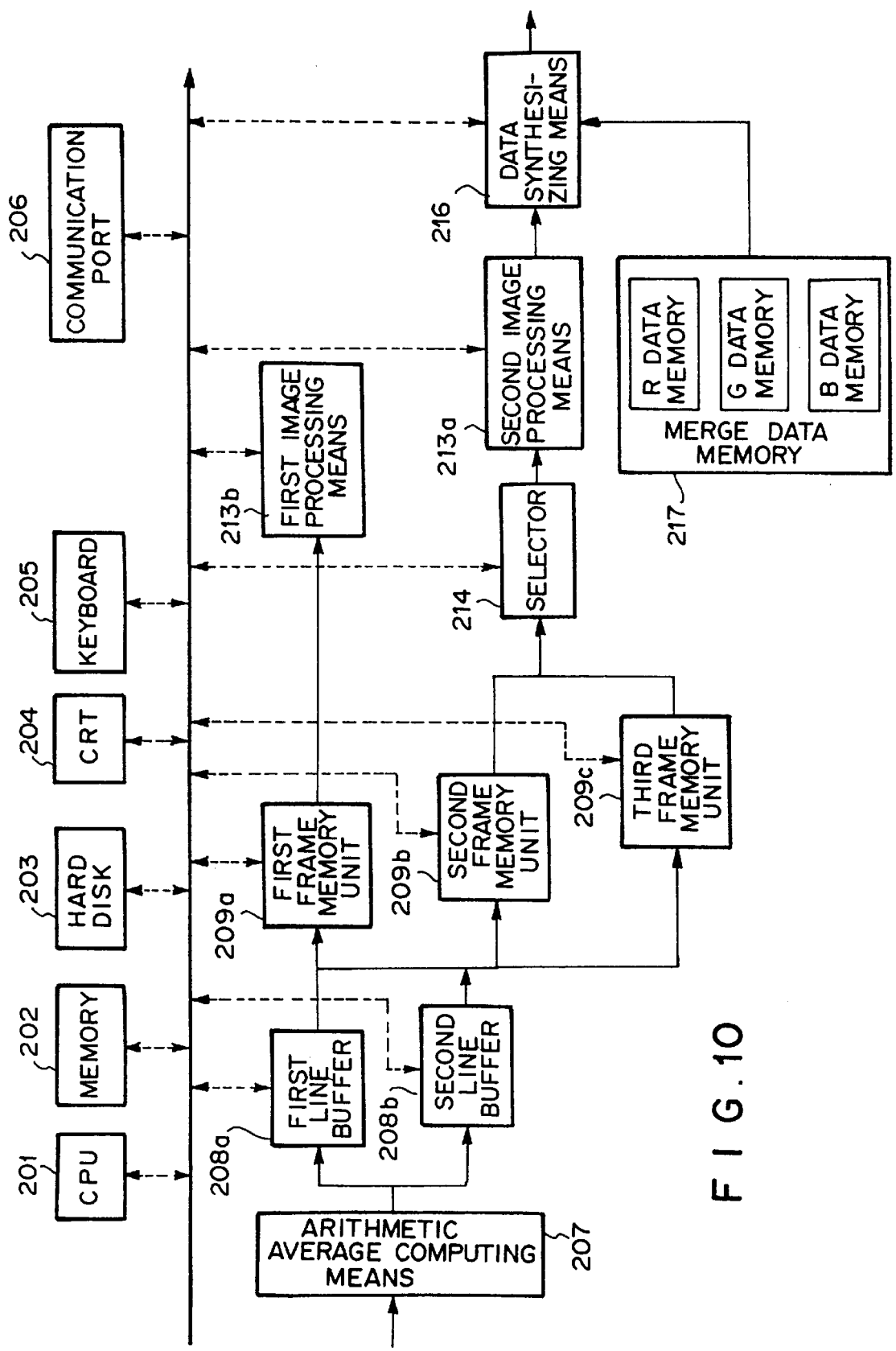
FIG. 10 is a block diagram showing the configuration of an image processing section.

FIG. 10 is a block diagram of the image processing section 3. As shown in this figure, the image processing section 3 comprises an interface which can be connected to the interface of the read-out section 2, arithmetic average computing means 207 for summing and averaging the values of sets of two adjacent pixels of the image data generated and forwarded by the read-out section 2 line by line and defining the average value as one pixel, a first line buffer 208a and a second line buffer 208b for storing alternate lines of the image data received from the arithmetic average computing means 207, and a first frame memory unit 209a, a second frame memory unit 209b and a third frame memory unit 209c for receiving line data stored in the first line buffers 208a, 208b and storing image data corresponding to a color image recorded in one frame of the film F or in one color print P. The first line buffer 208a and the second line buffer 208b are configured to alternately store odd-numbered line image data in one line buffer and even-numbered line image data in the other line buffer.

In the present embodiment, the image read-out section 2 conducts a first (preliminary) read-out of the color image recorded in one frame of the film F and the read-out image data are converted to digital image data. Based on the image data obtained the preliminary read-out, the image processing section 3 sets the image read-out conditions for a second (main) read-out to be conducted next. The color image is then read again based on the set read-out conditions, i.e., main read-out is effected, thus generating digital image data to be image-processed for reproduction. In order to effect this processing, the image processing section 3 stores the image data obtained by the preliminary read-out in the first frame memory unit 209a and the image data obtained by the main read-out in the second frame memory unit 209b and the third frame memory unit 209c.

Figure 11:
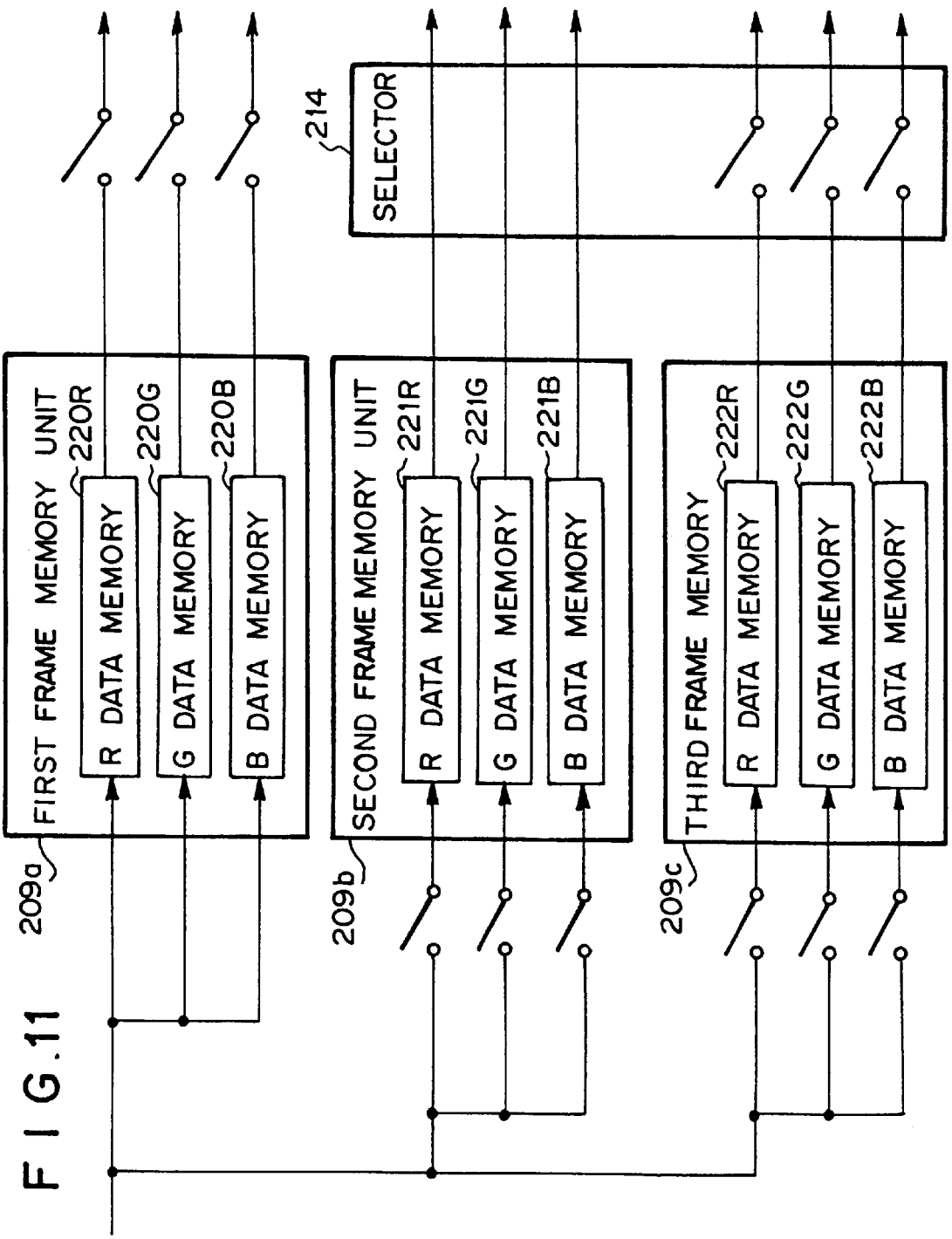
FIG. 11 is a diagram showing the particulars of a frame memory unit provided in the image processing section.

The explanation of the other constituent elements shown in FIG. 10 will be preceded by a detailed explanation regarding the frame memory units. FIG. 11 is a block diagram showing the particulars of the first frame memory unit 209a, second frame memory unit 209b and third frame memory unit 209c. As shown in FIG. 11, for enabling the image processing section 3 to process the image data generated by color image read-out, the first frame memory unit 209a, the second frame memory unit 209b and the third frame memory unit 209c are each provided with R, G and B data memories for storing image data corresponding to R (red), G (green) and B (blue) components. Specifically, the first frame memory unit 209a has an R data memory 220R, a G data memory 220G and a B data memory 220B, the second frame memory unit 209b has an R data memory 221R, a G data memory 221G and a B data memory 221B, and the third frame memory unit 209c has an R data memory 222R, a G data memory 222G and B data memory 222B. As mentioned above, the first frame-memory unit 209a stores the image data obtained by the preliminary read-out and the second and third frame memory units 209b and 209c store the image data obtained by the main read-out. FIG. 11 shows the state during input from the input bus of image data obtained by the preliminary read-out to the first frame memory unit 209a and output from the output bus of the image data stored in the second frame memory unit 209b.

Returning to FIG. 10, the configuration of the image processing section 3 will now be explained. The image processing section 3 has a CPU 201 which controls its overall operation. The CPU 201 can communicate with the CPU 26 of the read-out section 2b via a communication line (not shown). It can also communicate via a communication line (not shown) with the CPU which controls the output section 4 described later. Based on the image data obtained by the preliminary read-out and stored in the first frame memory unit 209a, the CPU 201 can change the image read-out conditions for the main read-out of the color image and, if necessary, can also change the image processing conditions in the image processing to be effected on the image later.

Specifically, the CPU 201 decides the image read-out conditions for the main read-out based on the image data obtained by the preliminary read-out so as to enable efficient utilization of the dynamic range of the CCD area sensor 15 or the CCD line sensor 48 at the time of the main read-out and outputs a read-out control signal to developer-reader control section 40 of the read-out section 2a or the CPU 26 of the read-out section 2b. Upon receiving the read-out control signal, the developer-reader control section 40 of the read-out section 2a or the CPU 26 of the read-out section 2b controls the quantity of light passage regulated by the light regulating unit 12 and further controls the storage time of the CCD area sensor 15 or the CCD line sensor 48. As required, the CPU 201 at the same time outputs to first image processing means and second image processing means (described later) a control signal based on the obtained image data so as to change the image processing parameters and other image processing conditions of the first image processing means and the second image processing means to enable reproduction on color photographic paper of a color image having optimum density, gradation and tone. The image read-out conditions and image processing conditions decided by the CPU 201 at this time are stored in a memory 202.

In conducting the aforesaid control, when image read-out conditions or image processing conditions have been saved at the request of the user, the CPU 201 does not decide the conditions based on the image data obtained by the preliminary read-out as described in the foregoing but outputs the various control signals based on the saved conditions. When the user sets the different conditions using a keyboard 205 or other such input device and requests that they be saved, the conditions are stored in the memory 202. If the user then requests that the saved conditions be deleted, the conditions stored in the log amplifier 20 are invalidated. In effecting the control described in the foregoing, therefore, the CPU 201 first checks whether conditions are stored in the memory 202. If the result of the check is affirmative, the stored conditions are used. If negative, the CPU 201 decides the conditions based on the image data obtained by the preliminary read-out. A configuration which does not require the saving of conditions always to be effected in terms of large units such as "image read-out conditions" and "image processing conditions" but also enables detailed conditions to be individually saved to and retrieved from the memory 202 is advantageous since, for example, it enables a color saturation setting to be saved and an automatically determined condition to be used for sharpness.

The processing effected on the image data generated by the read-out section 2 between input to the image processing section 3 and storage in the first to third frame memory units will now be explained in detail. As explained above, the image data obtained by the preliminary read-out are used solely for deciding the image read-out conditions for the main read-out and the image processing conditions in the image processing conducted after read-out. The volume of the image data obtained by the preliminary read-out is therefore smaller than that of the image data obtained for the purpose of image processing for reproduction, i.e., the image data obtained by the main read out. As explained in more detail later, moreover, this embodiment enables the user to reproduce a color image based on the image data obtained by the preliminary read-out on a CRT 204, to set the image processing conditions while observing the reproduced color image and to save the set conditions for use in later image reproduction. Since the volume of the image data obtained by preliminary read-out therefore need only be adequate for enabling reproduction of a color image on the CRT 204, this embodiment reduces the volume of the image data obtained by the preliminary read-out and stores the reduced image data in the first frame memory unit 209a.

For example, the image read-out section 2b is configured so that the CCD area sensor 15 transmits only the odd field or the even field of the image data during the preliminary read-out, thereby reducing the volume of the read-out image data to ½ that in the main read-out.

In addition, the image processing section 3 is configured so that the arithmetic average computing means 207 sums and averages the values of sets of two adjacent pixels of the image data received line by line and defines the average values as single pixels, thereby reducing the number of pixels per line of the image data to ½. It is further configured so that during preliminary read-out only the odd-numbered lines and only the even-numbered lines of the image data reduced to ½ the number of pixels by the arithmetic average computing means 207 are stored alternately in the first line buffer 208a and the second line buffer 208b, thereby reducing the number of lines of image data to ½. In other words, the number of lines of image data is reduced to ½ by transferring only the image data of the odd-numbered lines or the image data of the even-numbered lines to the first line buffer 208a and the second line buffer 208b and not transferring the other image data to the first or second line buffers 208a, 208b. The pixels of an odd-numbered line transferred to the line buffers 208a, 208b at this time are stored only in one line buffer, either the first line buffer 208a or the second line buffer 208b, and the pixels of an even-numbered line is stored in the other. Each of the first and second line buffers 208a, 208b therefore stores pixels for alternate lines, either odd or even.

Moreover, only the image data stored in one of the first line buffer 208a and the second line buffer 208b (only the pixels of every other line) are stored in the first frame memory unit 209a, thereby reducing the number of pixels of each line to ½. Finally, therefore, the number of pixels of the image data obtained by the preliminary read-out is reduced to $\frac{1}{16}$ and stored in the first frame memory unit 209a.

Thus, the number of pixels in the image data is reduced in the foregoing manner during preliminary read-out. Therefore, while the second frame memory unit 209b and the third frame memory unit 209c for storing image data obtained by the main read-out have capacities enabling them to store the image data obtained by read-out of a color image recorded in one frame of the film F or a color image recorded on one color print P, the first frame memory unit 209a for storing the image data obtained by the preliminary read-out has a much smaller capacity than the second frame memory unit 209b and the third frame memory unit 209c.

The constituent elements of the image processing section 3 for effecting image processing on the image data stored in the second frame memory unit 209b and the third frame memory unit 209c as a result of the main read-out will now be explained.

The image processing section 3 is further provided with first image processing means 213a (FIG. 12) adapted to enable a color image to be reproduced on the final support with the desired density, gradation and tone by subjecting the image data stored in the second frame memory unit 209b and the third frame memory unit 209c to gradation correction, color conversion, density conversion and other such image processing by use of lookup tables or matrix computation, and second image processing means 213b adapted to enable a color image to be reproduced on the screen of a CRT (explained later) with the desired picture quality by subjecting the image data stored in the first frame memory unit 209a to gradation correction, color conversion, density conversion and other such image processing by use of lookup tables or matrix computation. The outputs of the second frame memory unit 209b and the third frame memory unit 209c are sent to a selector 214 which selects the output of either the second frame memory unit 209b or the third frame memory unit 209c so as to input the image data stored in one or the other of the second frame memory unit 209b and the third frame memory unit 209c to the first image processing means 213a.

Figure 12:
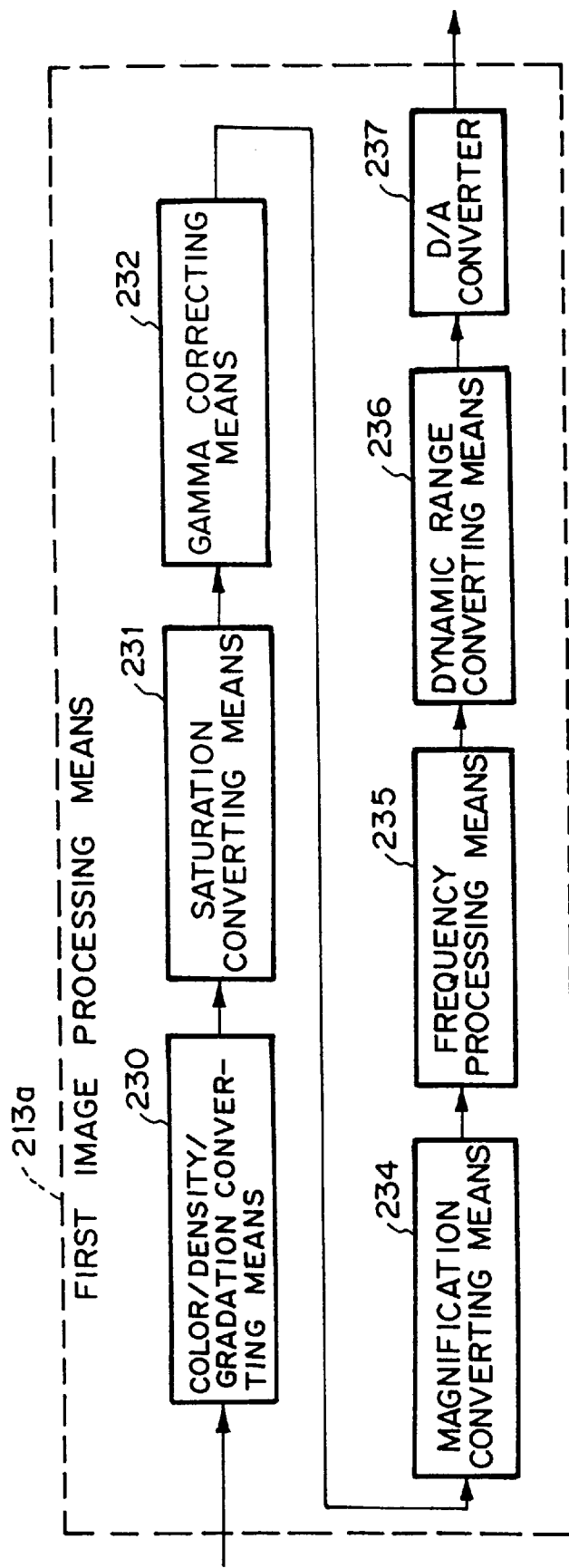
FIG. 12 is a block diagram showing the configuration of first image processing means provided in the image processing section.

FIG. 12 is a block diagram showing the particulars of the first image processing means 213a. As shown in FIG. 12, the first image processing means 213a comprises color density gradation converting means 230 for converting the density data, color data and gradation data of the image data, color saturation converting means 231 for converting color saturation data of the image data, gamma correcting means 232, digital magnification converting means 234 for converting the number of pixels of the image data, frequency processing means 235 for frequency-processing the image data, dynamic range converting means 236 for converting the dynamic range of the image data, and a D/A converter 237. Since, in what is known as pipeline processing, all of these converting means operate simultaneously and upon completion of an operation effect the next processing operation, the processing can be conducted at high speed.

In addition to gradation correction, color conversion, density conversion and other such processing, the first image processing means 213*a* illustrated in FIG. 12 can also effect processing for improving sharpness while simultaneously suppressing film graininess, as described in Japanese Patent Application No. 7-337510. Further, as described in Japanese Patent Application No. 7-165965, it can effect selective shading for reproducing an excellent image form one with high contrast.

As shown in FIG. 10, the first image processing means 213*a* is connected to data synthesizing means 216 and the data synthesizing means 216 is connected with a merge data memory 217. The merge data memory 217 has an R data memory, a G data memory and a B data memory for storing image data corresponding to the R (red), G (green) and B (blue) components of graphics, characters or the like. The merge data memory 216 stores image data relating to graphics, characters and the like for synthesis with the image data obtained by reading out a color image recorded on the film F when the output section 4 (explained below) reproduces a color image on the final support. The data synthesizing means 216 is connected to an interface with the output section 4.

In addition to the input bus and the output bus to which the first frame memory unit 209*a*, second frame memory unit 209*b* and third frame memory unit 209*c* are connected, the image processing section 3 also has a data bus to which are connected the CPU 201 for overall control of the image processing section, the memory 202 for storing an operating program executed by the CPU 201 and data related to data processing conditions, a hard disk 203 for storing image data, the CRT 204, the keyboard 205, a communication port 206 for connection with another color image reproducing system via a communication line, and communication lines to the CPU 26 etc. of the read-out section 2*b*.

Figure 13:
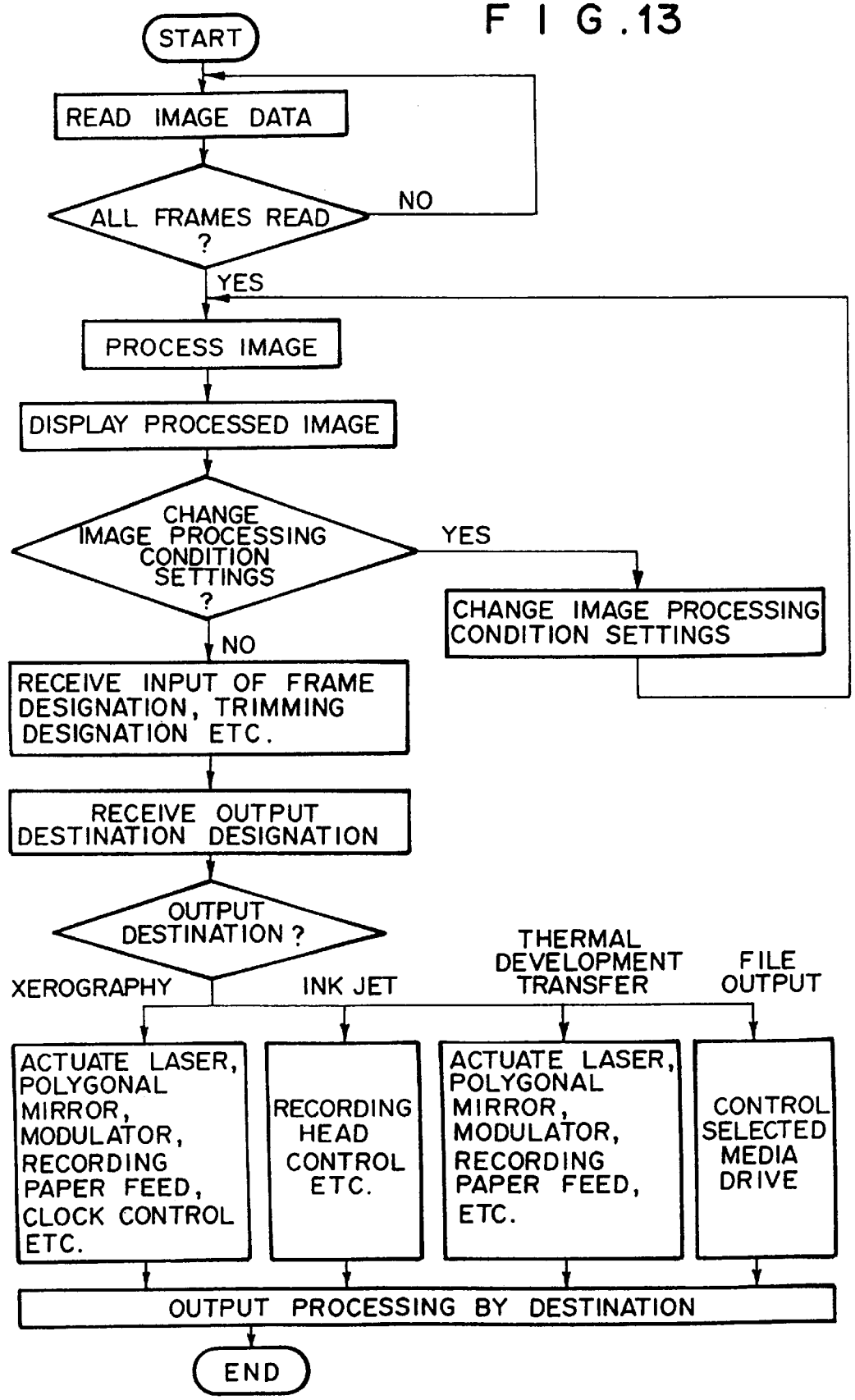
FIG. 13 is a flowchart showing the flow of processing from read-out to output.

The flow of the processing steps from read-out to image processing can be represented in the form of a flowchart as shown in FIG. 13. As indicated in FIG. 13, the image processing section 3 not only regulates the read-out conditions but also receives various kinds of input from the user at the time of effecting various types of image processing on the image data after read out. After image processing the processed images are therefore displayed on a monitor as occasion demands so that the user can ascertain the completion of the image processing. Since different users have different preferences regarding color and gradation, the user is allowed to use a keyboard or the like to designate changes in the image displayed on the monitor, e.g., to request that the image be made a little brighter. The image processing section 3 then conducts the image processing again using processing conditions modified based on the requests input by the user and displays the newly processed image on the monitor.

The user is able to select only desired ones of the displayed processed images for output. The image processing section 3 also displays the processed image on the monitor at any other time necessary, such as a trimmed image when trimming instructions are input, and then proceeds with the processing when the user inputs confirmation (by pressing an OK button, for example).

Upon receiving an output destination instruction, the image processing section 3 transmits the processed image data to the CPU of the designated output apparatus. The flowchart of FIG. 13 shows four types of output, which will now be explained in detail.

(2-3) File output

The digital image data generated in the image processing section can be stored on a hard disk, transmitted via communication means, written to prescribed media using a recording media drive, and the like. If desired, the image data can be output as a compressed file.

Usable type of storage media include, for example, Photo CD, MO and ZIP, and is possible to equip a single system with multiple types of media drives. I is also possible to provide multiple media drives of the same type for enabling processing to be conducted in parallel.

(2-4) Print output

As explained earlier, the image forming system of this embodiment includes four types of digital printers as examples of means for providing printed output: the xerographic laser printer, the ink-jet printer, the sublimation transfer printer, and the printer which prepares a print by recording an image on a heat-developable photosensitive material and then superimposing the heat-developable photosensitive material on an image-receiving material to heat-development transfer the image thereto (e.g., the Pictrography 3000 available from Fuji Photo Film Co., Ltd.). The printer is used preferably selected in response to instructions from the user. Each of the printers will be explained more specifically.

Xerographic printer

Color image forming by the xerographic method will be explained first. Methods available for forming full color continuous tone images by the xerographic method include the intensity modulation method of toner-developing a latent image formed by modulating the intensity of a laser beam projected onto a photosensor in accordance with image density and the area modulation method of expressing a continuous tone image in digitized dots and varying the dot density in accordance with the image density.

This embodiment adopts these two methods. FIG. 14 illustrates image signal processing for image output in the intensity modulation method and the area modulation method. As indicated by reference symbol (b) in FIG. 14, in the case of intensity modulation, the image signal obtained by image processing and D/A conversion in used as the signal input to a AOM (acousto-optical modulator) 244 without further processing and a laser beam is intensity-modulated in accordance with an image density signal passed through the AOM 244. The intensity-modulated laser beam is projected onto a photosensor through a polygonal mirror 245, an fθ lens 246 and a reflecting mirror 247 to form an electrostatic latent image with continuous surface potential on the photosensor.

On the other hand, the area modulation using a straight-line screen implemented in this embodiment is as, illustrated explicitly by the screen generator shown in FIG. 14(*a*), effected by using a comparator 242 to compare the image-processed, D/A-converted image signal and a triangular wave signal generated by a triangular wave generator 241 synchronously with a signal from a straight-line clock generator 240 which generates straight-screen reference clock pulses and, based on the result of comparison, producing a straight-line screen image signal whose pulse width is a function of the magnitude of the image signal. A laser beam pulse-modulated by this signal is directed onto the photosensor through the polygonal mirror 245, the fθ lens 246 and the reflecting mirror 247, thereby forming an electrostatic latent image with discrete surface potentials on the photosensor. While this embodiment uses a triangular wave to form the straight-line screen, it is not limited to use of a triangular wave and a sine wave or similar wave can be generated instead.

In this embodiment, although the screen generator for each color outputs an image signal based on a straight-line screen corresponding a raster pitch in the sub-scanning direction of 400 lines/inch, the timing of the straight-line clock pulses generated by the straight-line clock generator 240 differs among the screen generators of the different color components and the screen angles are set to be mutually different in the state where the screen pitches of the straight-line screens of the different color components are approximately equal.

Figure 17:
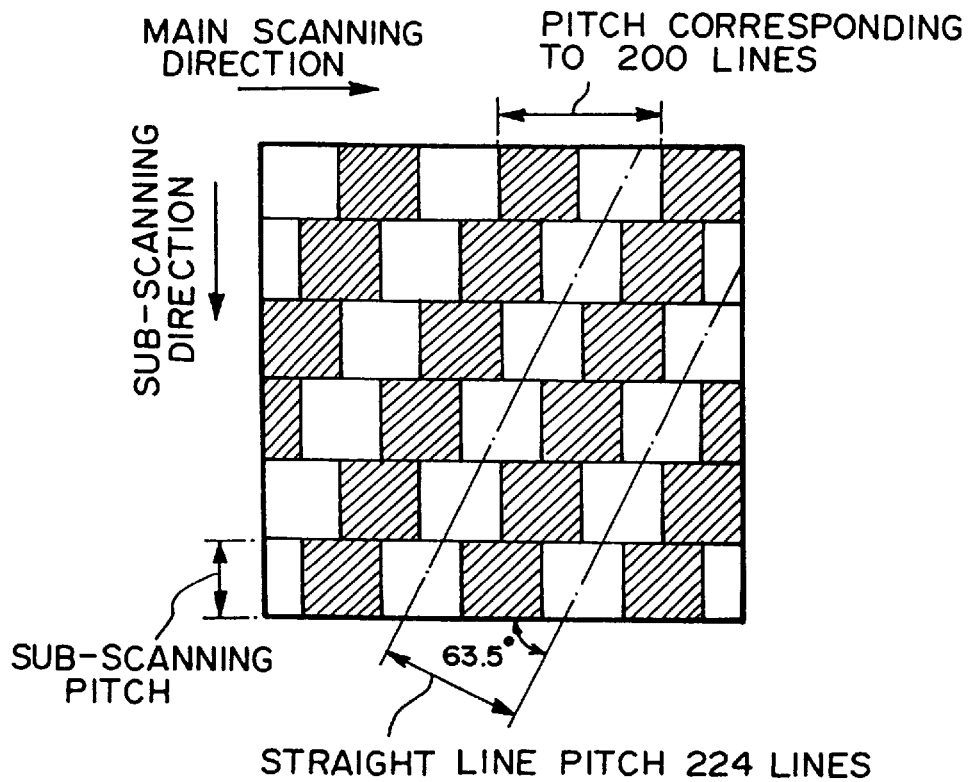
FIG. 17 is a diagram showing a straight-line screen for cyan image.
Figure 18:
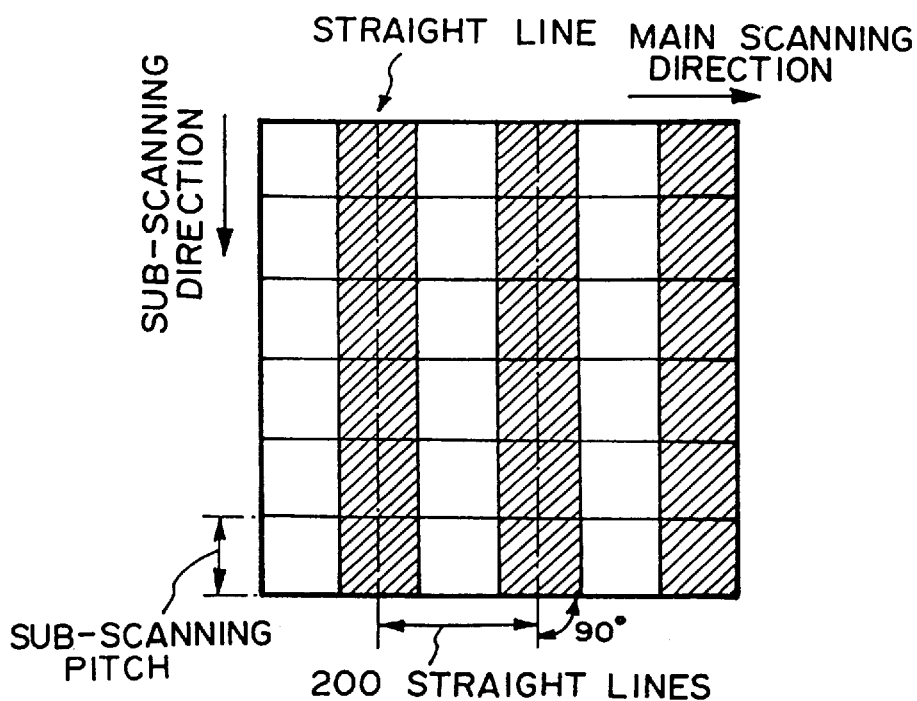
FIG. 18 is a diagram showing a straight-line screen for black image.

More specifically, in this embodiment, in the case of the screen generator associated with the monochrome image forming unit for generating a yellow image (Y), a straight-line screen of a screen pitch of 188 lines/inch is established at a screen angle of 45° taking the main scanning direction as 0° (see FIG. 15), in the case of the screen generator associated with the monochrome image forming unit for generating a magenta image (M), a straight-line screen of a screen pitch of 224 lines/inch is established at a screen angle of 63.5° taking the main scanning direction as 0° (see FIG. 16), in the case of the screen generator associated with the monochrome image forming unit for generating a cyan image (C), a straight-line screen of a screen pitch of 224 lines/inch is established at a screen angle of −63.5° taking the main scanning direction as 0° (see FIG. 17), and in the case of the screen generator associated with the monochrome image forming unit for generating a black image (K), a straight-line screen of a screen pitch of 200 lines/inch is established at a screen angle of 90° taking the main scanning direction as 0° (see FIG. 18).

Stated in concrete terms, the straight-line screen for the black image has the basic 200-line, 90° configuration generally used.

Further, the straight-line screen for the yellow image (Y) is the original straight-line screen for the main scanning direction modified to 133 lines, 90° (pitch width expanded 1.5 times relative to the 200-line straight-line screen) and has the individual lines of the straight-line screen shifted by ⅓ pitch of the 133-line, 90° straight-line screen (corresponding to ½ the pitch of the basic 200-line straight-line screen), and raster scanning is conducted accordingly. Thus, a 188-line, 45° straight-line screen is obtained.

The straight-line screen for the magenta image (M) has the basic 200-line, 90° structure of the original straight-line screen for the main scanning direction but with the individual lines of the straight-line screen shifted by ¼ the pitch of the basic straight-line screen, and raster scanning is conducted accordingly. Thus, a straight-line screen of 224 lines and screen angle of 63.5° is obtained.

The straight-line screen for the cyan image (C) has the basic 200-line, 90° structure of the original straight-line screen for the main scanning direction but with the individual lines of the straight-line screen shifted by ¾ the pitch of the basic straight-line screen, and raster scanning is conducted accordingly. Thus, straight-line screen of 224 lines and a screen angle of −63.5° is obtained.

FIG. 19 is a diagram showing an example of a xerographic color printer incorporated in this embodiment. FIGS. 20(a) to 20(g) schematically illustrate the image forming process of the printer shown in FIG. 19.

In the illustrated xerographic color printer, a toner image forming means disposed at the surface of a photosensitive drum 254 having a photoconductor 250 on its surface forms an image on the peripheral surface of the photosensitive drum 254 as the photosensitive drum 254 is rotated in the direction of the arrow. The toner image forming means includes a charger 251, an exposure section 252, developer 253, drum drying means 257, a discharger 298, cleaning means 248, an erasing lamp 27 and the like disposed about the photosensitive drum 254 in the direction of rotation.

The exposure section 252 includes a laser beam source 252a such as a semiconductor laser or an He-Ne laser, an optical modulator 252b such as an AOM (acousto-optical modulator) for intensity-modulating the laser beam emitted by the laser beam source, a beam deflector 252c such as a polygon mirror for reflecting and deflecting the modulated laser beam to impinge on the photosensitive drum 254 in a direction approximately perpendicular to the direction of rotation of the photosensitive drum 254 (the arrow direction), and a scanning lens 252d constituted as an fθ lens for converging the laser beam to a uniform diameter on the photosensitive drum 254.

The optical modulator 252b is used only when an image is output by the intensity modulation method. When an image is output by the area modulation method, the path of the laser beam is switched so as not to pass through the optical modulator 252b (the switching means is not shown in the drawing).

The developer 253 can be of any type insofar as it is capable of toner-developing an electrostatic latent image on the photoconductor 250. It can, for example, be the liquid developer disclosed in the JP-A-1-62014, a publication disclosing a patent application of the assignee.

Although in the present embodiment, the toner used is a liquid agent (liquid toner) consisting of charged fine toner particles dispersed in a carrier liquid having electrical insulation property, the invention is not limited to such toner but can use dry toner instead.

The structure is such that at the time of forming a color image the developer can be successively changed among three types, a Y (yellow toner) developer 253Y, an M (magenta) developer 253M and a C (cyan) developer 253C, or among four types also including a B (black) developer 253B.

The drum drying means 257 includes a squeeze roller 257a which rotates at high speed in the opposite direction from and contactlessly with respect to the photosensitive drum 254 so as to scrape off both toner and insulating liquid adhering to the photoconductor 250 and a blade 257b which removes the insulating liquid scraped off by and adhering to the squeeze roller 257a. Although the squeeze roller 257a and the blade 257b can remove almost all of the insulating liquid, the drum drying means 257 is further equipped with a drier 257c for supplying hot or warm air for drying the squeeze roller 257a and toner image on the photoconductor 250. It is also possible to provide two driers 257c for separate use, one for drying the squeeze roller 257a and one for drying the toner image on the photoconductor 250.

The discharger 298 is an AC corona discharger. In order to discharge the photosensitive drum, it brings the surface potential of the photosensitive drum to zero by AC-corona-charging the photosensor.

The cleaning means 248 cleans the photoconductor 250 of the photosensitive drum after image transfer. It includes a soft base material 248a impregnated with cleaning solution CL for the insulating carrier liquid used in the liquid developing agent, a pressing roller 248b for pressing the soft base material 248a onto the photoconductor 250 of the photosensitive drum 254 and impregnating the soft base material 248a with the cleaning solution CL, a first roller 248c for paying out fresh soft base material 248a, a second roller 248d for taking up used soft base material, a tension roller (not shown), a drier 248e for drying the surface of the cleaned photoconductor 250, and a conventional drive means (not shown). The cleaning means 248 cleans the outer surface of the photoconductor 250 of the photosensitive drum 254.

The erasing lamp 27 is for irradiating the photosensitive drum so as to totally discharge the photosensitive drum.

In this embodiment, since the toner image on the photoconductor 250 of the photosensitive drum 254 is 100% transferred to the adhesive layer of an intermediate transfer member explained later, the cleaning means 248 is not absolutely necessary. It is preferably provided, however, in order to keep the surface of the photoconductor clean at all times prior to charging.

An adhesive transfer means 256 includes a hollow transfer roller 255 which is movable by a conventional means in the direction of the arrow B to a position where it is compressed onto the photoconductor 250 on the periphery of the photosensitive drum 254 and in the direction of the arrow B' to a position where it is separated from the photoconductor 250, an image-receiving sheet supply roller 263 for holding a roll of image-receiving sheet 266 adhered to a strip of releasable paper or releasable film (hereinafter called "releasable sheet 296") and having on the opposite surface side thereof the aforementioned adhesive layer constituting an intermediate transfer member, and a releasable sheet take-up roller 296 for taking up the releasable sheet 296 peeled from the image-receiving sheet 266 at a position where the image-receiving sheet 266 adhered to the releasable sheet 296 paid out from the image-receiving sheet supply roller 263 is nipped by nip rollers 258a, 258b.

Retransfer means provided downstream of the hollow transfer roller 255 for image retransfer to a support includes a support stocker 261 for storing supports having toner-receiving surfaces oriented with their toner-receiving surfaces facing upward, a support feed roller 260 provided in the vicinity of the outlet of the support stocker 261, a support retaining belt 295 for conveying supports which holds each fed-out support and at proper timing superimposes it so that toner-receiving surface of the support and the toner image on the adhesive layer of the image-receiving sheet are face to face, a pair of hot-press transfer rollers 259a, 259b for hot-press transferring the image-receiving sheet and the support superimposed thereon, a nip roller for nipping the support after hot-press transfer and the image-receiving sheet, a nip roller for nipping and conveying the support having only the toner image transferred to its toner-receiving surface at the first said nip roller, a take-out guide 299 for taking out the support formed with a toner image T, and an image-receiving sheet take-up roller 262 for, after transfer, taking up the image-receiving sheet 266 consisting of the adhesive layer and a substrate for reuse.

Each of the hot-press transfer rollers 259a, 259b has an internal heat source which heats it to a prescribed temperature. The hot-press transfer rollers 259a, 259b are rotated in the arrow directions by a drive means (not shown).

Although the example shown in FIG. 19 utilizes the releasable sheet 296 for protecting the adhesive layer of the image-receiving sheet 266, use of the releasable sheet 296 is not absolutely necessary if, for example, the back surface of the image-receiving sheet 266 is imparted with releasability. When the releasable sheet 296 is used during feeding, at the time of taking up the image-receiving sheet 266, the releasable sheet 296 can be held therebetween by a releasable sheet roller for the used image-receiving sheet 266 provided for this purpose.

The rollers and other structural members between image-receiving sheet 266 supply and take-up can be modified in various ways in light of the desirability of reusing the image-receiving sheet 266, such as by adopting an endless arrangement or enabling reuse of the image-receiving sheet 266 by rotating the image-receiving sheet supply roller 263 and the image-receiving sheet take-up roller 262 in reverse.

The intermediate transfer member with adhesive layer used in this embodiment consists of a substrate and an adhesive layer provided on the substrate for temporarily carrying a toner image. It can be of any of various shapes, including sheet, tape, film, cylindrical drum and the like. Except that it must be able to function as a support for the adhesive layer, i.e., enable the adhesive layer to be firmly fixed to the substrate, it is not particularly limited as regards physical properties. It can, for example, be a paper sheet, a polyethylene terephthalate film or the like having a thickness of around 10–300 µm.

The adhesive layer of the intermediate transfer member used in this embodiment is particularly important and preferably has the following capabilities:
(i) To enable adhesive transfer of 100% of the toner image formed on the photoconductor of the photosensitive drum to the adhesive layer of the intermediate transfer member;
(ii) To enable retransfer of 100% of the toner image transferred to the adhesive layer to the final support; and
(iii) When the processes of (i) and (ii) are conducted two or more times, to enable the same adhesive layer to be used repeatedly in the multiple operations.

As an adhesive agent for forming such an adhesive layer there can be used one of a composition obtained by using urethane(metha)acrylic resin as the main component and blending this resin with acrylic rubber, which is a copolymer of nonadhesive acyrlic ester, or saturated polyester resin, or by blending with a fluoride additive.

The urethane(metha)acrylic resin constituting the main component has a (metha) acryroyl group at a terminal or side chain of the molecule and is an acrylic monomer, acrylic oligomer, methacrylic monomer or methacrylic oligomer having a polyurethane main chain.

The acrylic rubber used as a nonadhesive component in the adhesive agent is a polymer having acrylic ester as its main component, exhibits particularly excellent heat resistance, aging resistance and weatherability, and has good solubility in organic solvent. Saturated polyester resin is excellent in weatherability, wear resistance, adhesive property and the like. The properties of these nonadhesive components can be further enhanced by addition with a crosslinking agent such as isocyanate. They can, as required, also contain an appropriate adhesion-imparting agent such as rosin, terpene resin, hydrocarbon resin or the like.

The adhesive agent can be further added with a fluoride additive. A fluoride additive improves releasability of the transferred image from the adhesive layer when it is retransferred to the final support. While inclusion is not absolutely required, it is preferable from the point of facilitating perfect transfer. Usable fluoride additives include, for example, 3-fluoroethylene polymer, 4-fluoroethylene polymer, fluoride surface active agent and the like.

These components are used in an appropriate mixing ratio in the adhesive agent. The preferable mixing ratio is ordinarily 50–90 parts by weight of urethane(metha)acrylic resin and 0–40 parts by weight of fluoride resin per 10–50 parts by weight of the nonadhesive component. In the case of fluoride resin and fluoride high molecular compound, the amount is preferably 0–40 parts by weight, while in the case of fluoride surface active agent and fluoride low molecular compound it is preferably 0–5 parts by weight.

The adhesive agent composition is obtained by uniformly blending the components mentioned above. A crosslinking agent, plasticizer, filler and the like can be appropriately incorporated at this time.

The intermediate transfer member of this embodiment can be produced by coating a film substrate with the adhesive agent composition obtained in the foregoing manner in solid form to a thickness of 5–20 μm to thereby fabricate an adhesive film, an adhesive tape or adhesive sheet.

The intermediate transfer member having an adhesive layer made of the aforesaid adhesive agent can adhesively transfer 100% of a toner image from the photoconductor and then retransfer it totally to the final support. Following the retransfer, moreover, it can be reused repeatedly for adhesive transfer and total retransfer.

The adhesive agents disclosed in the embodiments of JP-A-4-81786, for example, are of this type and can be used in this invention. The invention is not, however, limited to the adhesive agents disclosed in this publication.

The final support must be such that when a toner image transferred to the adhesive layer is hot-pressed on the final support and the final support and the adhesive layer are thereafter peeled apart at an appropriate temperature, the toner image is totally transferred to the final support. Any final support meeting this requirement can be used in this embodiment. The support can be either transparent or opaque. When it is a transparent film, for example, it can be formed with a transparency negative or a positive print image, and when it is opaque paper or film, it can be a formed with a print image for reflected-light viewing. Typical final supports usable in this embodiment include Xerox OHP sheet, Lux Coat paper (Mitsubishi Paper Co.) and Enamel Coat paper (Ohji Paper Co.). Xerox and other plain papers can also be used.

Such supports have some type of toner-receiving layer for strongly fixing the toner image to the final support. The toner-receiving layer can be one consisting simply of projections and indentations formed on the support surface by the paper fibers, as in the case of Xerox plain paper, or as in the case of coated paper and coated film, can be constituted by coating or laminating with a substance that enhances the sticking strength of the toner.

In this embodiment, increasing the force of adherence between the toner and the final support is an indispensable condition for retransfer. The final support therefore preferably has a toner-receiving layer for firmly fixing a toner image on its surface.

As the photoconductor disposed on the outer surface of the photosensitive drum used in this embodiment it is preferable to adopt a photosensor consisting of amorphous silicon (a-Si) surface-coated with silicon carbide (SiC) since such a photosensor can be uniformly charged by corona discharge or the like, can be formed with an electrostatic image faithful to the image information carried by a light beam when scanned thereby, can be formed with a toner image by use of a liquid developing agent even in the case of a continuous tone image, and enables easy peeling of toner when the adhesive layer on the substrate is pressed thereon. So far as the aforesaid conditions are met, it is also possible to use an organic photoconductor (OPC), a selenium photosensor, a selenium alloy photosensor, a cadmium sulfide photosensor or a composite multilayer photosensor made of these.

The liquid developing agent used to form a toner image in this embodiment consists of pigment, coating agent, dispersion agent, fixing agent, charge regulating agent, and insulating carrier liquid. It is not limited to such a composition, however, and other compositions compatible with the intent of the invention are also usable.

Usable pigments include carbon black and numerous other known inorganic and organic pigments.

Any type of insulating carrier liquid can be used insofar as it has an electrical resistance of not less than $10^{10}$ Ωcm and a low dielectric constant so as to preclude leaking of the electrostatic image, is nontoxic, and does not attack the photosensor. For example, it can be selected from among normal paraffinic, isoparaffinic, olefinic or naptha-type liquid carbohydrates and any of these containing an aromatic carbohydrate. Most preferable are Isobar G, Isobar H, Isobar L and Solveso marketed by Esso Standard. These can be used singly or in combinations of two or more.

The coating agent is for coating the pigment particles. In this embodiment, it is compatible with the toner-receiving layer of the final support and is an important factor for enabling the toner image on the photoconductor to be 100% transferred to the adhesive film when the adhesive layer provided on the substrate is pressed onto the toner image formed on the photoconductor and adhesive transfer is effected while peeling the toner image off the photoconductor.

Preferable coating polymers include the styrene-butadiene copolymer, methyl methacrylate-stearyl methacrylate copolymer and ethylene-methacrylate copolymer disclosed in JP-A-4-81786, but the invention is not limited to these.

Any dispersion agent capable of preventing coagulation and sedimentation of the toner particles in the insulating carrier liquid can be used. A dispersion agent known to the art can be employed. The charge regulating agent adheres to the toner particles in the carrier liquid and determines the charge polarity and charge amount of the toner particles. A conventional charge regulating agent suffices. Organic metal salts soluble in the carrier liquid, linseed oil, synthetic resins and other conventional charge regulating agents exhibiting electron donative or electron acceptive polarity are sufficient. The fixing agent is for improving the fixation property of the toner image. Since its adherence to the toner particles in the developing solution is fundamentally required, it is a factor ranking in importance with the coating agent in this invention.

The coating agent is defined here to include both coating agent and fixing agent adhering to the toner particles.

The process of forming a print image will now be explained with reference to FIGS. 20(*a*) to 20(*g*).

When an image is recorded on the photosensitive drum 254 in the printer shown in FIG. 19, the photosensitive drum 254 rotates in the arrow direction in FIG. 19 as explained earlier, whereby the photoconductor 250 moves relative to the charger 251 and is uniformly charged by the charger 251 as shown in FIG. 20(*a*). A laser beam modulated by the image signal is projected onto the uniformly charged photoconductor 250 via a light deflector and an fθ lens.

As illustrated schematically in FIG. 20(*b*), the sharpness of the exposure is enhanced by masking the portions not irradiated by the laser beam and not masking the irradiated portion.

The deflection of the laser beam causes it to scan the photoconductor 250 in one dimension (main scanning), while sub-scanning with the laser beam is achieved by rotating the photosensitive drum 254. As a result, the photoconductor 250 is two dimensionally scanned by the laser beam. Since, as mentioned above, the laser beam is modulated based on the image signal, the photoconductor 250 irradiated by the laser beam is formed with an electrostatic image corresponding to the image carried by the image signal, as shown in FIG. 20(*b*).

As shown in FIG. 20(c), the electrostatic image is developed into a toner image by the developer 253. The developer 253 toner-develops the electrostatic image by bringing a liquid developing agent consisting of charged fine toner particles dispersed in an insulating carrier liquid into contact with the photoconductor 250 so that the toner particles are adhered to the photoconductor 250 by electrostatic attractive force.

The toner image formed on the photosensitive drum 254 in this manner is rotated farther in the arrow direction and dried by the drum drying means 257.

On the other hand, the image-receiving sheet 266 is fed out from the image-receiving sheet supply roller 263 as a continuous strip having the releasable sheet 296 attached thereto and is peeled from the releasable sheet 296 at the point where it passes between the nip rollers 258a, 258b. The peeled-off releasable sheet 296 is taken up on the releasable sheet take-up roller 296 and the image-receiving sheet 266 removed of the releasable sheet 296 is passed around the hollow transfer roller 255. When the arrival of the toner-developed portion of the photoconductor 250 at a point immediately ahead of the position opposite the transfer roller 255 is detected or discriminated by a conventional means, the transfer roller 255 is moved from its position apart from the photosensitive drum 254 in the direction B so as to be pressed onto the photosensitive drum 254. The transfer roller 255 moved into contact with the photosensitive drum 254 rotates together therewith and the image-receiving sheet 266. As a result, the adhesive layer 267 side of the image-receiving sheet 266 passing over the transfer roller 255 is pressed onto the photoconductor 250 as shown in FIG. 20(d).

The adhesive force between the toner particles 265 forming the toner image and the photoconductor 250 at this time is made smaller than the adhesive force between the adhesive layer 267 and the toner particles 265 and the cohesive force between the toner particles 265. The toner particles 265 are therefore completely transferred to the adhesive layer 267 of the image-receiving sheet 266. The 100% transfer is achieved easily by lightly pressing the adhesive layer 267 of the image-receiving sheet 266 onto the photoconductor 250. Thus, as shown in FIG. 20(e), the toner image is 100% adhesively transferred from the photoconductor 250 to the adhesive layer 267 of the image-receiving sheet 266.

The transfer roller 255 is then moved in the direction B' and separated from the photosensitive drum 254. The image-receiving sheet 266 bearing the adhesively transferred toner image is advanced from its position on the photoconductor 250 and passed between the heated hot-press transfer rollers 259a, 259b. Timed to the arrival of the image-receiving sheet 266 at the hot-press transfer rollers 259a, 259b, a support 269 having a toner-receiving layer 268 is fed by the support retaining belt 295 so as to be overlaid on the image-receiving sheet 266 with the adhesive layer 267 and the toner-receiving layer 268 in face-to-face contact as shown in FIG. 20(f). The mutually adhered image-receiving sheet 266 and support 269 are hot-pressed between the hot-press transfer rollers 259a, 259b and then allowed to cool as they continue to be conveyed.

During the cooling, the toner particles 265 melted by the hot-pressing fuse together while at the same time strongly anchoring to the toner-receiving layer 268 of the support 269 by, for example, penetrating between surface irregularities. As a result, the sticking force between the toner particles, namely, the cohesive force, increases, thereby further increasing the bonding force between the fixed toner 265 and the support 269. This force can be even further increased by forming the toner-receiving layer 268 of the support 269 of a substance that exhibits increased bonding force with the toner when subjected to hot-pressing or the like.

The hot-press temperature and pressure are appropriately determined depending on the toner, the adhesive layer, the final support and the like. The hot-press temperature must, however, be at least as high as the softening point of the toner coating polymer and is preferably 120–150° C. The pressure is preferable between 0.05 Kg/cm$^2$ and 0.8 Kg/cm$^2$.

The mutually adhered image-receiving sheet 266 and final support 269 are then peeled apart. The adhesive force between the toner 265 and the adhesive layer 267 at this time must be smaller than the cohesive force between the toner particles and the adhesive force between the toner 265 and the final support 269. For this, it is necessary to optimize the cooling following hot-pressing or the nip roller cooling. The temperature in the case of nip roller cooling can be appropriately set depending on the toner, adhesive layer and final support and the like but is preferably in the range of 80° C.–120° C.

As shown in FIG. 20(g), after hot-pressing and cooling, the toner image on the adhesive layer 267 of the image-receiving sheet 266 is 100% transferred to the toner-receiving layer 268 of the support 269. The image-receiving sheet 266 having the adhesive layer 267 and the final support 269 having the transferred toner image fixed on its toner-receiving layer 268 are separated by peeling. The image-receiving sheet 266 is taken up on the image-receiving sheet take-up roller 262 for reuse.

The support 269 bearing the toner image is retained by the support retaining belt 295 and conveyed to a prescribed location where it stands by until the second toner image transfer has been conducted. After the second toner image has been formed on the photosensor in the manner explained earlier, it is adhesively transferred to the image-receiving sheet constituting the intermediate transfer member and is then conveyed toward the heat rollers for the second transfer to the support. The conveyance of the support 269 is timed so that the second toner image on the image-receiving sheet 266 is superimposed on the first toner image on the support 269. The support 269 and the image-receiving sheet 266 are thus nipped by the heat rollers as overlaid on each other to transfer the second toner image onto the first toner image on the support 269. The support bearing the second toner image is retained by the support retaining belt 295 and conveyed to the prescribed location similarly to the forgoing and then stands by for the next toner image transfer. In the case of a three- or four-color image, the foregoing operations are repeated three or four times to form a full color image.

The example shown in FIG. 19 is configured to take up the used image-receiving sheet 266 having the adhesive layer 267 for reuse. This is not limitative, however, and it is alternately possible to adopt an arrangement in which the used image-receiving sheet 266 is wound back onto the image-receiving sheet supply roller 263 so as to bring it to a prescribed position from which it is immediately reused. In this arrangement, after the image-receiving sheet 266 has been reused a prescribed number of times, e.g., when further reuse is impossible, the unusable image-receiving sheet 266 can be taken up on the image-receiving sheet take-up roller 262.

In all of the foregoing image forming methods, after adhesive transfer of the toner image has been completed, the photoconductor 250 is discharged by the discharger 298 and, if necessary, is cleaned by the cleaning means 248. It is then ready to be used for forming the next toner image.

The support 269 is thus formed with a color image corresponding to the image signal. The quality of the image formed by the method of this embodiment was found to be on a par with that of an image formed by conventional silver halide photography.

Figure 21:
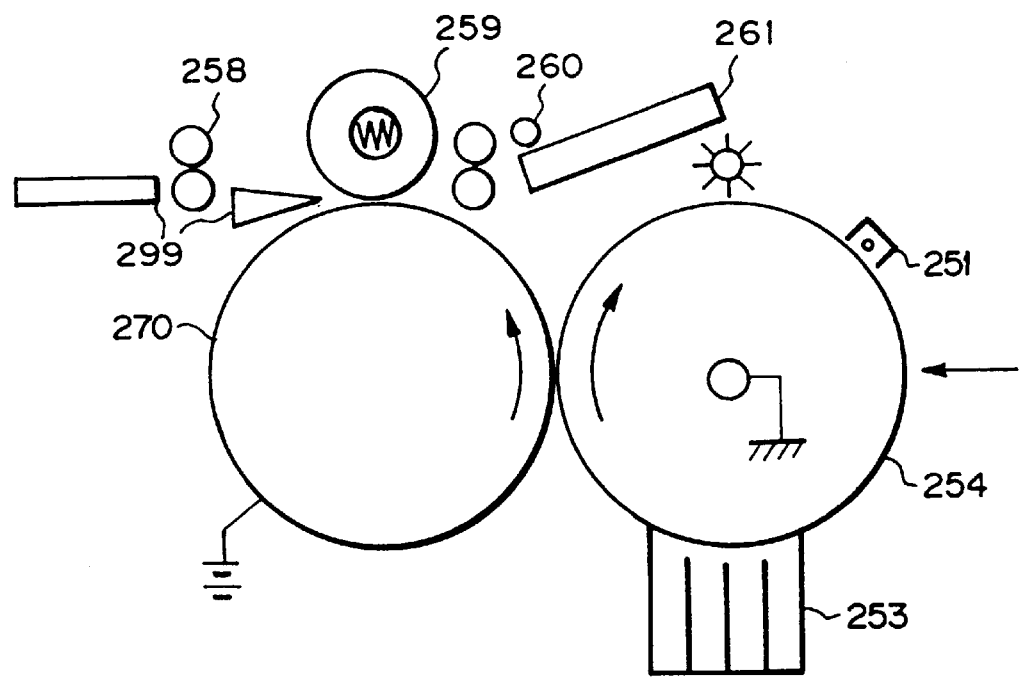
FIG. 21 is a diagram showing an example of the configuration of a xerographic digital printer equipped with an intermediate transfer drum.
Figure 22:
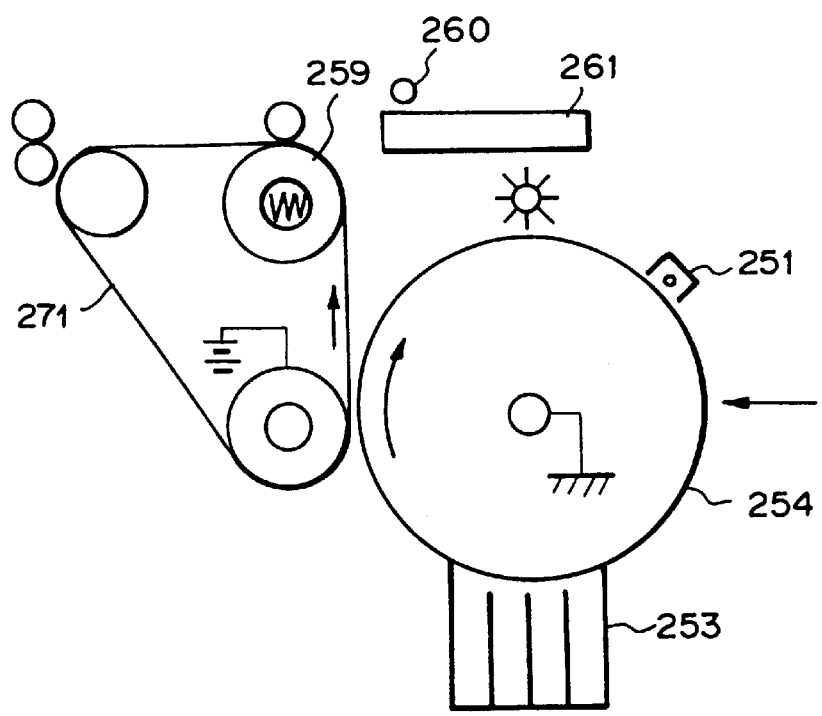
FIG. 22 is a diagram showing an example of the configuration of a xerographic digital printer equipped with an intermediate transfer drum.
Figure 23:
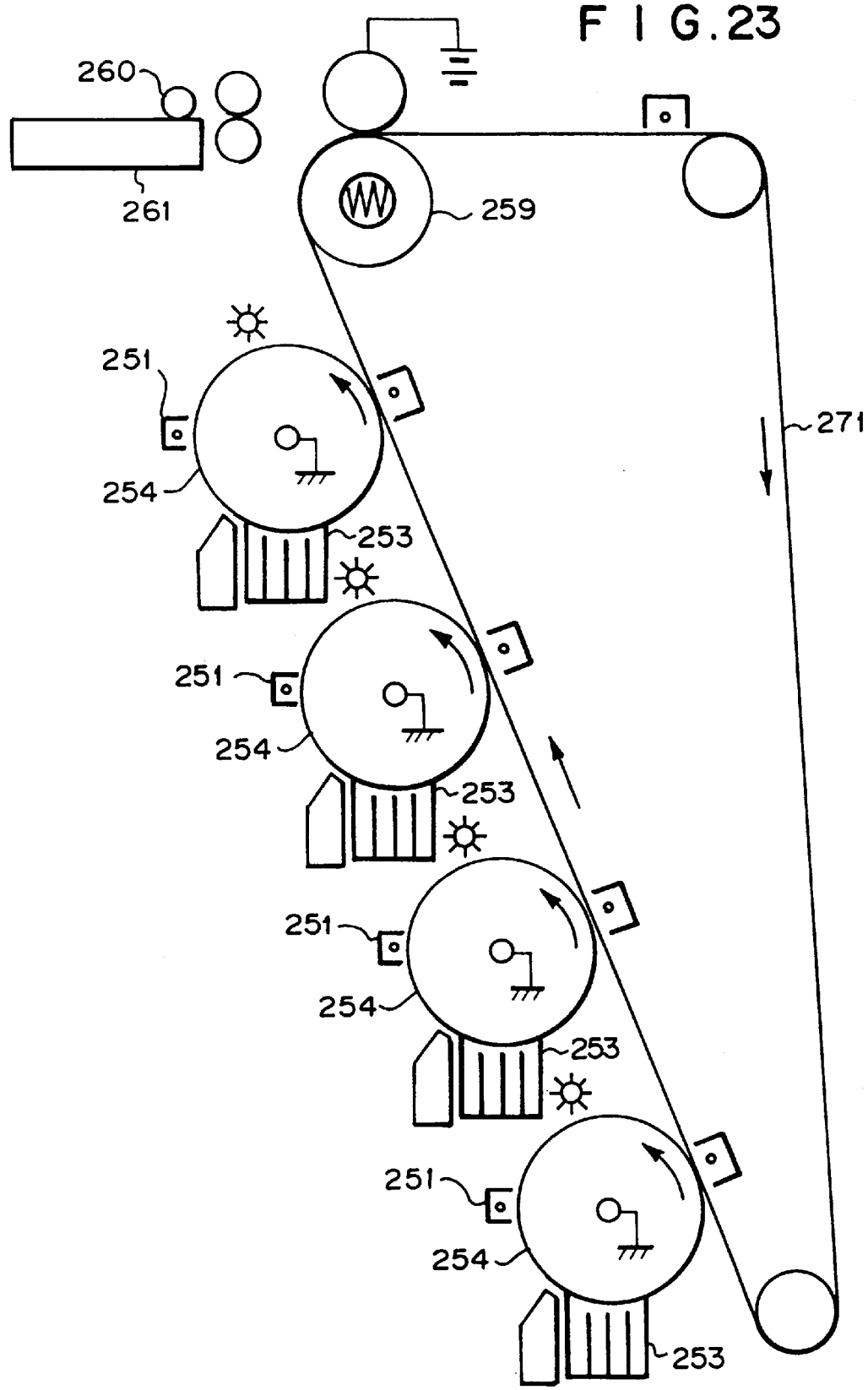
FIG. 23 is a diagram showing an example of the configuration of a xerographic digital printer equipped with multiple photosensitive material drums.

Although the foregoing embodiment uses an image-receiving sheet having an adhesive layer on its surface as the intermediate transfer member, the invention is not limited to this. Another method that can be preferably applied in this invention is that, described for example in JP-A-5-341666 and shown in FIG. 21, in which an intermediate transfer drum 270 wound with an electrically conductive film is disposed opposite a photosensor drum bearing a toner image, the conductive film is applied with a potential opposite in polarity to the toner charge to electrostatically transfer the toner image from the photosensor drum to the conductive film, and the transferred image is retransferred to a support. Another method that can be preferably adopted is that, as disclosed for example in JP-B-49-209 and JP-A-62-206567 and shown in FIG. 22, in which the toner image is once transferred from the photosensor to an intermediate transfer belt 271 and this unfixed toner image is retransferred to a support. Still another is that, as disclosed for example in JP-A-8-179545 and shown in FIG. 23, in which toner images corresponding to three or four color images obtained by color separation are formed on different ones of a plurality of photosensor drums, these toner images are electrostatically transferred color by color to the intermediate transfer belt 271 so as to register properly with each other, and the resulting full color image is retransferred to a support so as to register properly thereon.

While the foregoing embodiment uses liquid toner to visualize the latent image on the photosensor, this invention is not limited to use of liquid toner. Dry tone can also be preferably utilized.

Ink-jet printer

The ink-jet printer similarly usable as means for print output will now be explained with reference to the drawings.

The ink-jet printer has a paper feed and conveyance section and a recording section including a control section (gradation recording control section), recording heads and a drive signal generating section.

Figure 24:
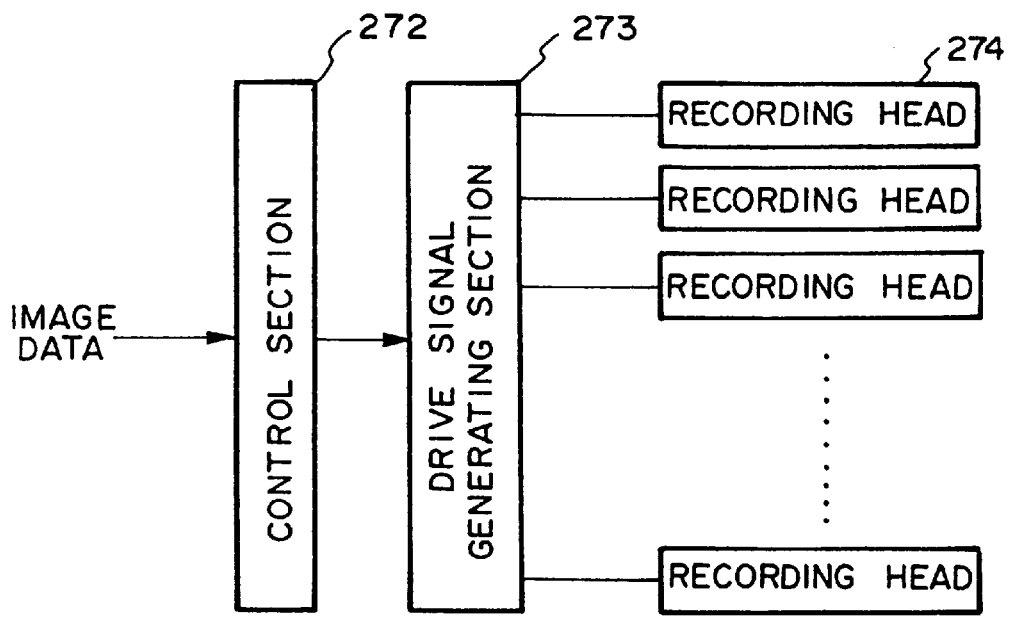
FIG. 24 is a block diagram showing the configuration of an ink-jet printer.

As shown in FIG. 24, the control section 272 of this ink-jet printer receives image data from the image processing section 3 and image-processes the density information included in the image data to convert it to a digitized signal for gradation recording, based on which the drive signal generating section 273 produces signals for driving the printing heads 274.

Figure 25:
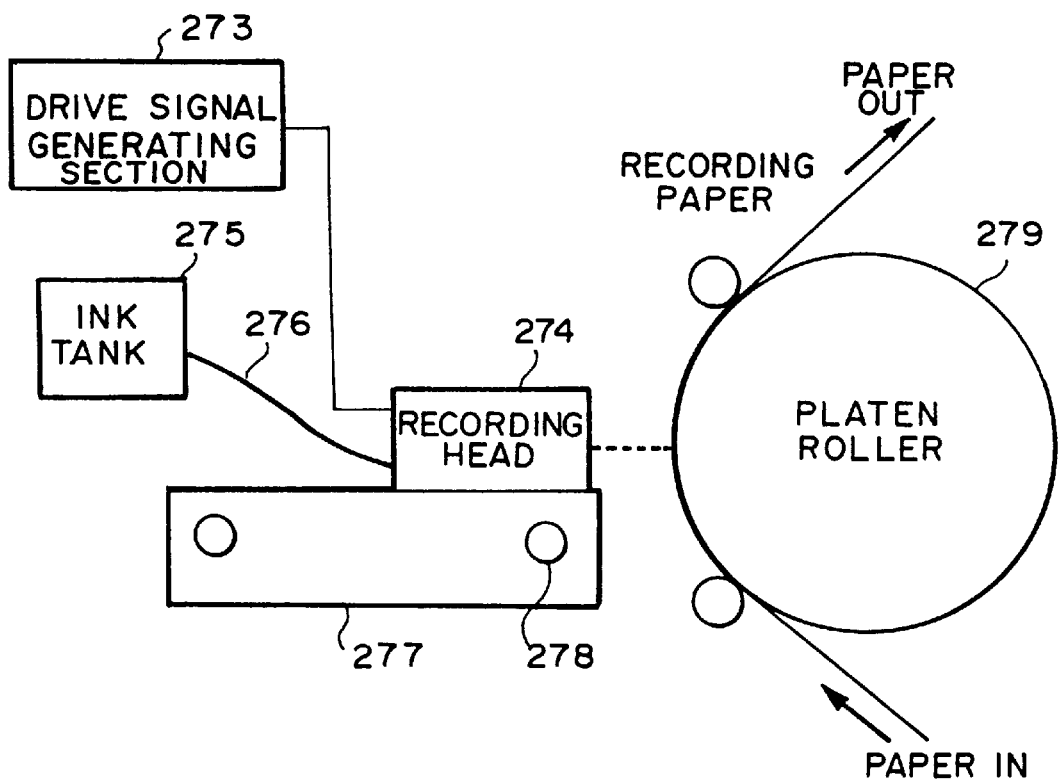
FIG. 25 is a schematic diagram showing the configuration of an ink-jet printer.

FIG. 25 is a schematic diagram showing the recording section 2 of an ink-jet printer equipped with a plurality of printing heads 274. If four ink colors are used (cyan, magenta, yellow and black, for example) and the density of each color has two levels (light and dark), eight ink tanks and eight recording heads are required.

Ink is supplied from each ink tank 275 containing a specific color/density ink through an ink pipe 276 to a corresponding color/density printing head 274. The color/density printing heads 274 are fixed to a carriage 277 slidably mounted on a shaft 278 fixed parallel to the recording paper, to be evenly spaced in parallel at the same height and to be oriented perpendicular to and equidistant from the surface of recording paper.

When the carriage 277 mounted with the printing heads 274 slides along the shaft 278 (main scanning), the color/density printing heads 274 are supplied through a drive cable with respective drive signals carrying recording information.

In response to these drive signals, the printing heads 274 jet ink to thereby record a dot pattern on the recording paper conveyed from a paper supply section onto the surface of a platen roller 279. Since the drive signals are delayed in accordance with the distance between the color/density printing heads 274, each point on the recording paper can be affixed an ink droplet from every color/density printing head 274.

The dots recorded at each point on the recording paper can be multigradation-recorded in full color by causing the color/density printing heads 274 to overstrike dots while varying the density level and the number of droplets jetted, one line can be printed by sliding the printing heads 274 (main scanning), and a full color, multigradation image can be recorded on the recording paper by causing the platen roller 279 to feed the recording paper one line at a time (sub-scanning).

Moreover, since the number of ink overstrikes is varied in the foregoing case, multigradation can be achieved using only one ink of a single density level for each color.

While the foregoing example assumes the size of each pixel to be approximately equal to the size of one dot, gradation can also be achieved by controlling the timing of ink droplet jetting so as to define a pixel as a matrix of m×n dots and varying the distribution of dots in the matrix. Moreover, a still greater range of gradation levels can be obtained by using different combinations of matrix dot distribution and the density. Since use of matrices reduces resolution relative to the earlier example by an amount proportional to matrix size, however, degradation of resolution is preferably prevented by reducing dot size and increasing dot density.

The recorded sheet obtained in the foregoing manner is output to a discharge section by the conveyance system.

Printer for producing print by thermal development transfer

Figure 26:
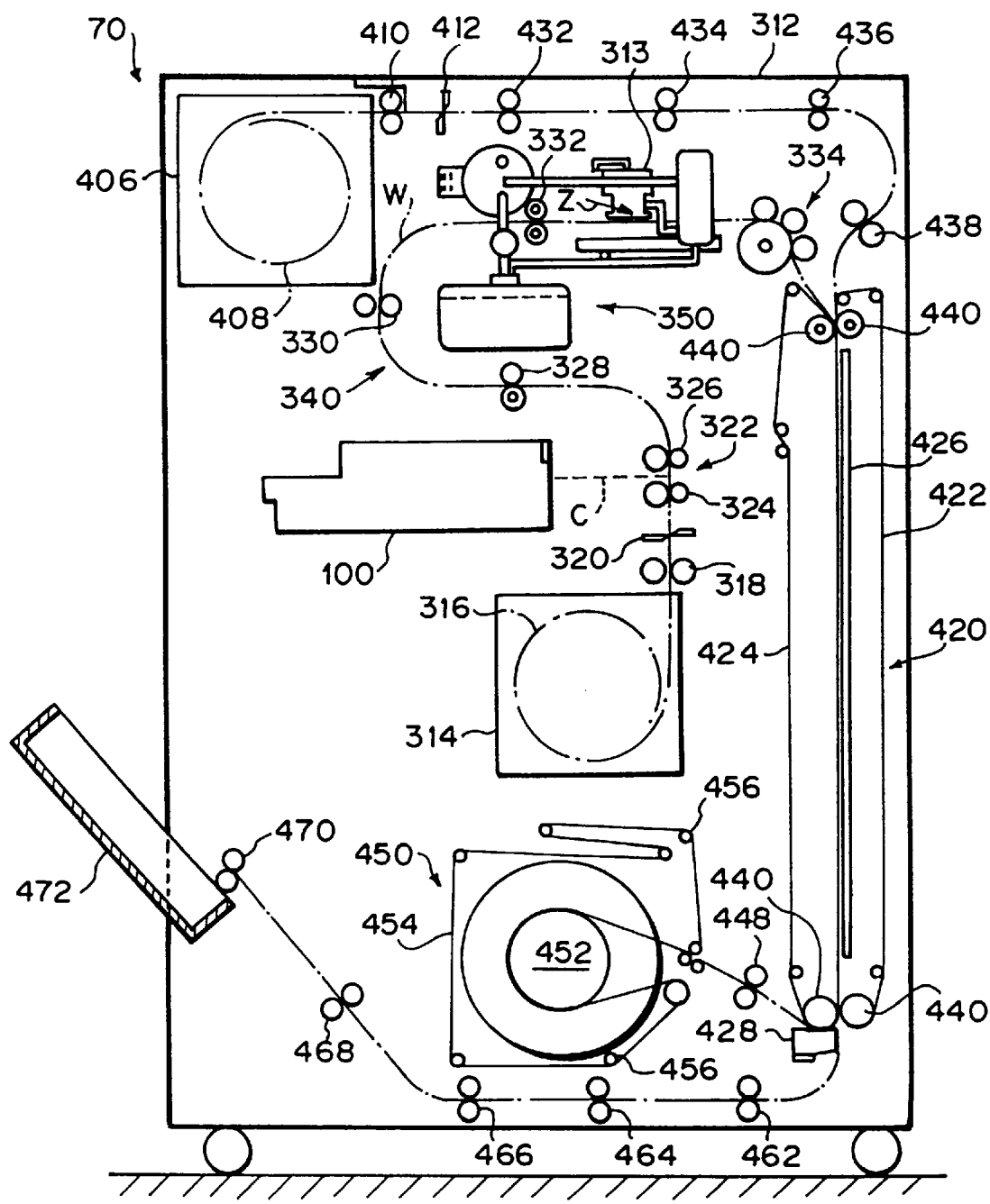
FIG. 26 is a diagram showing an example of the configuration of a digital printer that conducts heat-development transfer.
Figure 27:
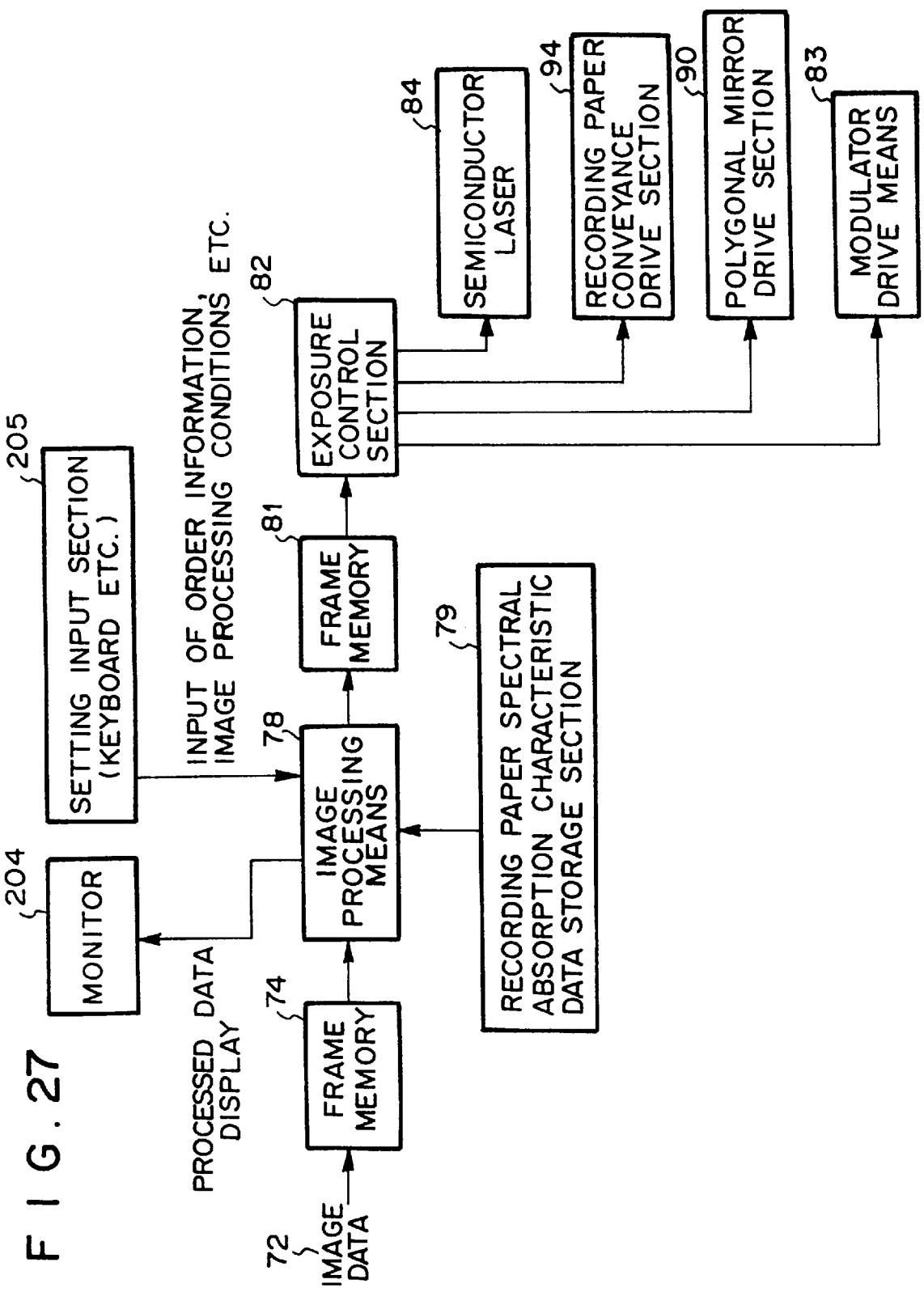
FIG. 27 is a block diagram showing the configuration of the control section of the digital printer of FIG. 26.
Figure 28:
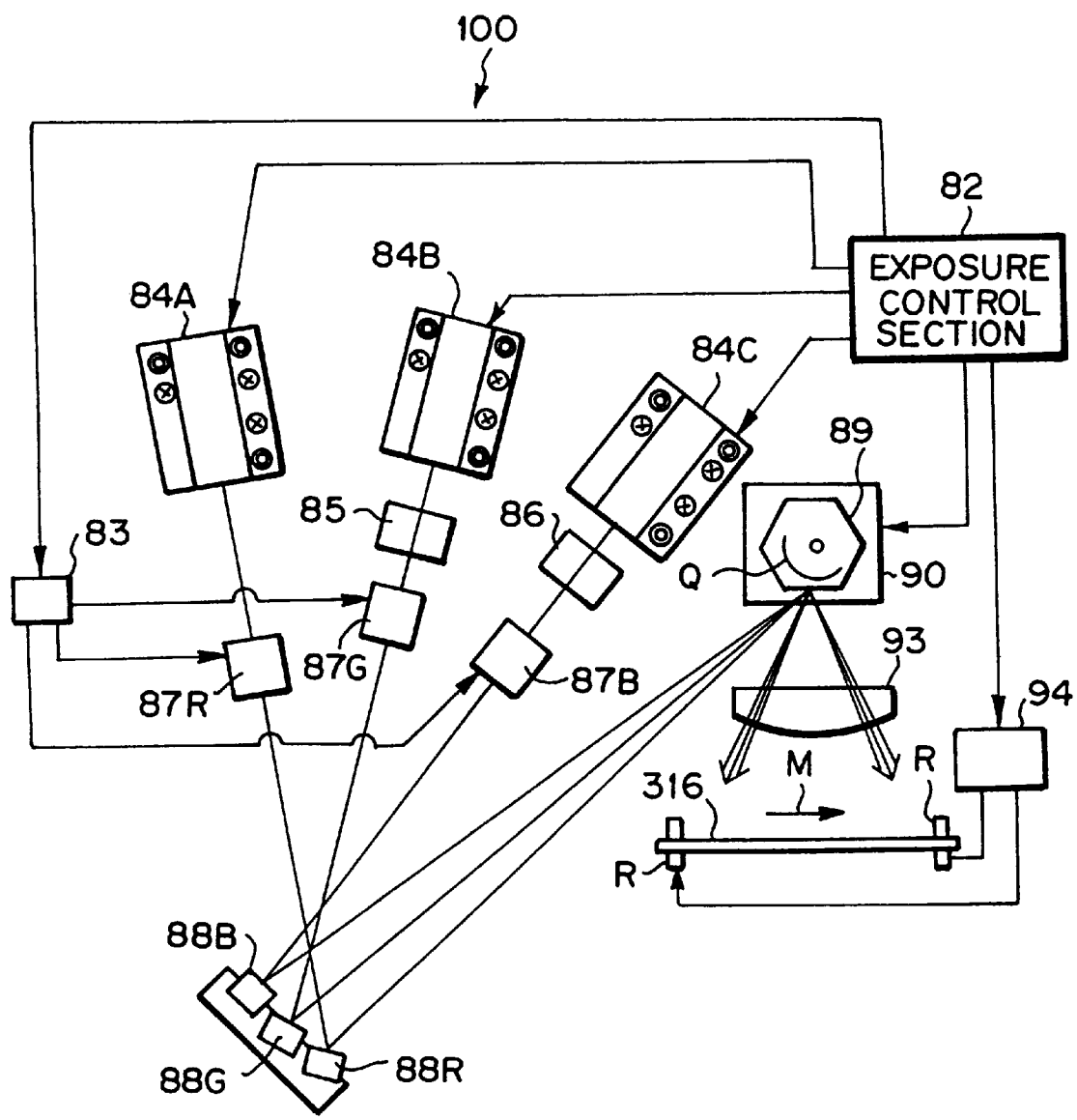
FIG. 28 is a diagram showing the exposure control section of the digital printer of FIG. 26.

Referring to FIGS. 26 to 28, there will now be explained a printer which produces photo prints by scanning a photosensitive material with a laser beam modulated based on image data received from the image processing section 3, thereby exposing the photosensitive material, and then effecting thermal development transfer by superimposing the exposed photosensitive material and an image-receiving material to become the final support.

As shown in FIG. 26, the frame 312 of a digital printer 70 houses a photosensitive material magazine 314 containing photosensitive material 316. The photosensitive material 316 is accommodated in the photosensitive material magazine 314 in roll form such that when it is drawn out the photosensitive (exposure) surface of the photosensitive material 316 faces to the left in the figure.

Nip rollers 318 and a cutter 320 are disposed near the photosensitive material take-out opening of the photosensitive material magazine 314. Prescribed lengths of the photosensitive material 316 drawn out of the photosensitive material magazine 314 by the nip rollers 318 can be cut by the cutter 320. The cutter 320 is constituted, for example, as a rotary type cutter having a fixed blade and a moving blade. The moving blade is moved vertically by a cam or the like to cut the photosensitive material 316 in cooperation with the fixed blade.

Above the cutter 320 are a plurality of conveyance roller pairs 324, 326, 328, 330, 332 and 334 disposed in the order mentioned. Although not shown, a guide plate is provided between each adjacent pair of conveyance rollers. For convenience in explanation, the nip rollers 318 and the conveyance roller pairs 324, 326, 328, 330, 332 and 334 for conveying the photosensitive material 316 to a thermal development transfer section 420 explained in the following are collectively referred to as "conveyance rollers R." The photosensitive material 316 cut to the prescribed length is first conveyed to an exposure section 322 provided between the rollers 324 and the rollers 326.

A laser beam irradiation section 100 is installed on the left side of the exposure section 322. The structure and function of the laser beam irradiation section 100 will be explained with reference to FIGS. 27 and 28.

FIG. 27 is a block diagram illustrating the function of the laser beam irradiation section 100. As shown in FIG. 27, image data 72 input to the laser beam irradiation section 100 are once stored in a frame memory 74. The image data can be transmitted directly from the image processing section 3 or be read from a floppy disk or the like storing the image data.

The image data stored in the frame memory 74 are read by an image processing means 78 which effects processing on the image data to correct for differences between the spectral absorption characteristics of different recording papers, for example. A recording paper spectral absorption characteristic data storage section 79 storing spectral absorption characteristic data for different types of recording paper is connected to the image processing means 78 and the image processing means 78 reads out the spectral absorption characteristic data for the recording paper concerned before carrying out the image processing.

The image processing means 78 can display an image based on the image-processed image data on a display section 204 constituted as a monitor display or the like. This enables the user to visually ascertain the result of the image processing. Moreover, the printer is configured so that the user can, when necessary, modify the settings related to the image processing as desired through a setting input section 205 including a keyboard, setting switches or the like.

The image processing means 78 also stores the image-processed image data in a frame memory 81.

As shown in FIG. 28, the laser beam irradiation section 100 has semiconductor laser beam sources 84A, 84B, 84C for producing red laser beams. The laser beam emitted by the semiconductor laser beam source 84B is converted to a green laser beam by wavelength converting means 85 and the laser beam emitted by the laser beam source 84C is converted to a blue laser beam by a wavelength converter 86.

The red laser beam emitted by the laser beam source 84A, the green laser beam wavelength-converted by the wavelength converting means 85 and the blue laser beam wavelength-converted by the wavelength converter 86 enter light modulators 87R, 87G, 87B, which can be acousto-optic modulators (AOMs) or the like. The light modulators 87R, 87G, 87B are each input with a modulation signal from the modulator drive means 83 and modulate the intensities of the laser beams in accordance with the modulation signals.

The red laser beam modulated in intensity by the light modulator 87R is reflected onto a polygonal mirror 89 by a reflecting mirror 88R. The green laser beam modulated in intensity by the light modulator 87G is reflected onto the polygonal mirror 89 by a reflecting mirror 88G. The blue laser beam modulated in intensity by the light modulator 87B is reflected onto the polygonal mirror 89 by a reflecting mirror 88B.

Since the polygonal mirror 89 rotates at a prescribed angular velocity in the direction of the arrow Q, the laser beams are scanned by the polygonal mirror 89 in the main scanning direction indicated by the arrow M, pass through an fθ lens 93 and expose the photosensitive material 316 at the exposure section 322. As indicated in FIGS. 27 and 28, the digital printer 70 is provided with an exposure control section 82 incorporating a microcomputer. The exposure control section 82 controls the exposure and thermal development processing in the digital printer 70. The exposure control section 82 reads the image-processed image data from the frame memory 81 and controls the operations necessary for exposing the photosensitive material 316 based on the image data, namely, the operations of the semiconductor laser beam sources 84A, 84B, 84C, a polygonal mirror drive section 90 for rotationally driving the polygonal mirror 89 as the deflector for scanning exposure, a recording paper conveyance drive section 94 for conveying the photosensitive material 316, and the modulator drive means 83.

As shown in FIG. 26, the laser beam C from the laser beam irradiation section 100 described in the foregoing is directed to the exposure section 322, where it exposes the photosensitive material 316.

Above the exposure section 322 are provided a U-turn section 340 for conveying the photosensitive material 316 while bowing it into a U-like shape and a water-imparting section 350 for applying solvent for image forming.

The photosensitive material 316 which has moved up from the photosensitive material magazine 314 and been exposed at the exposure section 322 is conveyed by the conveyance roller pairs 328, 330 and fed into the water-imparting section 350 while passing through a conveyance path W above the U-turn section 340.

As the structure of the water-imparting section 350 is similar to that of the solvent-imparting apparatus 290 of FIG. 4 explained earlier, no further description will be given here. A jet tank 313 is disposed a position opposite the conveyance path W of the photosensitive material 316 in the water-imparting section 350 and water from the jet tank 313 is jetted toward the photosensitive material 316 at the point indicated by the arrow Z.

On the other hand, an image-receiving material magazine 406 for storing image-receiving material 408 is disposed at the upper left of the frame 312. The image-forming surface of the image-receiving material 408 is coated with a dye fixing material containing a mordant. The image-receiving material 408 is accommodated in the image-receiving material magazine 406 in roll form such that when it is drawn out the image-forming surface faces to downward.

Nip rollers 410 are disposed near the image-receiving material take-out opening of the image-receiving material magazine 406. The nipping by the nip rollers can be released when the image-receiving material 408 has been drawn out of the image-receiving material magazine 406.

A cutter 412 is disposed to the side of the nip rollers 410. Like the cutter 320 for the photosensitive material described earlier, the cutter 412 can be also be constituted, for example, as a rotary type cutter having a fixed blade and a moving blade. The moving blade is moved vertically by a cam or the like to cut the photosensitive material 316 drawn out of the image-receiving material magazine 406 in cooperation with the fixed blade. The image-receiving material 408 is cut to a shorter length than the photosensitive material 316.

To the side of the cutter 412 are disposed conveyance roller pairs 432, 434, 436, 438 and intervening guide plates for enabling the prescribed cut length of image-receiving material 408 to be conveyed to the thermal development transfer section 420 side.

The thermal development transfer section 420 has a pair of endless belts 422, 424 of loop shape wrapped about a plurality of rollers 440 to extend with their longer sides oriented vertically. Therefore, when any of the rollers 440 is rotated, both of the endless belts 422, 424 wrapped about the rollers are also rotated.

A flat heating plate 426 is provided inside the loop of the endless belt 422 so that its longer side extends vertically and that its surface faces the left inner surface of the endless belt 422. Although not shown, a wire heater is disposed inside the heating plate 426. The heating plate 426 can be heated to a prescribed temperature by this heater.

The photosensitive material 316 is fed between the endless belts 422, 424 of the thermal development transfer section 420 by the conveyance rollers 334 at the end of the conveyance path. The image-receiving material 408 is conveyed synchronously with the conveyance of the photosensitive material 316 by the rollers 438 at end of its conveyance path so as be fed between the endless belts 422, 424 of the thermal development transfer section 420 and superimposed on the photosensitive material 316. The conveyance is conducted so that the photosensitive material 316 leads the image-receiving material 408 by a prescribed length.

Since the image-receiving material 408 is smaller than the photosensitive material 316 in both breadth and length, the four peripheral edges of the photosensitive material 316 project beyond the peripheral edges of the image-receiving material 408 when the two materials are superimposed.

As result of the foregoing, the photosensitive material 316 and the image-receiving material 408 superimposed by the endless belts 422, 424, remain superimposed as they are conveyed as sandwiched between the endless belts 422, 424. When the superimposed photosensitive material 316 and image-receiving material 408 have been completely accommodated between the endless belts 422, 424, the rotation of the endless belts 422, 424 is halted and the photosensitive material 316 clamped therebetween is heated by the heating plate 426. The photosensitive material 316 is heated by the heating plate 426 through the endless belt 422 both when being conveyed in the clamped state and when halted. As the heating proceeds, diffusible dyes are released and the dyes are simultaneously transferred to the dye fixing layer of the image-receiving material 408, whereby an image is formed on the image-receiving material 408.

A peeling claw 428 is disposed downstream of the endless belts 422, 424 relative to the material feed direction. Of the photosensitive material 316 and the image-receiving material 408 conveyed as clamped between the endless belts 422, 424, the peeling claw 428 engages with tip portion of only the photosensitive material 316, whereby the tip of the photosensitive material 316 projecting from between the endless belts 422, 424 can be peeled from the image-receiving material 408.

A pair of photosensitive material discharge rollers 448 are disposed to the left of the peeling claw 428. The photosensitive material 316 is guided to the left by the peeling claw 428 so that it can be conveyed toward a waste photosensitive material receiving section 450.

The waste photosensitive material receiving section 450 is equipped with a drum 452 for taking up the photosensitive material 316 and a belt 454, part of which is wound about the drum 452. The belt 454 further passes over a number of rollers 456. Rotation of these rollers 456 rotates the belt 454 which in turn rotates the drum 452.

Therefore, when the photosensitive material 316 is fed during rotation of the belt 454 owing to the rotation of the rollers 456, the photosensitive material 316 can be collected around the drum 452.

Pairs of image-receiving material discharge rollers 462, 464, 466, 468 and 470 are further provided in the order mentioned to enable conveyance of the image-receiving material 408 from the lower end of the endless belts 422, 424 to the left in FIG. 26. The image-receiving material 408 exiting from between the endless belts 422, 424 is conveyed by these image-receiving material discharge rollers 462, 464, 466, 468 and 470 and discharged to a tray 472.

Digital printing using large amount of processing solution

Figure 29:
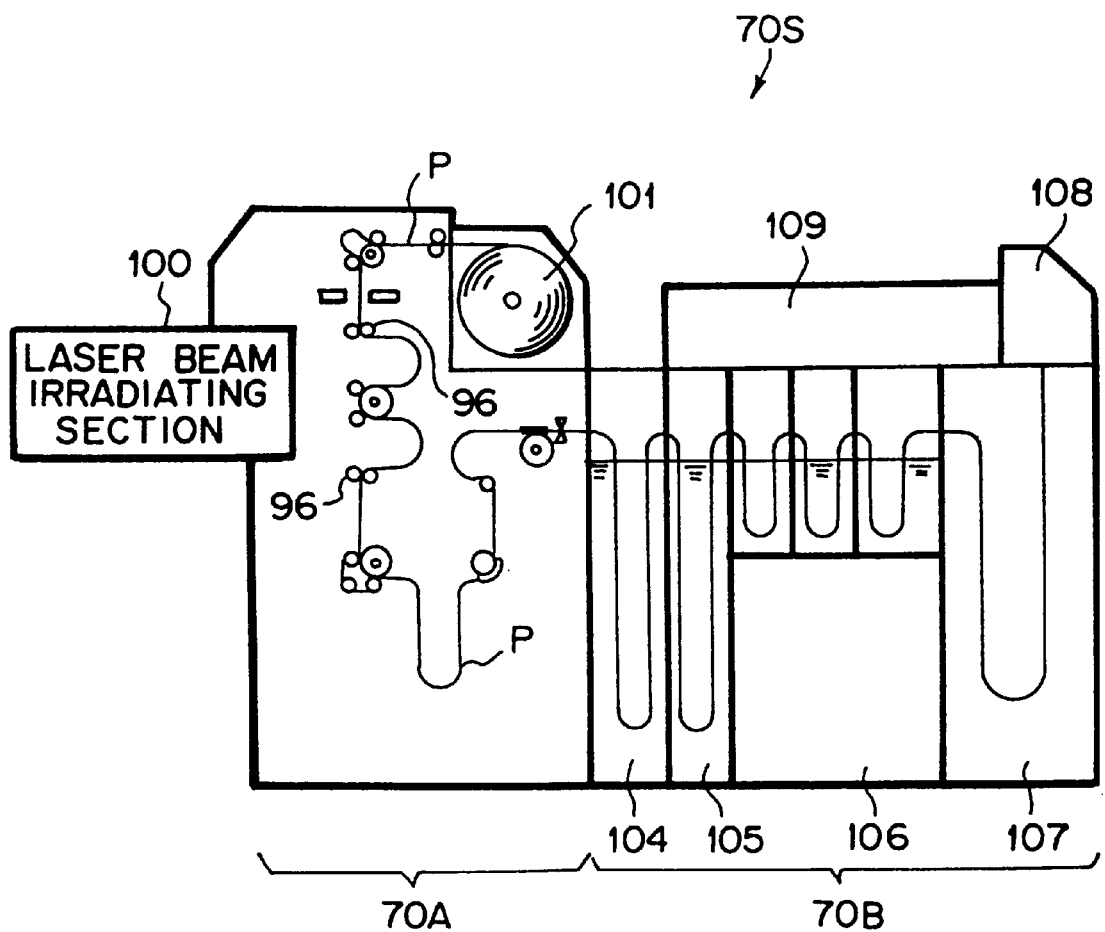
FIG. 29 is a diagram showing an example of the configuration of a digital printer that conducts wet development processing.

When the image forming system of this invention is implemented as all-in-one apparatus including one or more printers, the printers are preferably of a type not requiring wet processing, such as those described in the foregoing. In contrast, when only the developer-reader is installed in a convenience store or the like and the digitized image data are transmitted via a telephone line or other communication line to a photo service provider for print processing, the effects and advantages of this invention can be enjoyed even by use of a printer-processor 70S, such as shown in FIG. 29, which uses large amounts of processing solutions. The general structure of the printer-processor 70S and the processing it conducts will be explained with reference to FIG. 29.

As shown in FIG. 29, the printer-processor 70S includes an exposure section 70 A which imagewise exposes color paper P by scanning with a laser beam in accordance with image data and a developing section 70B for effecting development/fixing and other processing on the color paper P exposed by the exposure section 70A.

The exposure section 70A is equipped with a magazine 101 for accommodating a roll of color paper P which is conveyed along a prescribed conveyance path by rollers 96. The exposure section 70A is provided with a laser beam irradiation section 100 of the same structure as that described earlier. As the color paper P is being conveyed, the laser beam irradiation section 100 scans it with a laser beam based on the image data.

The laser scanning is conducted in the main scanning direction perpendicular to the direction of color paper P conveyance. The scanning with the laser beam and the conveyance of the color paper P are synchronized by the exposure control section 82 in the laser beam irradiation section 100 (see FIG. 28). As a result, the color paper P is exposed to an image based on the image data.

The imagewise exposed color paper P is forwarded to the developing section 70B having a color developing tank 104 containing color developing solution, a bleach-fixing tank 105 containing bleach-fixing solution and a washing tank 106 containing water-washing solution. During conveyance, it is subjected to color development in the color developing tank 104, bleach-fixing in the bleach-fixing tank 105 and water washing in the washing tank 106.

The color paper P subjected to color development, bleach-fixing and water washing is then sent to a drying section 107 where it is dried, to a cutter section 108 where it is cut it into lengths each corresponding to the length of one image recorded in one frame of the color print P, and to a sorter 109 which sorts the cut pieces based on the individual rolls of the film or by customer.

(2-5) Order processing

An example of the order processing will now be explained. As was pointed out in the explanation of the image processing section, once the development, read-out and image processing of the photographic film has been completed, the user can view the image data on the monitor. A number of sets of image data are displayed simultaneously and the user designates one of the sets using a mouse. This causes the designated set of image data to be displayed to the full size of the screen, making it possible to observe the image details. In the present embodiment, the user is able to make the following designations with respect to the observed photographic image data. The "designations," "selections" and the like referred to here are made by use of conventional methods and means, such as by input of a number displayed on the monitor screen using a keyboard or by clicking on the displayed number using a mouse.

The type of output—file, print or transmission to a remote system (if communication means is provided)—can also be designated. The type of print or media can be simultaneously designated. The designations can be made in terms of development units (e.g., photo film units) or frame units. Based on the input designations, the image processing section 3 decides the destination of the image data transfer.

Gradation correction and trimming can also be conducted before output. Since the gradation correction and other image processing automatically conducted by the system are for obtaining image quality meeting generally accepted standards, it is easy to envision that users may have different preferences regarding the image processing. This embodiment is therefore designed to respond to user instructions for images that are, for example, sharper or brighter. When such an instruction is input, the system conducts the image processing again based on the instruction and once more displays the image-processed data. The user can repeat the processing until satisfied with the image quality.

Similarly in the case of trimming, when a trimmed region is designated on the monitor screen, the region is framed by lines and the user can repeatedly modify the desired region until satisfied. The system can therefore be arranged, for example, such that if one of the frames recorded on the developed photographic film is particularly appealing to the user, he or she can trim the frame as desired and transmit the processed image data to a special laboratory to be made into a postcard. If this service is offered, it should also be made possible select the postcard design and the like from the screen.

When the system is installed at a location such as a convenience store, the service fee is displayed on the monitor screen when the user presses an OK button to indicate that all desired processing has been completed and output is made only if the designated amount is paid by inserting bills and/or coins. Alternatively, it is possible to receive payment of the development fee before the cartridge or the like is set in the setting section and then to collect payment for preparation of prints or the like later.

The image forming method and system according to the invention have been described with respect to specific embodiments. Photos are taken for many purposes: to commemorate important events, make postcards, secure images for use in presentations, and countless others. Regardless of purpose, however, it is naturally desirable to be able to achieve the purpose quickly, simply, and without having to make repeated trips to a photo shop.

The image forming method and system according to this invention respond to these desires of users of photographic services by permitting them to obtain desired services at the time desired. As such, the enable what might be called "on-demand" photo services. The invention thus not only provides excellent technologies but can also be anticipated to produce a great effect from the commercial aspect.

What is claimed is:

1. An image forming system which employs the following image forming method:

exposing a photosensitive material to record a latent image thereon;

superimposing the photosensitive material and a processing material;

heating the superimposed photosensitive material and processing material to form an image on the photosensitive material corresponding to the latent image recorded thereon;

peeling the photosensitive material formed with the image off the processing material;

reading the image formed on photosensitive material with a scanner to obtain image data representing the image; and subjecting the image data to prescribed image processing to generate reproducible digital image data and is equipped with a developing section for developing a photosensitive material containing photosensitive silver halide grains which when imagewise exposed to record a latent image thereon is formed with an image by heating with a prescribed processing material superimposed thereon, the developing section comprising:

superimposing means for superimposing the photosensitive materials and the processing material, heating means for heating the superimposed photosensitive material and processing material to form an image on the photosensitive material corresponding to the latent image recorded thereon, and peeling means for peeling the photosensitive material formed with the image off the processing material.

2. An image forming system according to claim 1, wherein the developing section further comprises solvent-imparting means for imparting at least one of the photosensitive material and the processing material with a prescribed image-forming solvent prior to the superimposing of the photosensitive material and the processing material.

3. An image forming system according to claim 1 or 2, wherein the photosensitive silver halide grains are tabular photosensitive silver halide grains.

4. An image forming system according to claim 3, wherein the heating means conducts the heating at a temperature between 60 and 100° C. for between 5 and 60 seconds.

5. An image forming system according to claim 4, wherein:

the photosensitive material is a coloring material-containing, heat-developable color photosensitive material having a support provided thereon with at least three photosensitive layers which each includes at least photosensitive silver halide grains, a binder and a coloring material capable of imagewise release or diffusion of a diffusible dye, and which are photosensitive in different wavelength regions, the coloring material present in the layers being different from each other in hue after development, and the processing material is adapted to be superimposed on the coloring material-containing, heat-developable photosensitive material and heated therewith to form an image on the coloring material-containing, heat-developable photosensitive material, the processing material being a mordant-containing processing material having a support provided thereon with a layer containing at least a mordant.

6. An image forming system according to claim 4, wherein:

the photosensitive material is a heat-developable photosensitive material having a support provided thereon with at least three photosensitive layers which are photosensitive in different wavelength regions, each of the layers including at least photosensitive silver halide grains, a binder, a color developing agent and a dye-providing coupler, the dyes formed from the oxidized color developing agent and the dye-providing coupler being different in hue, and the processing material is adapted to be superimposed on the heat-developable photosensitive material and heated therewith to form an image on the heat-developable photosensitive material.

7. An image forming system according to claim 6, wherein:

the photosensitive material has a transparent support provided thereon with at least three photosensitive layers which each includes at least photosensitive silver halide grains, a color developing agent, a coupler and a binder, and which are photosensitive in different wavelength regions, the dyes formed from the oxidized color developing agent and the coupler being different from each other in absorption wavelength region, the processing material has a support provided thereon with a processing layer including at least a base and/or a base precursor, and the superimposing means superimposes the photosensitive material and the processing material with the photosensitive layers of the photosensitive material and the processing layer of the processing material facing each other in the presence of 0.1 to 1 time the amount of water required to cause maximum swelling of all coating layers of the photosensitive material and the processing material other than their backing layers.

8. An image forming system according to claim 7, wherein the color developing agent is at least one compound among those represented by general formulas (1) to (5) shown below:

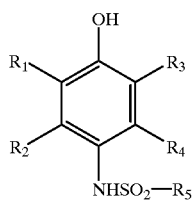

General formula (1)

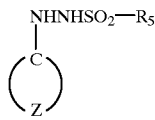

General formula (2)

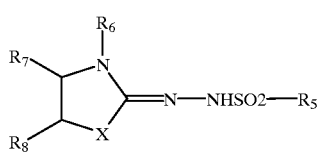

General formula (3)

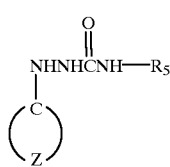

General formula (4)

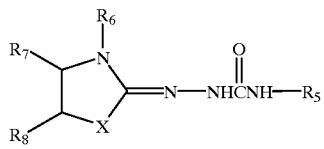

General formula (5)

where $R_1$, $R_2$, $R_3$, and $R_4$ each represents a hydrogen atom, a halogen atom, an alkyl group, an aryl group, an alkylcarbonamido group, an arylcarbonamido group, an alkylsulfonamido group, an arylsulfonamido group, an alkoxy group, an aryloxy group, an alkylthio group, an arylthio group, an alkylcarbamoyl group, an arylcarbamoyl group, a carbamoyl group, an alkylsulfamoyl group, an aryl-sulfamoyl group, a sulfamoyl group, a cyano group, an alkyl-sulfonyl group, an arylsulfonyl group, an alkoxycarbonyl group, an aryloxycarbonyl group, an alkylcarbonyl group, an arylcarbonyl group, or an acyloxy group;

$R_5$ represents a substituted or unsubstituted alkyl group, a substituted or unsubstituted aryl group, or a substituted or unsubstituted heterocyclic group;

Z represents an atomic group forming an aromatic ring (including a heterocyclic aromatic ring) and when Z is a benzene ring, the total value of the Hammett's constant (P) of the substituent is at least 1;

$R_6$ represents a substituted or unsubstituted alkyl group;

X represents an oxygen atom, a sulfur atom, a selenium atom, or an alkyl-substituted or aryl-substituted tertiary nitrogen atom; and $R_7$ and $R_8$ each represents a hydrogen atom or a substituent and $R_7$ and $R_8$ may combine with each other to form a double bond or a ring.

9. An image forming system according to claim 8, further comprising photosensitive material dust removing means for removing dust and other foreign matter adhering to the photosensitive material before the photosensitive material and the processing material are superimposed by the superimposing means.

10. An image forming system according to claim 9, wherein the developing section develops a photographic film made of the photosensitive material exposed by photograph-taking with a prescribed photograph-taking means.

11. An image forming system according to claim 10, wherein the developing section develops a photographic film exposed by photograph-taking with a camera loaded with a cartridge housing a photographic film made of the photosensitive material.

12. An image forming system according to claim 11, wherein the developing section develops a photographic film exposed by photograph-taking with a lens-fitted photographic film unit loaded with a cartridge housing a photographic film made of the photosensitive material.

13. An image forming system according to claim 12, wherein the developing section develops a photographic film exposed by photograph-taking with a lens-fitted photographic film unit directly housing a photographic film made of the photosensitive material.

14. An image forming system according to claim 13, further comprising at least one setting section for setting a photographic film in the image forming system when the photographic film is to be developed, the setting section having a structure matched to a shape of a container in which the photographic film was housed at the time of photograph-taking.

15. An image forming system according to claim 14, wherein at least one of the setting sections has a shape matched to a shape of a film cartridge.

16. An image forming system according to claim 15, wherein at least one of the setting sections has a shape matched to a shape of a lens-fitted photographic film unit.

17. An image forming system according to claim 16, wherein the setting section includes container retaining means for retaining the container and light-shielding means for shielding the container retained by the container retaining means from light.

18. An image forming system according to claim 17, further comprising container dust removing means for removing dust and other foreign matter adhering to the container.

19. An image forming system according to claim 18, further comprising setting section dust removing means for removing dust and other foreign matter adhering to the setting section.

20. An image forming system according to claim 19, further comprising a film take-out section for drawing the photographic film out of the container set in the setting section.

21. An image forming system according to claim 20, wherein the film take-out section is provided with film separating means for taking photographic film out of a film cartridge.

22. An image forming system according to claim 21, wherein the film take-out section is provided with:

opening means for opening a case of the lens-fitted photographic film unit, unit/cartridge separating means for separating the film cartridge from the opened lens-fitted photographic film unit, and cartridge/film separating means for drawing the photographic film out of the separated film cartridge.

23. An image forming system according to claim 22, wherein the film take-out section is provided with:

opening means for opening a case of the lens-fitted photographic film unit, and unit/cartridge separating means for separating the photographic film from the opened lens-fitted photographic film unit.

24. An image forming system according to claim 23, further comprising film take-out section dust removing means for removing dust and other foreign matter adhering to the film take-out section.

25. An image forming system according to claim 24, further comprising film type discriminating means for discriminating whether or not a photographic film housed in a container set in the setting section is a film developable by the image forming system.

26. An image forming system according to claim 25, wherein the film type discriminating means recognizes container identifying information affixed to the container and effects the discrimination based on the identifying information.

27. An image forming system according to claim 25, wherein the film type discriminating means draws the photographic film out of the container set in the setting section, measures the light transmittance of the drawn-out photographic film, and effects the discrimination based on the measured light transmittance.

28. An image forming system according to claim 25, wherein the film type discriminating means draws the photographic film out of the container set in the setting section and effects the discrimination based on data representing film type recorded on an information recording section of the drawn-out photographic film.

29. An image forming system according to claim 28, further comprising a user interface section for displaying a result of the discrimination by the film type discriminating means.

30. An image forming system according to claim 29, wherein a dustproof structure is adopted for at least a part of the path for conveying a photographic film set in the setting section to the developing section.

31. An image forming system according to claim 30, further comprising a waste material processing section for processing used components discharged after development of the photosensitive material.

32. An image forming system according to claim 31, wherein the waste material processing section has means for collecting the container.

33. An image forming section according to claim 31, wherein the waste material processing section includes:

container disassembly means for disassembling the container into prescribed components, and component sorting and collection means for sorting and separately collecting individual components of the disassembled container.

34. An image forming system according to claim 31, wherein the waste material processing section includes film reloading means for reloading the container with unexposed photographic film after the photographic film housed in the container has been drawn out.

35. An image forming system according to claim 34, wherein the waste material processing section includes film collection means for collecting the developed photographic film and recovering silver remaining on the photographic film.

36. An image forming system according to claim 35, further comprising desilvering means for at least partially removing silver halide and developed silver remaining on the photosensitive material by conducting bleach processing and/or fixation processing on the photosensitive material separated from the processing material by the peeling.

37. An image forming system according to claim 36, further comprising:

image reading means for reading an image on a photosensitive material developed in the developing section to obtain image data representing the image, and image processing means for subjecting the image data to prescribed image processing to generate reproducible digital image data.

38. An image forming system according to claim 37, wherein:

the image reading means effects the reading without removing silver halide and/or developed silver remaining on the photosensitive material separated from the processing material by the peeling, and the image processing means corrects for the contribution of the silver halide and/or the developed silver to the image data.

39. An image forming system according to claim 38, further provided with stabilization means for reducing digital image data error caused by a temperature characteristic of the photosensitive material at the time of generating digital image data.

40. An image forming system according to claim 39, wherein the image reading means determines the temperature of the photosensitive material after the development and reduces the error by deciding a condition of the reading based on the determined temperature.

41. An image forming system according to claim 39, wherein the image processing means reduces the error by determining the temperature of the photosensitive material at the time of the reading and converting data obtained by the reading based on the determined temperature and a relationship between color density and temperature of the photosensitive material determined in advance.

42. An image forming system according to claim 39, wherein the stabilization means retains heat of the photosensitive material after development to maintain the temperature of the photosensitive material constant during reading.

43. An image forming system according to claim 39, wherein the stabilization means allows the photosensitive material after development to stand for a prescribed period before the reading to ensure constant temperature of the photosensitive material during reading.

44. An image forming system according to claim 43, wherein the image processing means effects image processing varied depending on the image data.

45. An image forming system according to claim 44, wherein the photosensitive material is a photosensitive material exposed by photograph-taking and the image processing means effects image processing varied depending on a photograph-taking condition during the photograph-taking.

46. An image forming system according to claim 45, wherein the photosensitive material is in the form of photographic film and the image processing means effects image processing varied depending on film information peculiar to the photographic film.

47. An image forming system according to claim 46, wherein the image processing means effects noise reduction processing on the image data.

48. An image forming system according to claim 47, wherein the image processing means effects enlargement or reduction processing on the image data.

49. An image forming system according to claim 48, wherein the image processing means effects dynamic range compression or expansion processing on the image data.

50. An image forming system according to claim 49, wherein the image processing means effects data compression processing to reduce the data volume of the image data.

51. An image forming system according to claim 50, wherein the image processing means effects sharpness enhancement processing on the image data.

52. An image forming system according to claim 51, wherein the image carried by the image data is a color image and the image processing means effects processing for correcting at least one of color, gradation and density of the color image.

53. An image forming system according to claim 52, further comprising at least one file output means for outputting the digital image data as a file to a prescribed storage medium.

54. An image forming system according to claim 53, wherein the prescribed storage medium is a removable medium which can be turned over to a customer who requested the development.

55. An image forming system according to claim 54, wherein the prescribed storage medium is a storage medium usable by a development service provider to store the digital image data for output in response to an order for the digital image data from a customer who requested the development.

56. An image forming system according to claim 55, further comprising reproducing means for reproducing an image recorded on the photosensitive material by recording the digital image data on an unexposed photosensitive material.

57. An image forming system according to claim 56, further comprising at least one printing means for outputting the digital image data as a print.

58. An image forming system according to claim 57, wherein at least one of the printing means is connected with the image processing means by prescribed transmission means and prints the digital image data transmitted from the image processing means through the transmission means.

59. An image forming system according to claim 58, wherein the prescribed transmission means is a communication line.

60. An image forming system according to claim 59, wherein at least one of the printing means is provided in a case which is the same as that of the image processing section.

61. An image forming system according to claim 60, wherein at least one of the printing means is a non-wet processing printer.

62. An image forming system according to claim 61, wherein the least one non-wet processing printer includes a dry xerographic digital printer.

63. An image forming system according to claim 62, wherein the xerographic digital printer once transfers a toner image formed on a photosensitive drum to an intermediate transfer member and then retransfers the transferred toner image to a prescribed recording medium.

64. An image forming system according to claim 61, wherein the at least one non-wet processing printer includes an ink-jet digital printer which produces a print by fixing jetted ink on a recording sheet.

65. An image forming system according to claim 64, wherein the ink-jet digital printer jets ink droplets by generating thermal energy.

66. An image forming system according to claim 64, wherein the ink-jet digital printer jets ink droplets by applying a voltage to a piezoelectric element to reduce the volume of a pressure chamber by flexing of the piezoelectric element.

67. An image forming system according to claim 64, wherein the ink-jet digital printer fixes ink droplets on a recording sheet by jetting charged ink droplets from a nozzle and electrostatically deflecting the charged ink droplets in accordance with the digital image data.

68. An image forming system according to claim 64, wherein the ink-jet digital printer jets ink droplets from an ink jet orifice utilizing pressure of a traveling wave produced by a piezoelectric rod of a head.

69. An image forming system according to claim 68, wherein the jetted ink is produced by dissolving water soluble dye in a solvent including water.

70. An image forming system according to claim 68, wherein the jetted ink is produced by dispersing pigment in a solvent including water.

71. An image forming system according to claim 68, wherein the jetted ink contains dye formed into microcapsules.

72. An image forming system according to claim 68, wherein the jetted ink is solid at normal room temperature and is melted at high temperature to be jetted by the ink-jet printer.

73. An image forming system according to claim 72, wherein the recording sheet has a support and a porous particle layer on the support.

74. An image forming system according to claim 72, wherein the recording sheet has a support and a layer including a hydrophilic resin on the support.

75. An image forming system according to claim 73 or 74, wherein the recording sheet has a support made of resin coated paper.

76. An image forming system according to claim 61, wherein the at least one non-wet processing printer includes a thermal sublimation dye transfer digital printer.

77. An image forming system according to claim 76, wherein the thermal sublimation dye transfer digital printer transfers heat-diffusing dye to a prescribed image-receiving sheet by heating an ink sheet containing the heat diffusing dye in accordance with digital image data.

78. An image forming system according to claim 77, wherein the heat diffusing dye has a diene group and the image-receiving sheet includes a dienophyl compound.

79. An image forming system according to claim 77, wherein the heat diffusing dye has a dienophyl group and the image-receiving sheet includes a diene compound.

80. An image forming system according to claim 77, wherein the heat diffusing dye is a chelatable dye and the image-receiving sheet includes a metal ion-providing compound.

81. An image forming system according to claim 77, wherein the heat diffusing dye includes a reactive amino group and the image-receiving sheet includes a polymer including an alkylacrylamidoglycolate alkylether group.

82. An image forming system according to claim 81, wherein a support of the image-receiving sheet is a polyethylene coated paper.

83. An image forming system according to claim 81, wherein a support of the image-receiving sheet is produced by laminating a minutely voided thermoplastic core layer and a thermoplastic surface layer substantially free of voids.

84. An image forming system according to claim 61, wherein the at least one non-wet processing printer includes a digital printer which records an image on a prescribed heat-developable photosensitive material, superimposes the heat-developable photosensitive material and an image-receiving material, and heat-development transfers the image to the image-receiving material to form an image thereon.

85. An image forming system according to claim 60, wherein at least one of the printing means is a digital printer which records an image on a photographic photosensitive material by exposing it to light modulated in pixel units corresponding to digital image data and conducts wet development processing on the photographic photosensitive material to form the image on the photographic photosensitive material.

86. An image forming system according to claim 85, wherein the exposure light is a laser beam.

87. An image forming system according to claim 60, wherein at least one of the printing means is a wet xerographic digital printer.

88. An image forming system according to claim 87, further comprising a user interface for receiving order data for ordering output of a file and/or a print of the digital image data.

89. An image forming system according to claim 88, wherein the user interface includes:

display means for displaying multiple sets of digital image data read from the developed photographic film side by side, and selection input means enabling selection of a desired set or sets of digital image data from among those displayed.

90. An image forming system according to claim 89, wherein the user interface includes an interface enabling collection of payment for output processing conducted based on the order data.

91. An image forming system according to claim 90, wherein the output destination of the digital image data is switched based on the order data.

92. An image forming system which forms an image by use of a heat-developable photosensitive material which when imagewise exposed is formed with an image by heating and a processing material used to form an image on the heat-developable photosensitive material by superimposition on and heating with the heat-developable photosensitive material, the system comprising:

superimposing means for superimposing the heat-developable photosensitive material imagewise exposed beforehand and the processing material, heating means for heating the superimposed heat-developable photosensitive material and processing material peeling means for peeling the heated heat-developable photosensitive material off the processing material, and image reading means for digitally reading an image on the heat-developable photosensitive material separated from the processing material by peeling.

93. An image forming system according to claim 92, wherein:

the heat-developable photosensitive material includes a support provided thereon with at least three photosensitive layers which each includes at least photosensitive silver halide, a binder and a coloring material capable of imagewise release or diffusion of a diffusible dye, and which are photosensitive in different wavelength regions, the coloring material present in the layers being different from each other in hue after development, and the processing material includes a support provided thereon with a layer containing at least a mordant.

94. An image forming system according to claim 92, wherein the heat-developable photosensitive material includes a support provided thereon with at least three photosensitive layers which are photosensitive in different wavelength regions, each of the layers including at least photosensitive silver halide, a binder and a dye-providing coupler, the dyes formed by the dye-providing coupler being different in hue.

95. An image forming system according to any of claims 92 to 94, further comprising:

data storage means for storing data, and writing means for writing image data read by the image reading means to the data storage means.

96. An image forming system according to claim 95, wherein the image data read by the image reading means are used to form an image on another image recording material.

97. An image forming system according to claim 96, further comprising solvent-imparting means for imparting a coat of a prescribed solvent for image development to at least one of the heat-developable photosensitive material and the processing material before the superimposing means superimposes the heat-developable photosensitive material and the processing material.

* * * * *